United States Patent [19]

Anderson et al.

[11] 4,312,619
[45] Jan. 26, 1982

[54] AIRCRAFT CARGO LOADING METHOD AND APPARATUS

[75] Inventors: James M. Anderson; Richard O. Hassel, both of San Jose; Donald M. Inghram, Santa Clara; Edwin Winkler, Santa Cruz, all of Calif.

[73] Assignee: FMC Corporation, San Jose, Calif.

[21] Appl. No.: 58,895

[22] Filed: Jul. 19, 1979

[51] Int. Cl.³ .............................................. B65G 67/00
[52] U.S. Cl. .................................... 414/347; 414/351; 414/353; 414/495; 180/14 A
[58] Field of Search ............... 414/347, 351, 353, 396, 414/495, 340; 244/137 R; 180/14 R, 14 A; 187/32

[56] References Cited

U.S. PATENT DOCUMENTS

| | | | |
|---|---|---|---|
| 3,263,832 | 8/1966 | Williams et al. | 244/137 R |
| 3,341,042 | 9/1967 | Carder | 414/495 |
| 3,370,727 | 2/1968 | Shaw | 414/495 |
| 3,612,312 | 10/1971 | Behrmann | 414/495 |
| 3,666,127 | 5/1972 | Guyaux | 414/347 |
| 3,749,203 | 7/1973 | Hoelscher | 187/32 |
| 3,854,610 | 12/1974 | Carder | 414/495 |
| 3,993,207 | 11/1976 | Jones | 414/495 |

*Primary Examiner*—Joseph E. Valenza
*Attorney, Agent, or Firm*—A. J. Moore; R. B. Megley

[57] ABSTRACT

A method and apparatus is disclosed and is capable of transferring both small containers that are up to 20 feet long and large containers about 40 feet long between the cargo area of an aircraft and airport cargo handling facilities. The apparatus includes a mobile, self-propelled main loader and a mobile self-propelled auxiliary loader both of which must be used together as a unit to handle the large containers, but each loader may operate alone to handle the small containers. Independent hydraulic and electrical circuits are provided on each loader, permitting the loaders to operate alone when handling small containers. Both loaders are operated together to handle larger containers at which time the hydraulic and electrical circuits are connected together allowing a single operator to control both loaders. Each loader includes a vertically movable platform with container propelling rollers and belts thereon, and the platforms are locked together when handling large containers.

19 Claims, 33 Drawing Figures

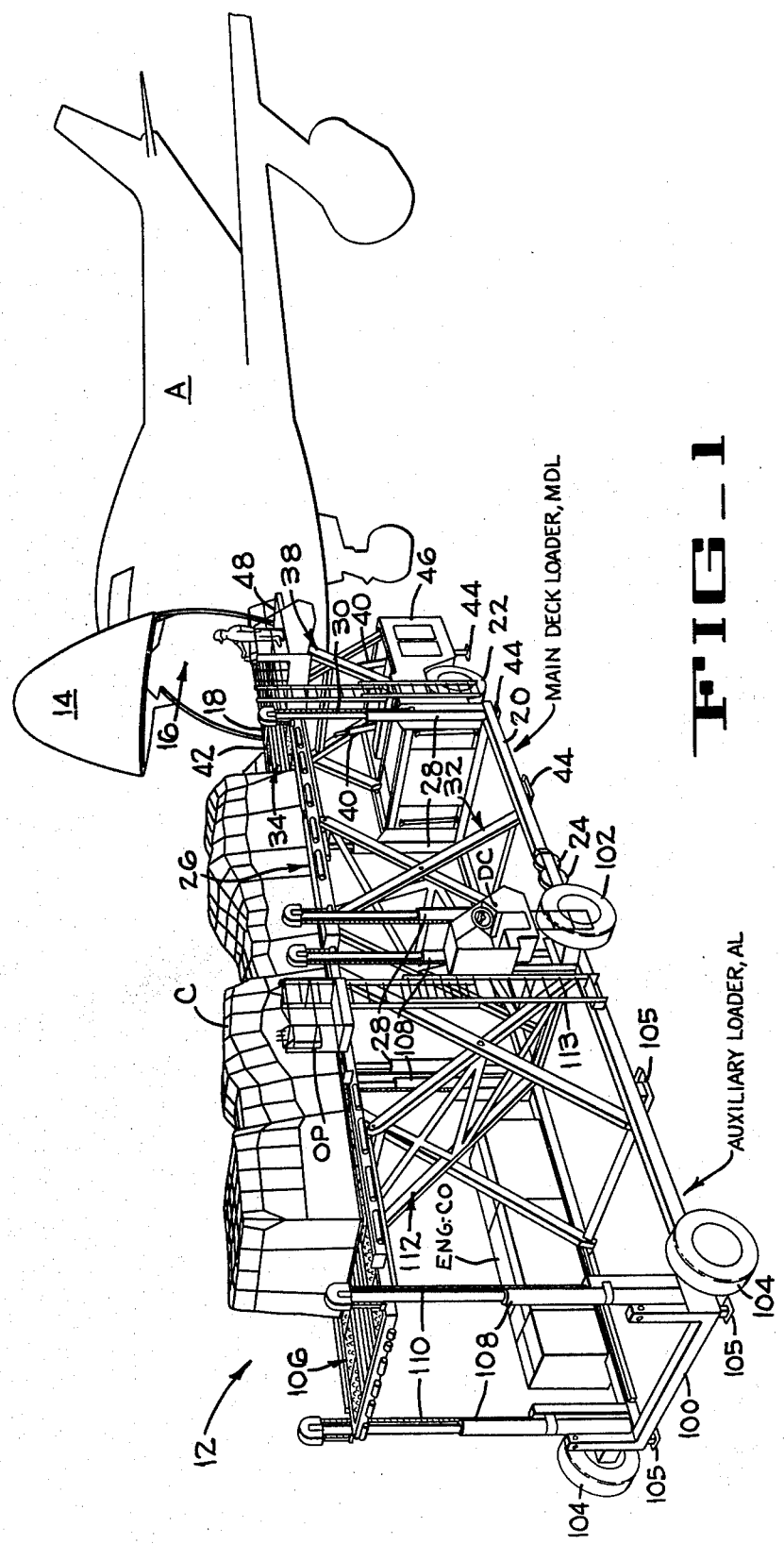
FIG_1

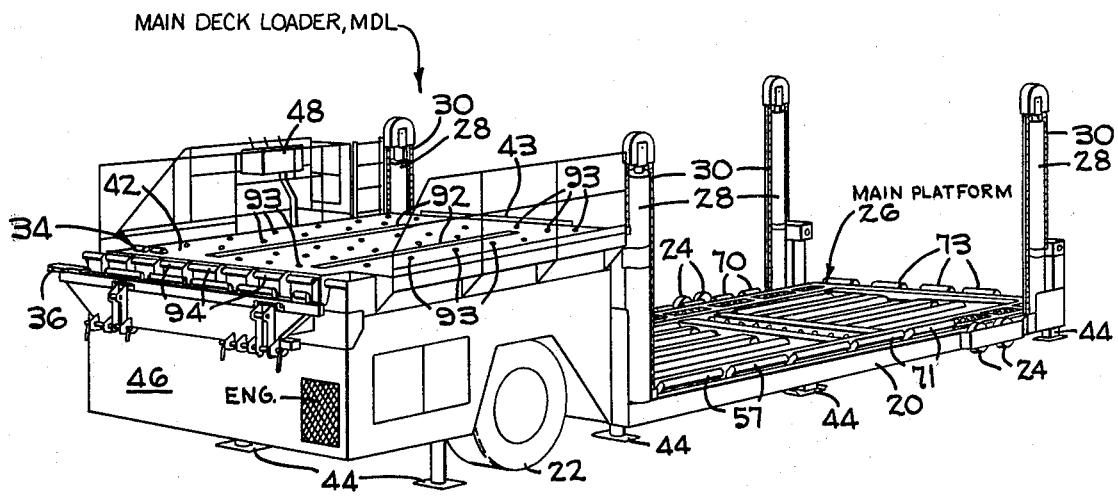
FIG_2
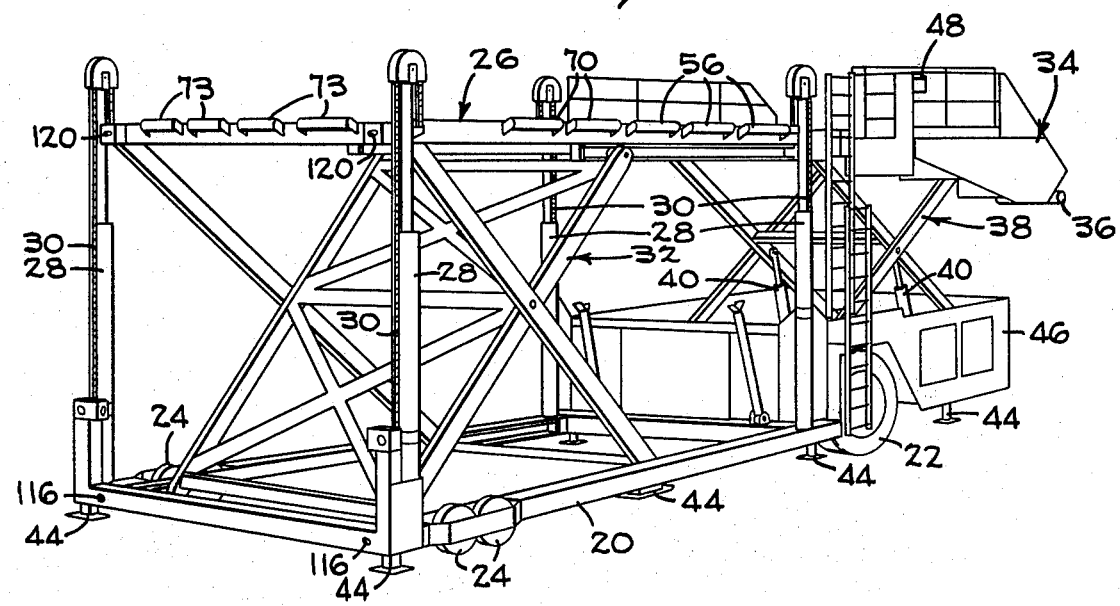
FIG_3

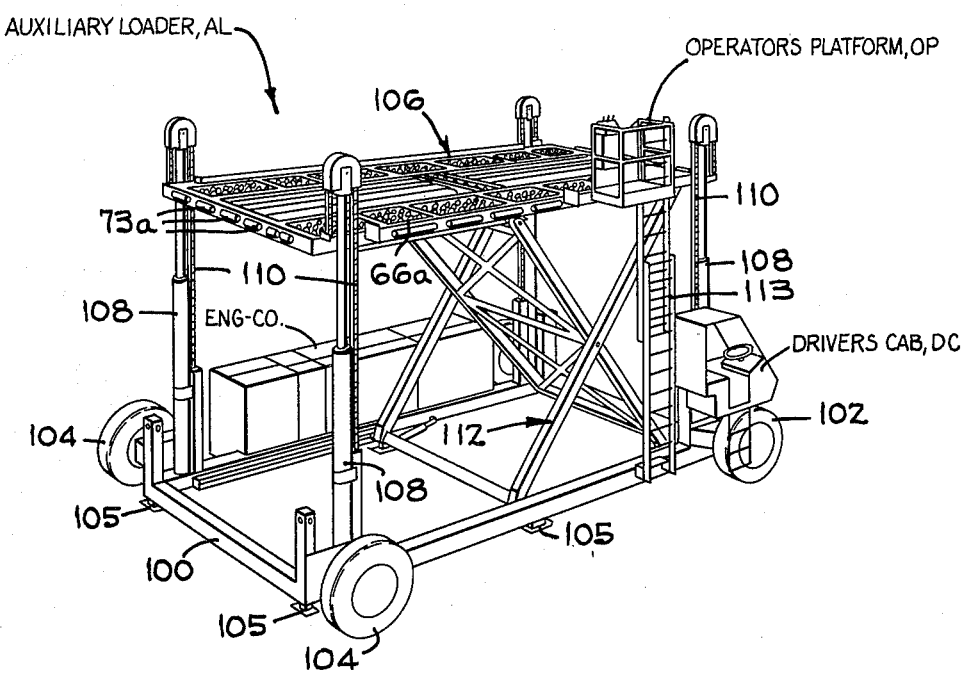
FIG_4
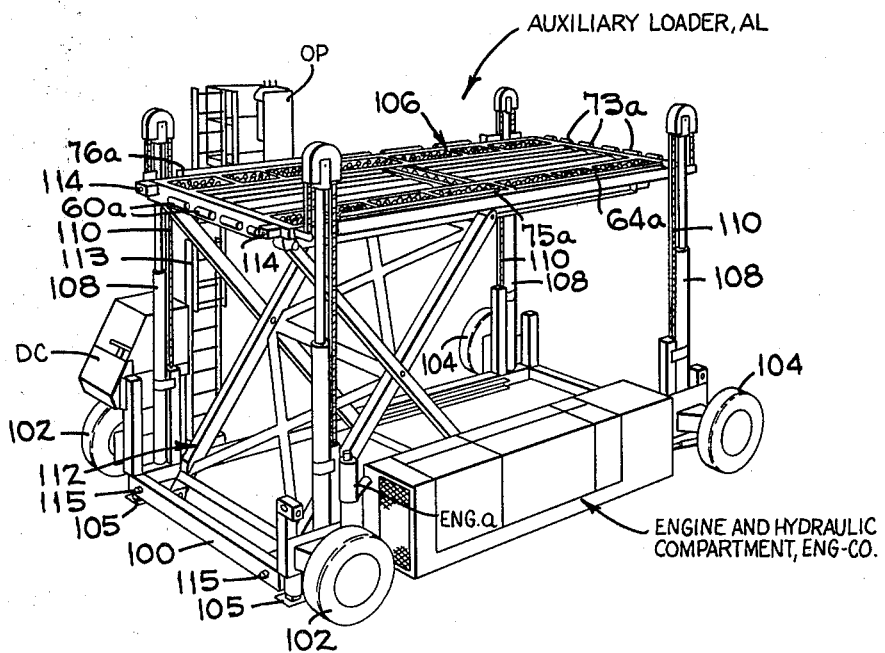
FIG_5

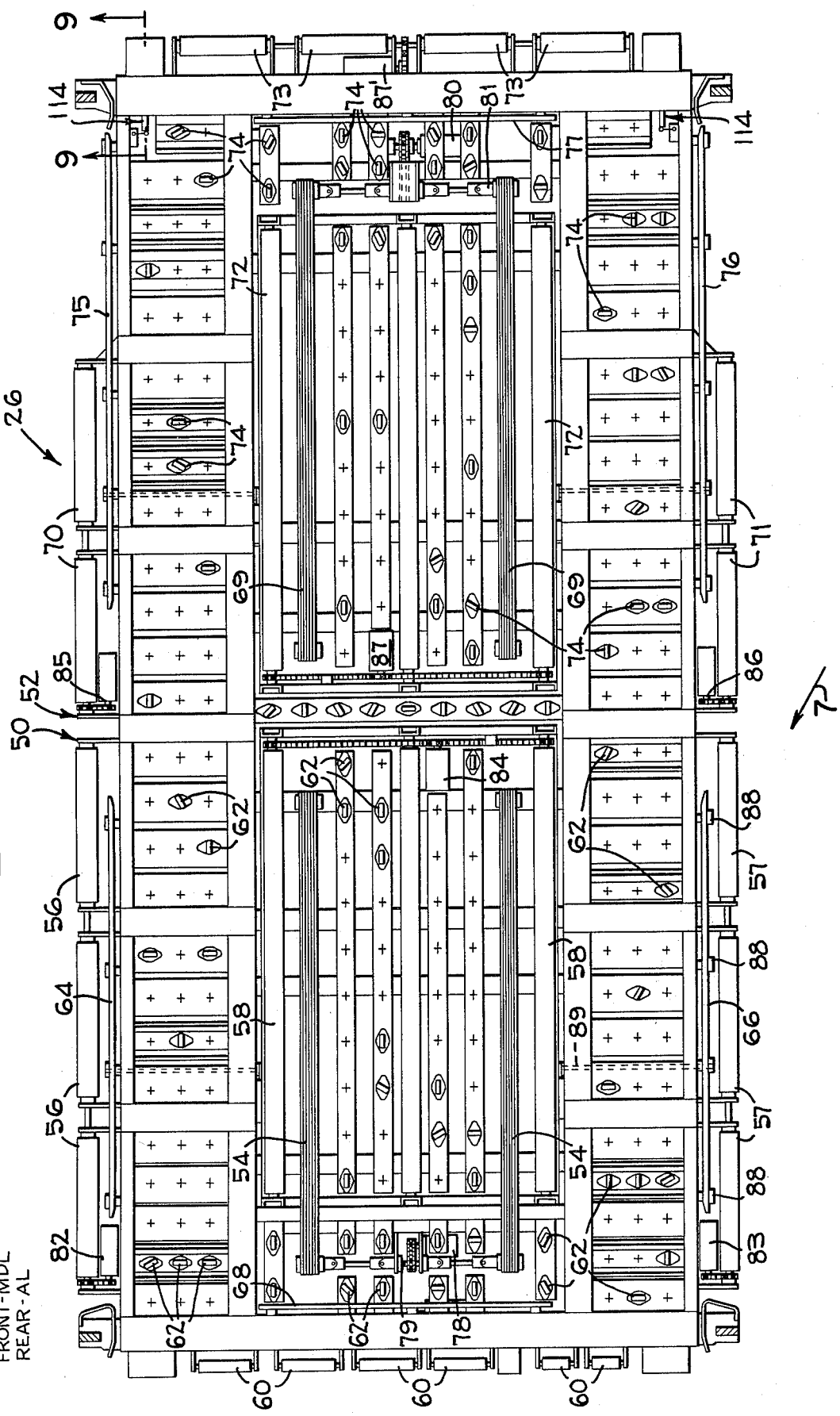

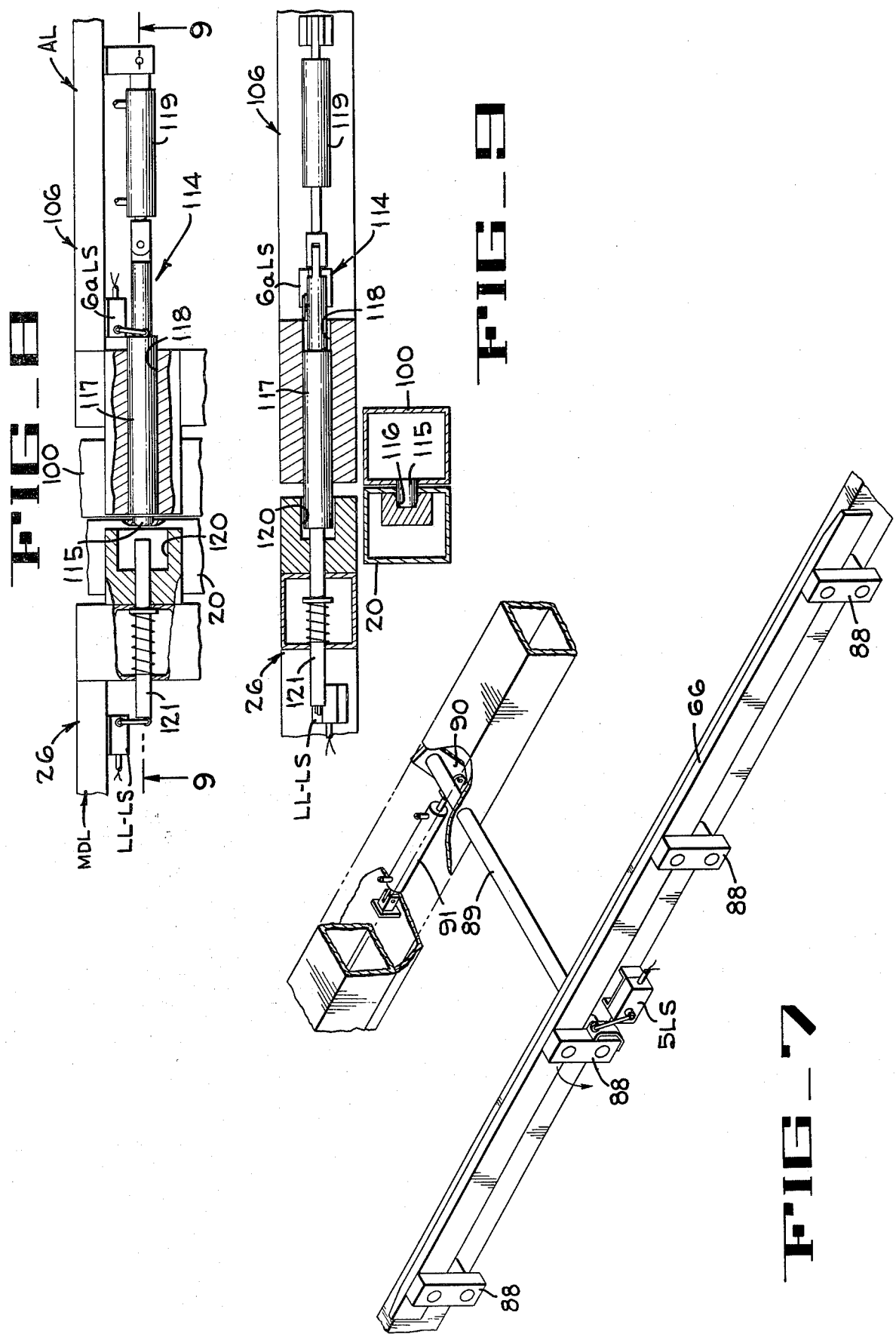

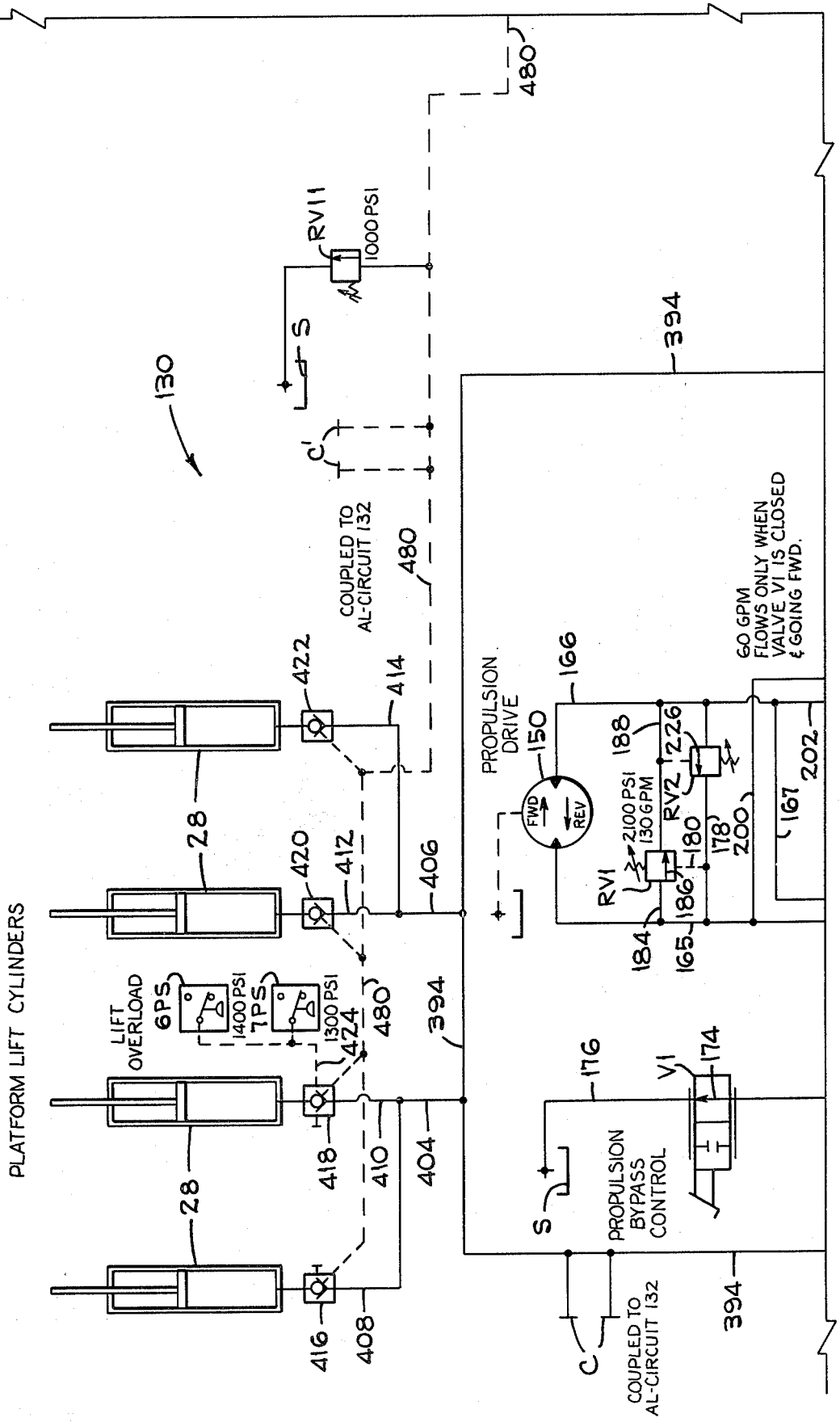

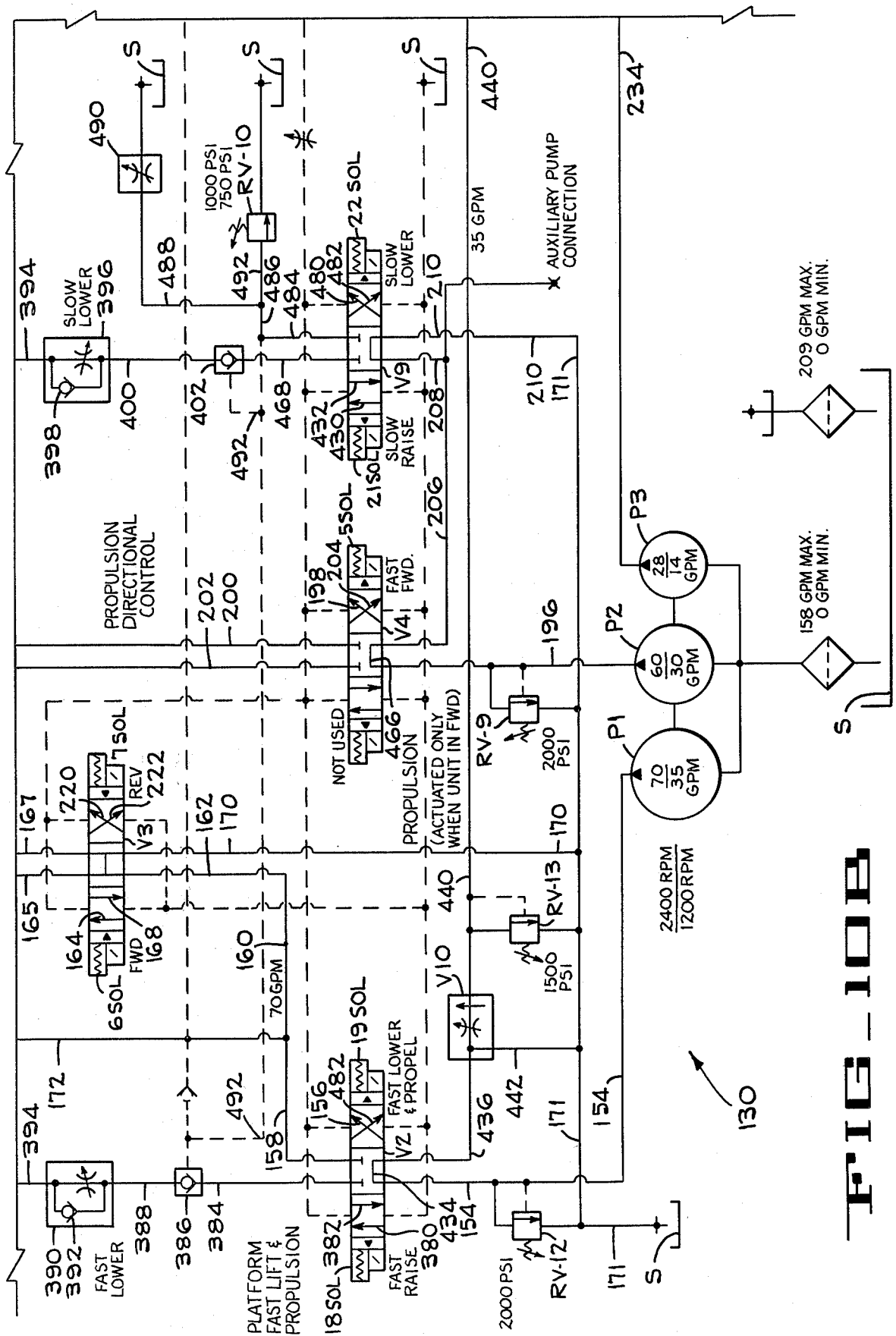
FIG_10B

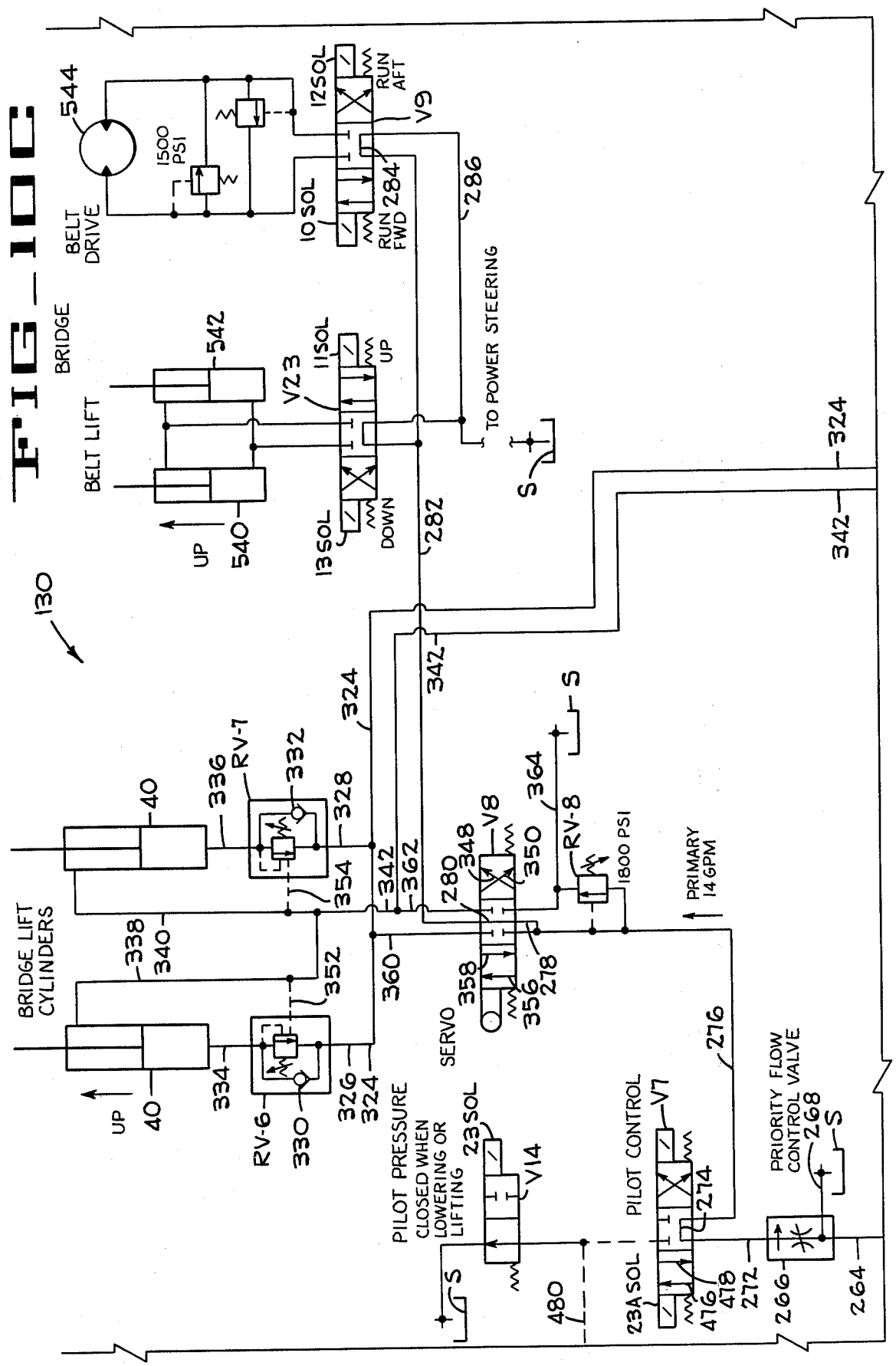

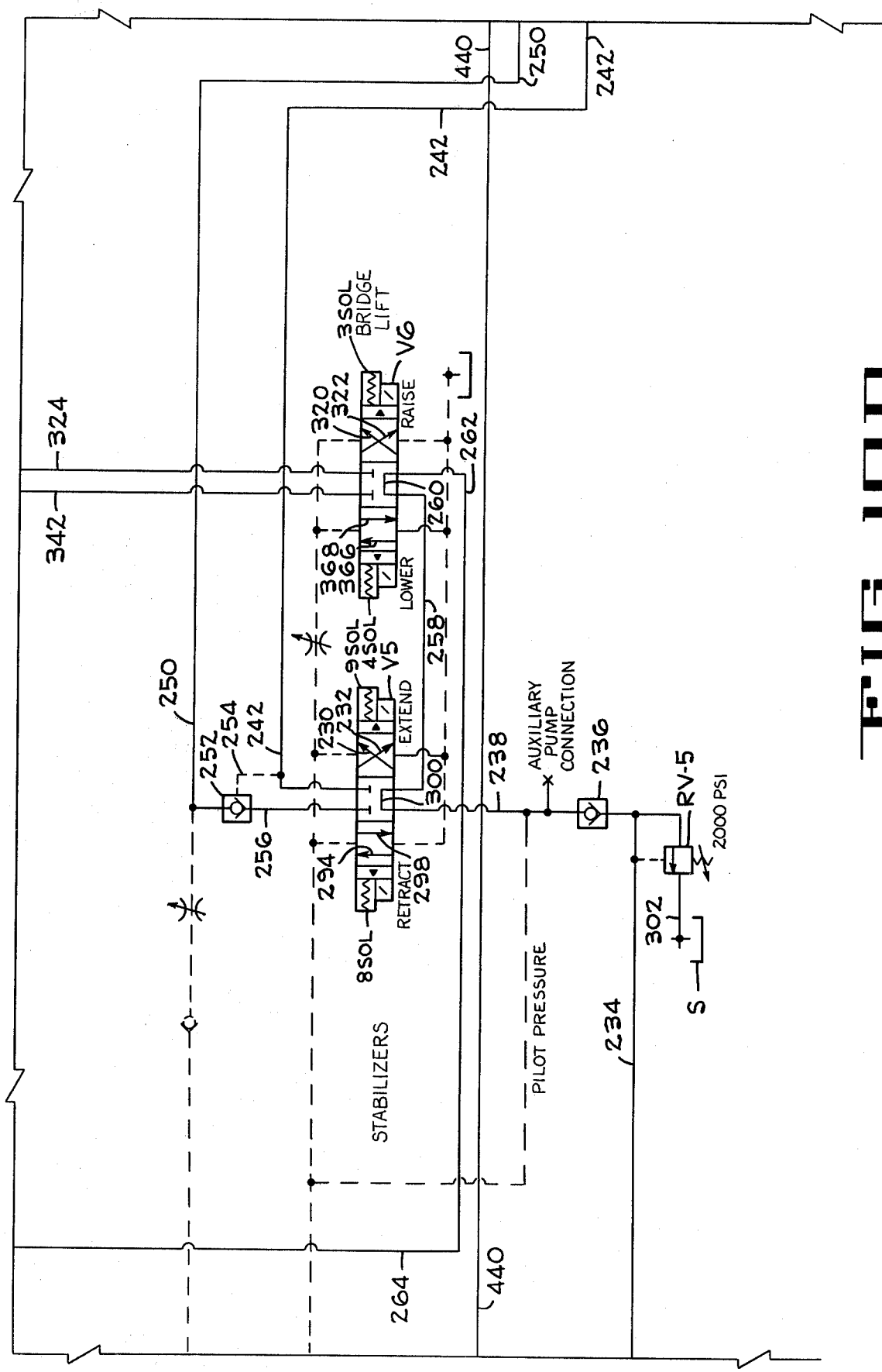

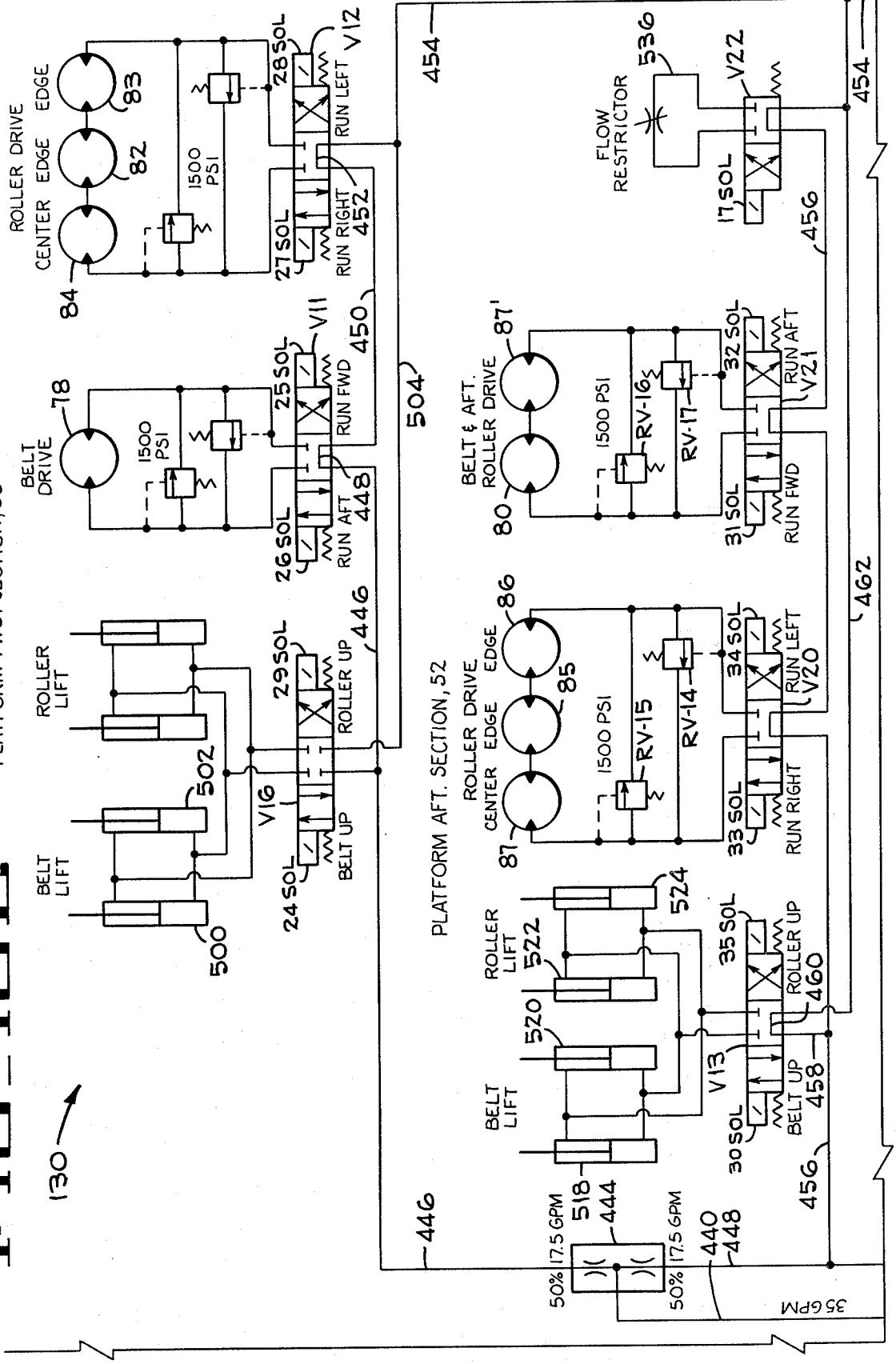

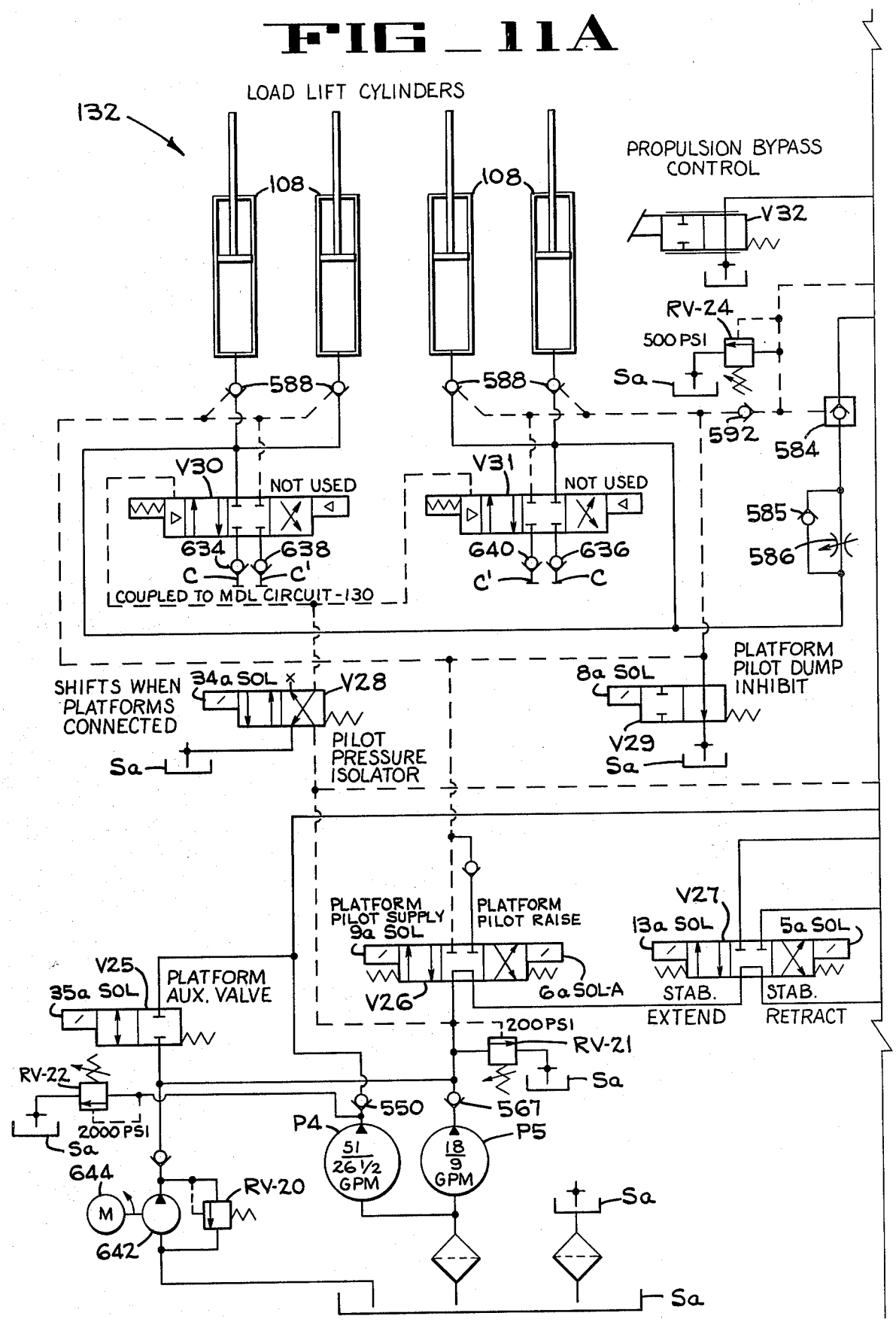

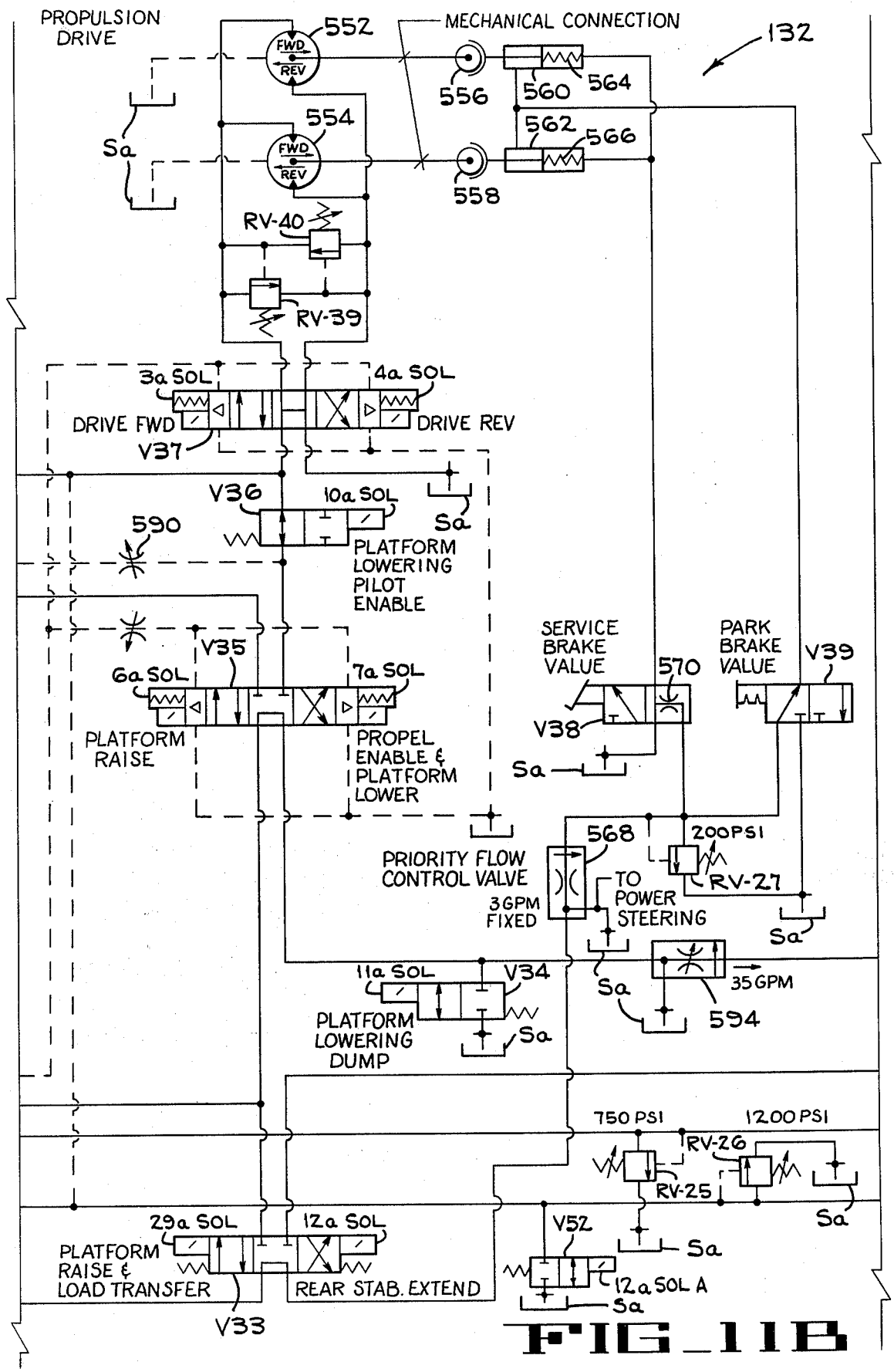
FIG_11B

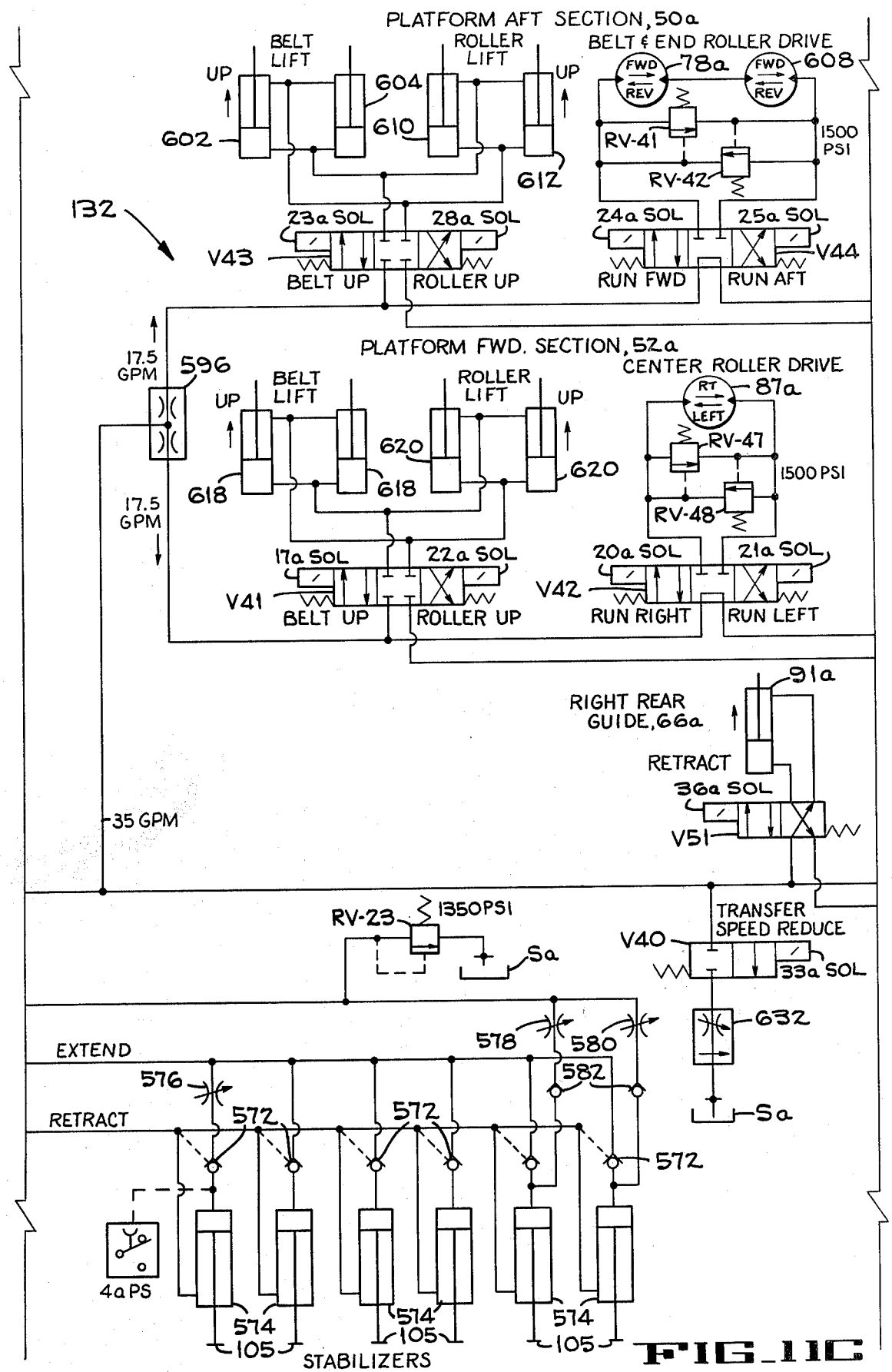
FIG_11C

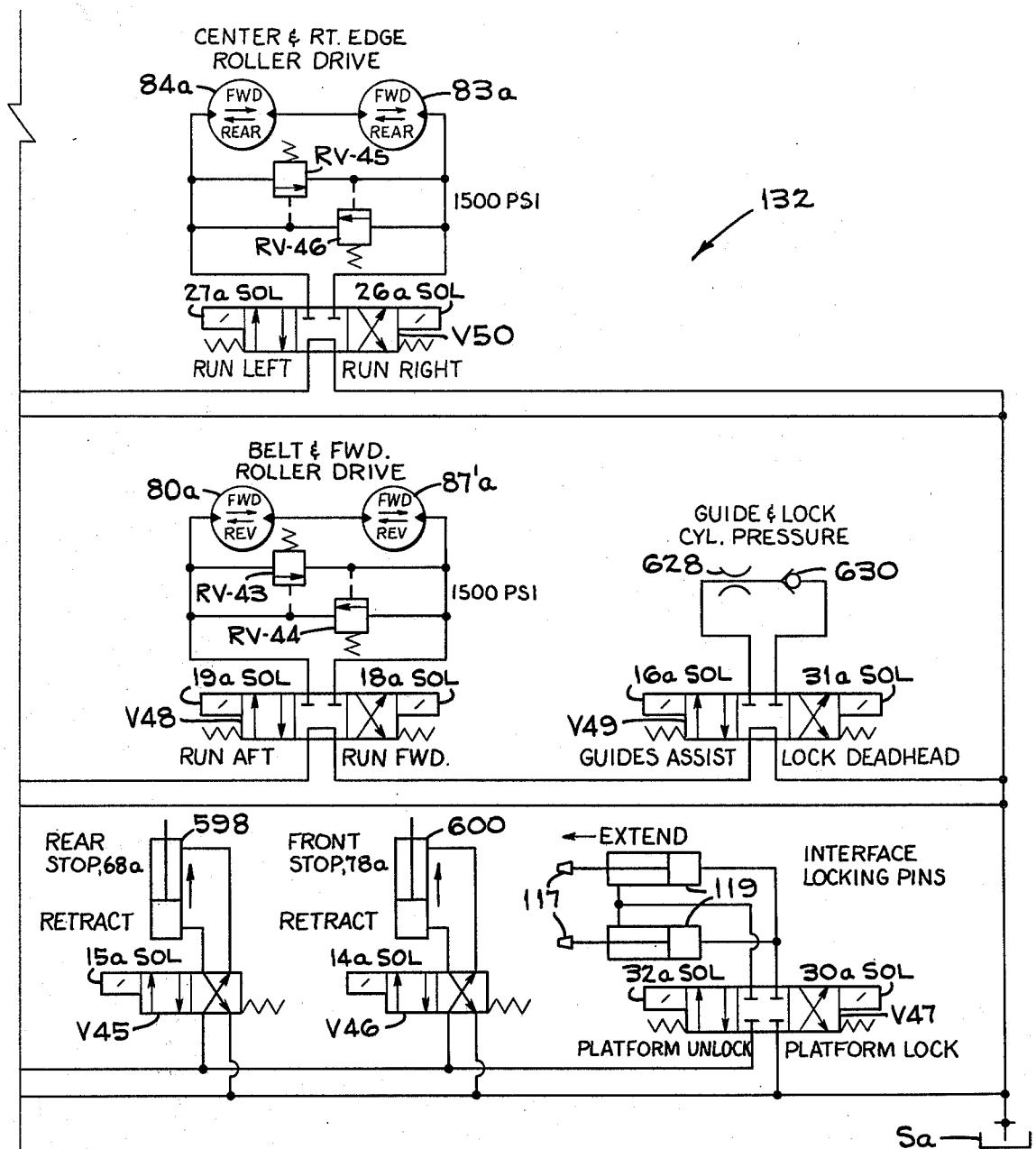
FIG_110

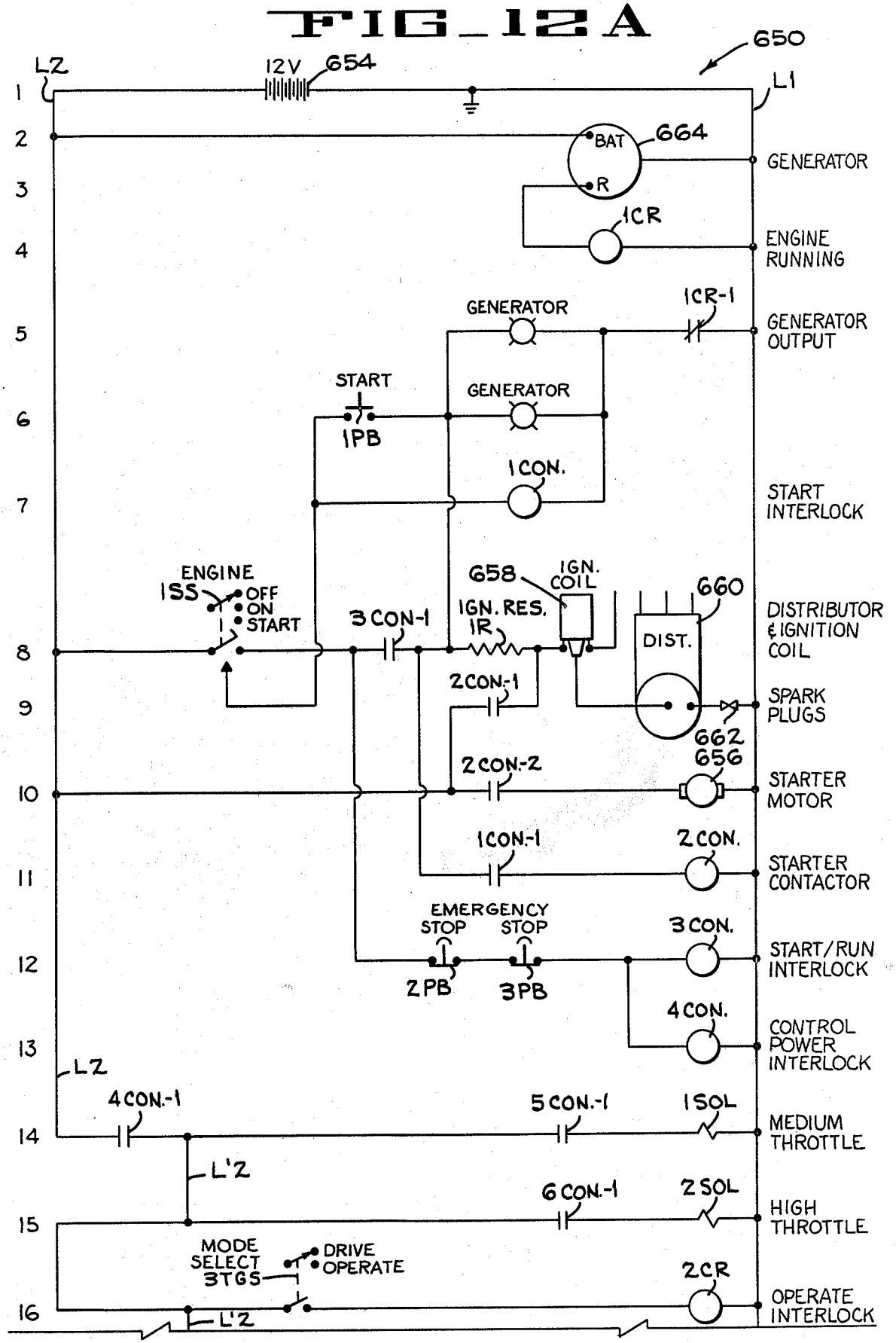

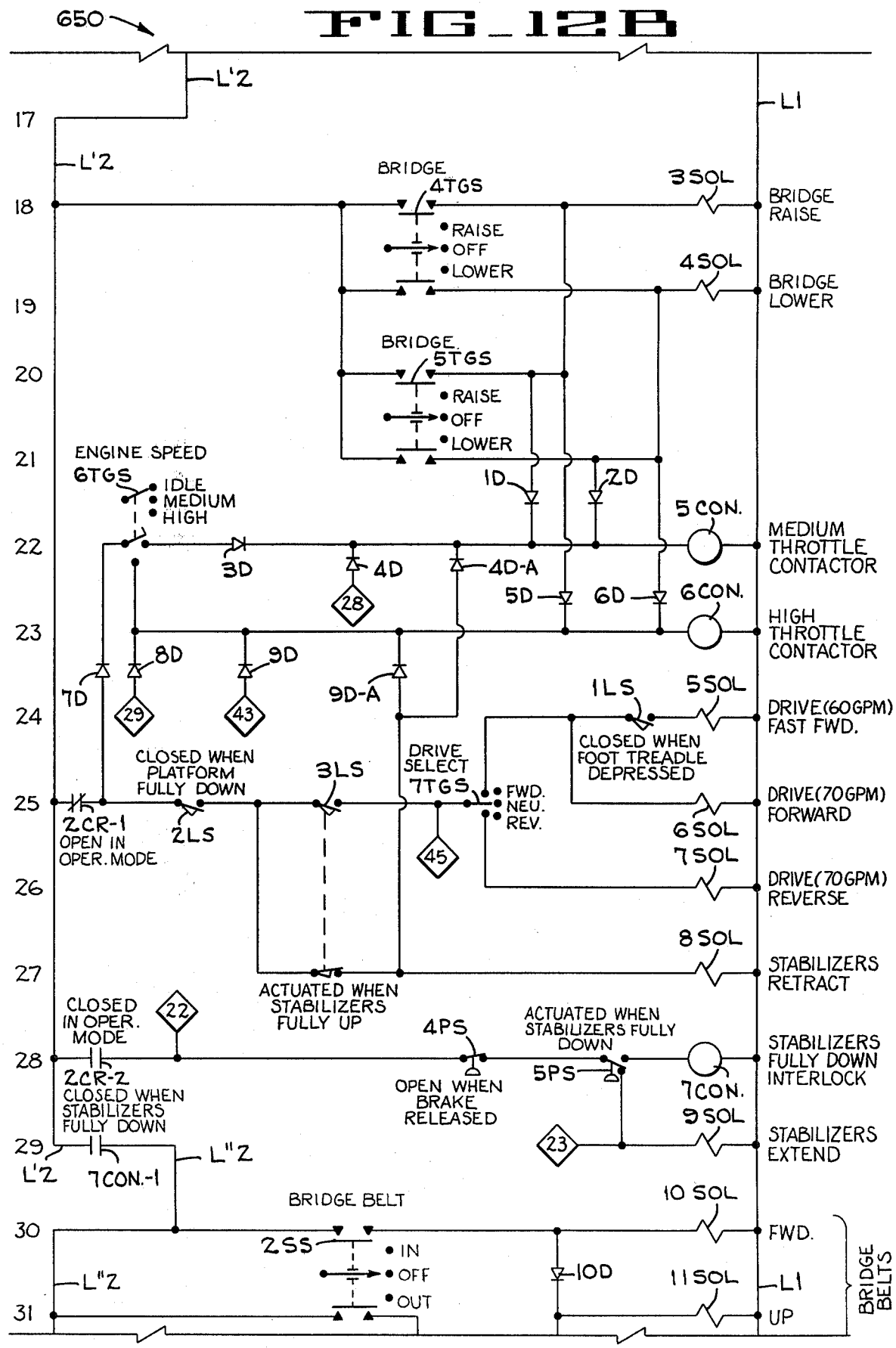

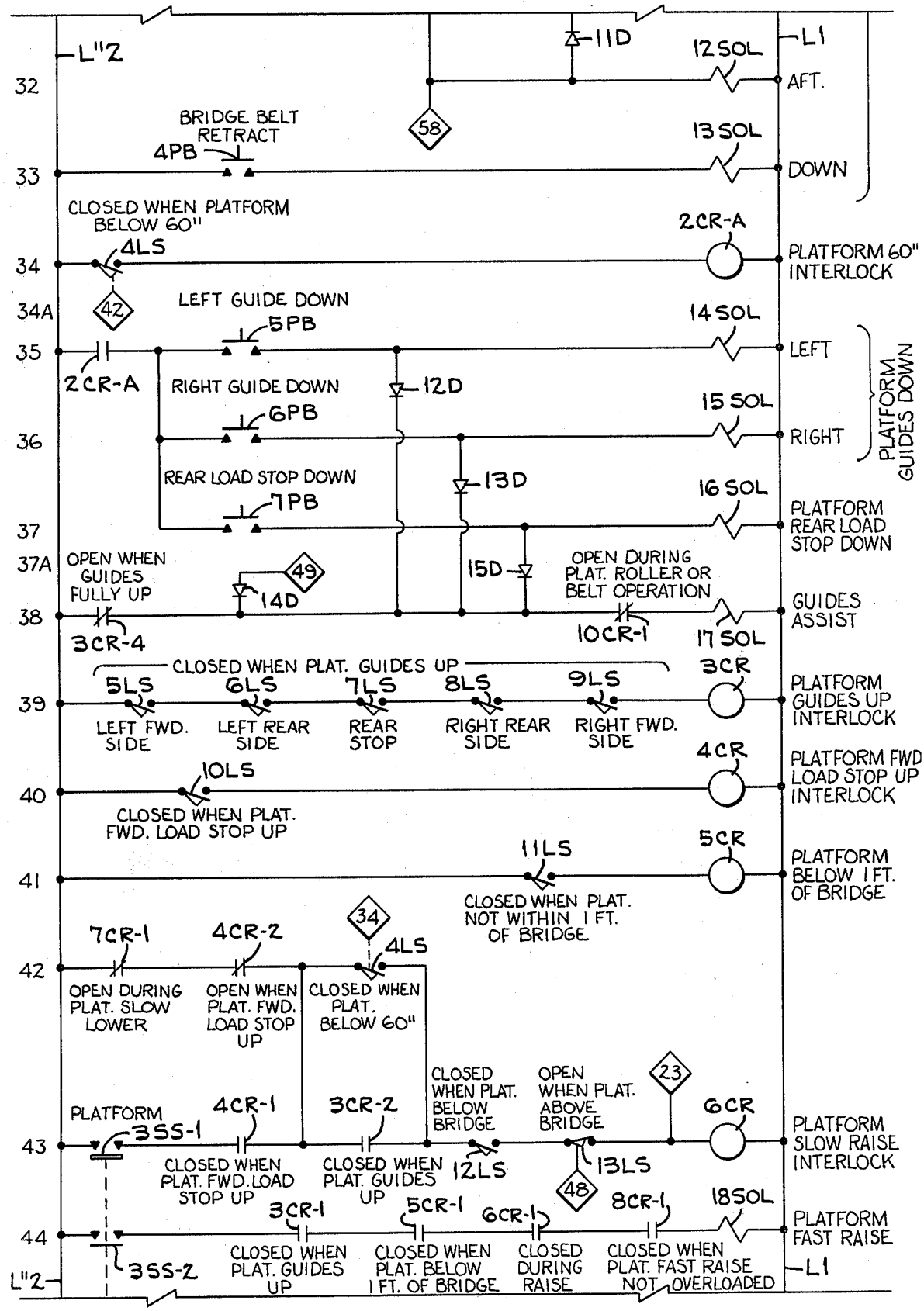
FIG_12C

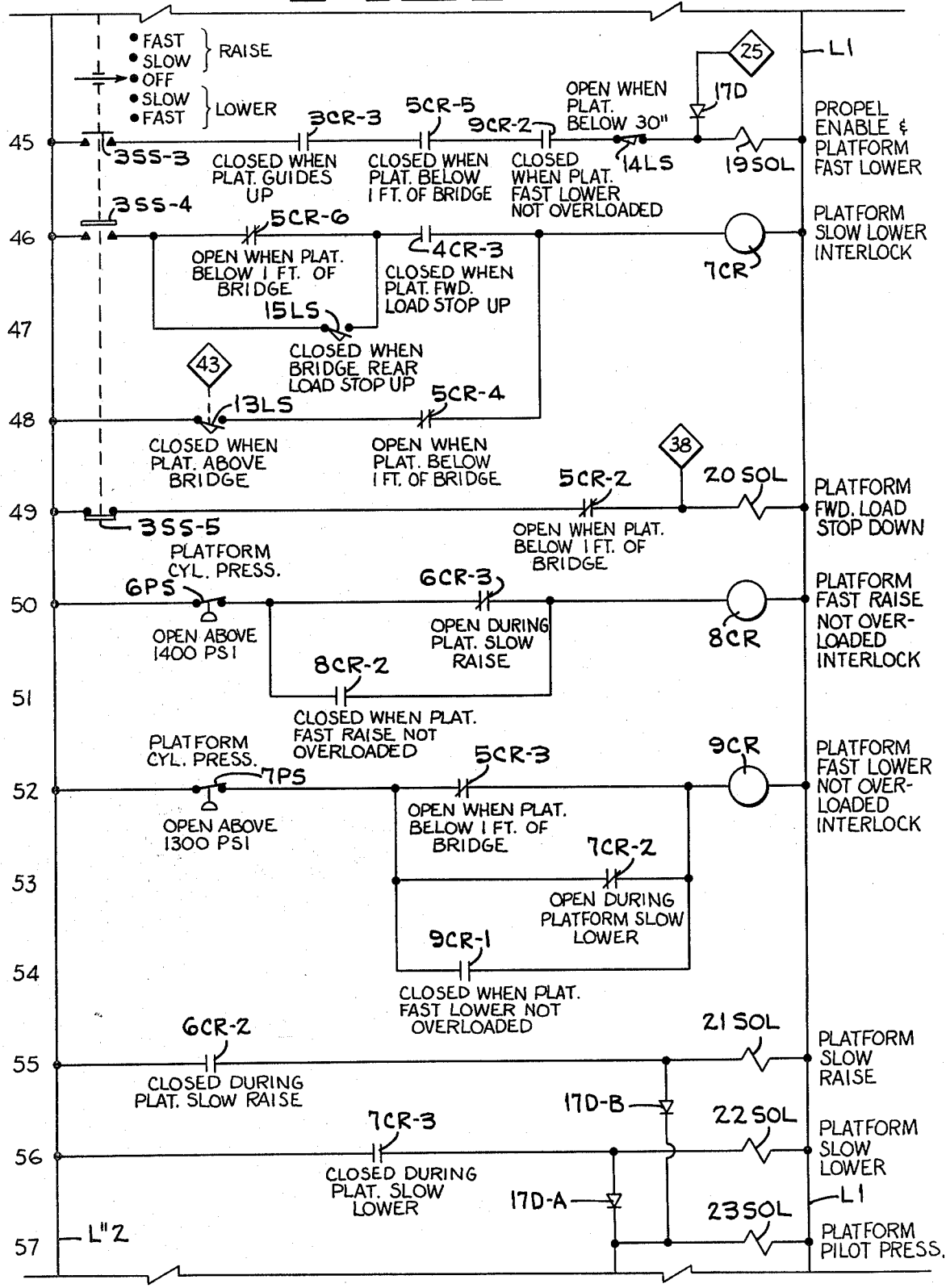
FIG_12D

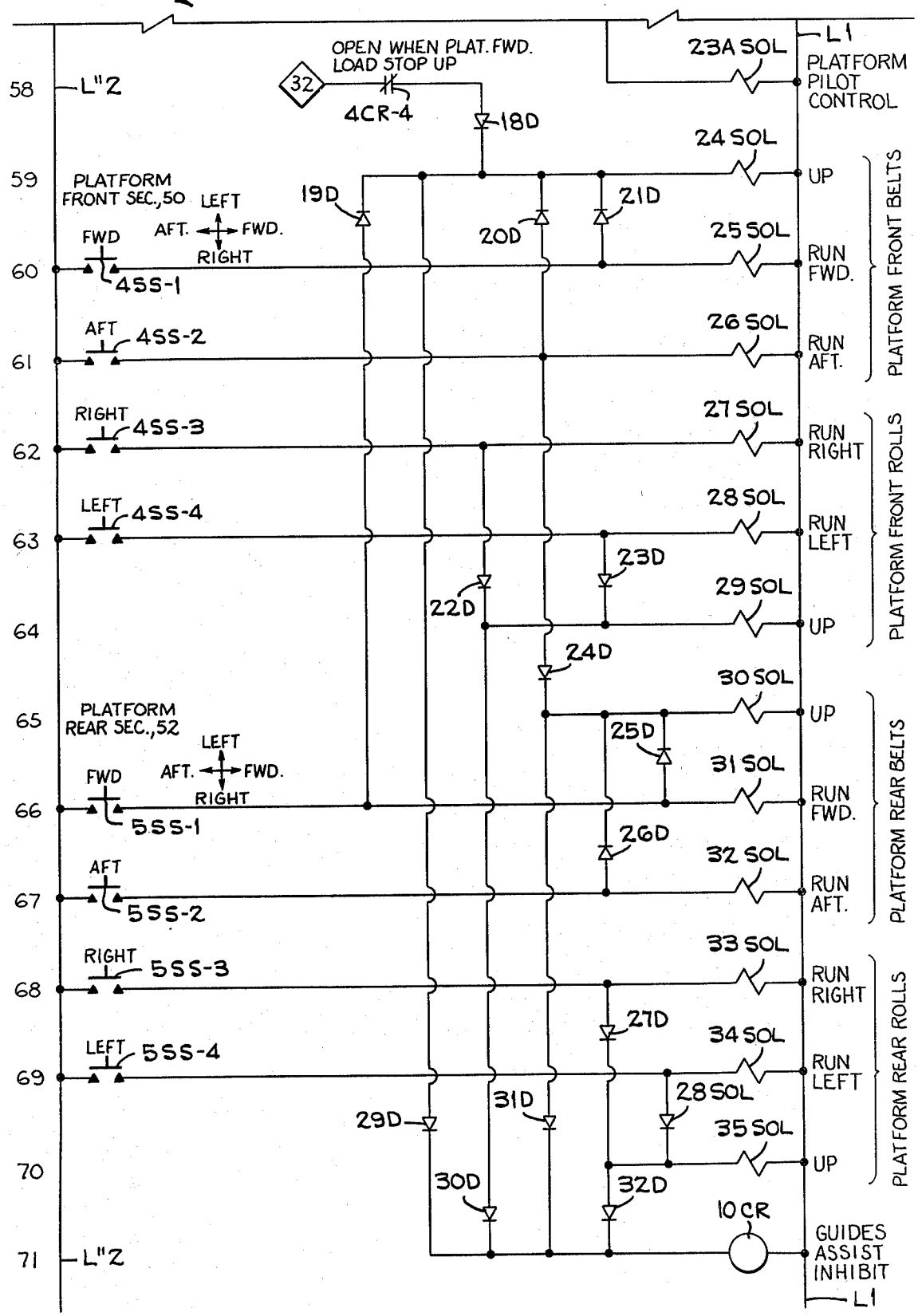

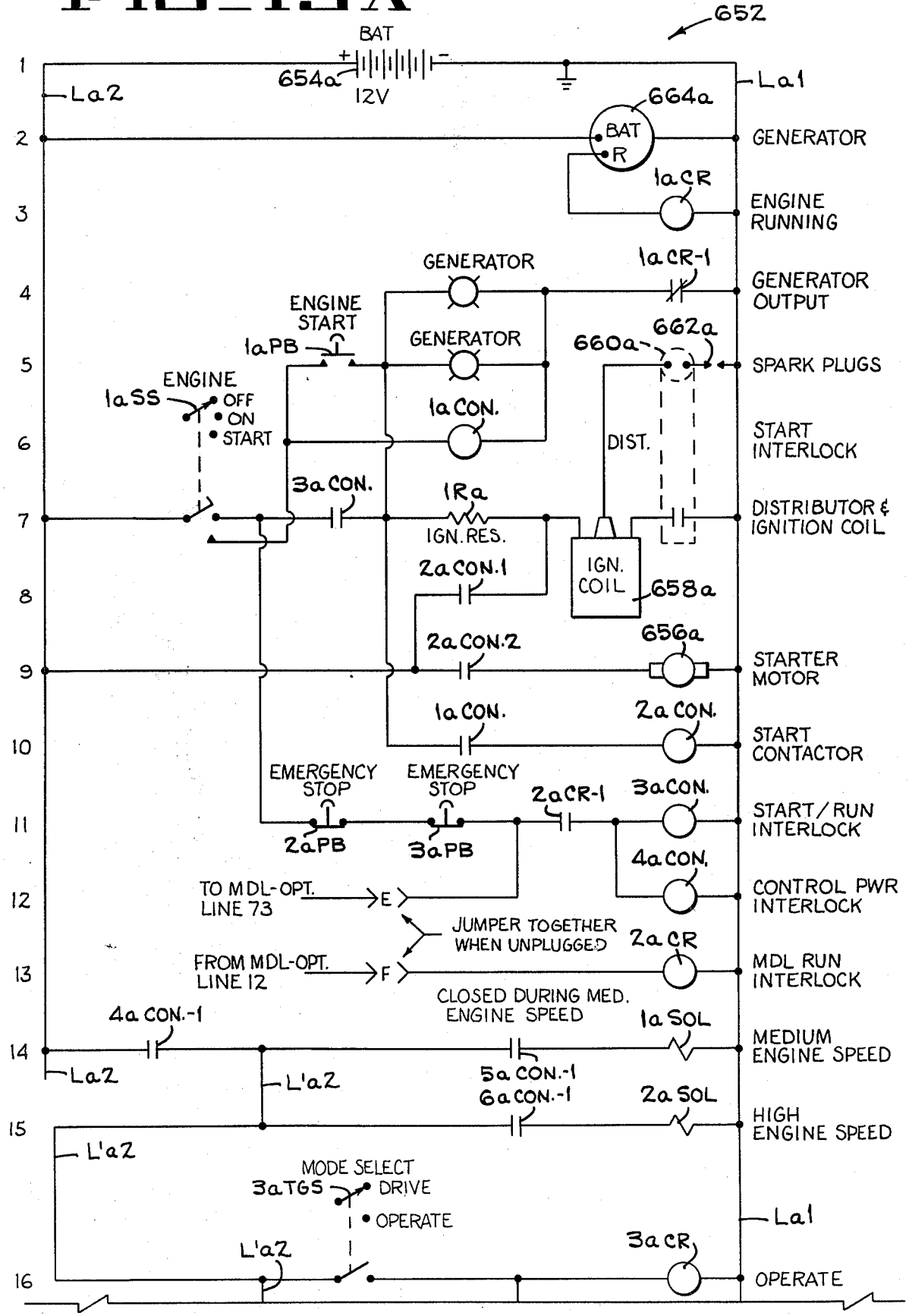

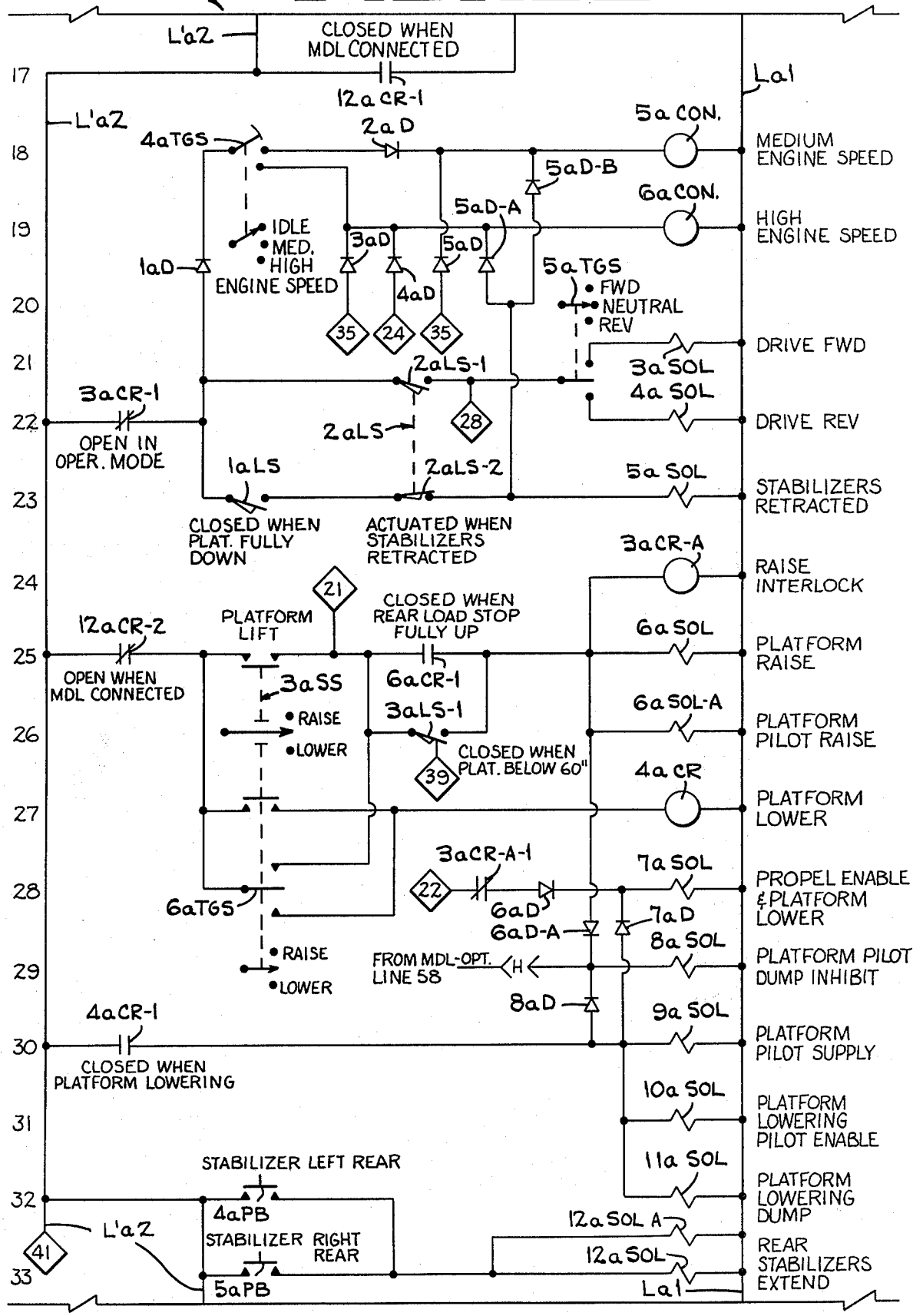
FIG_13B

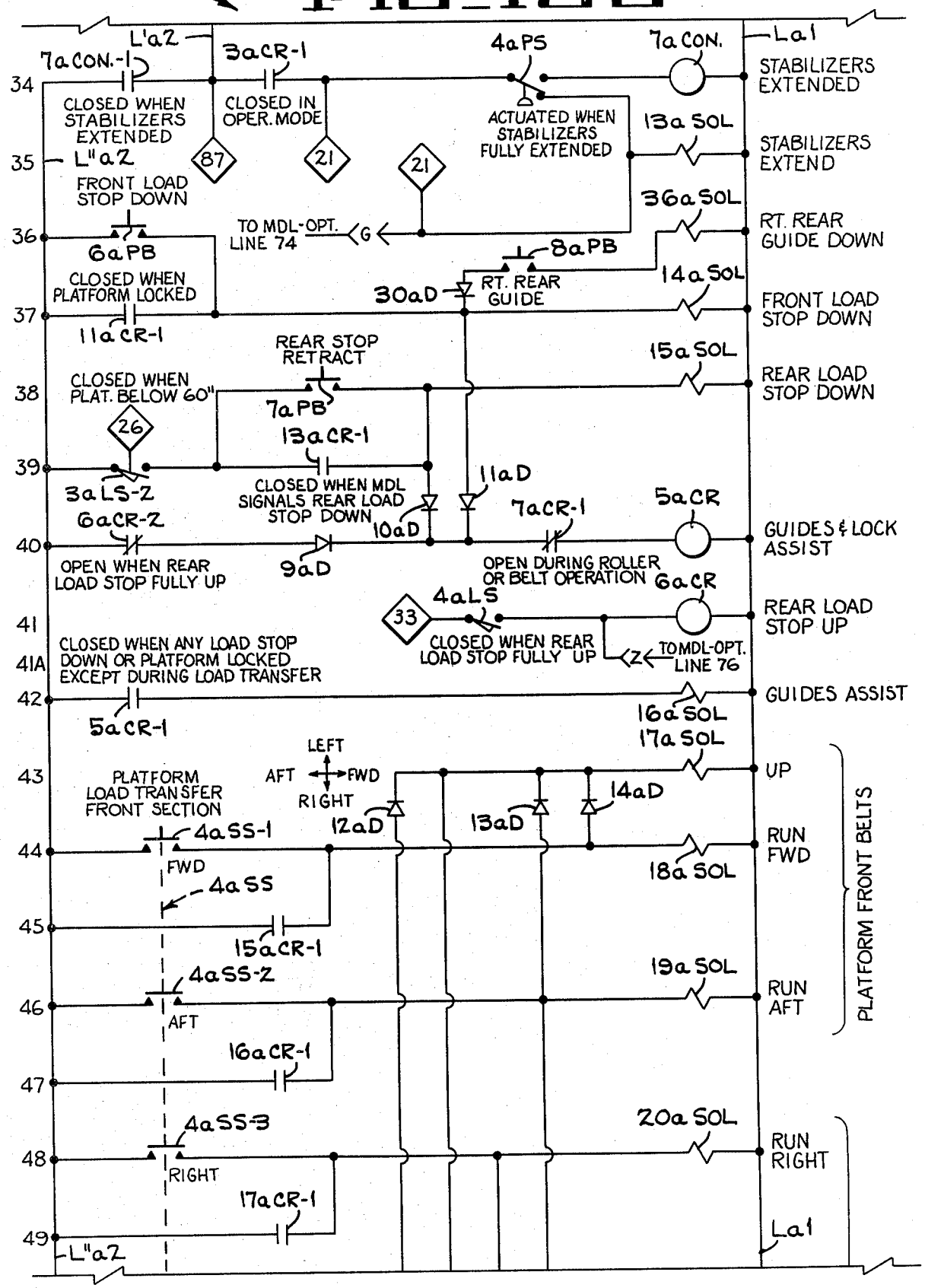

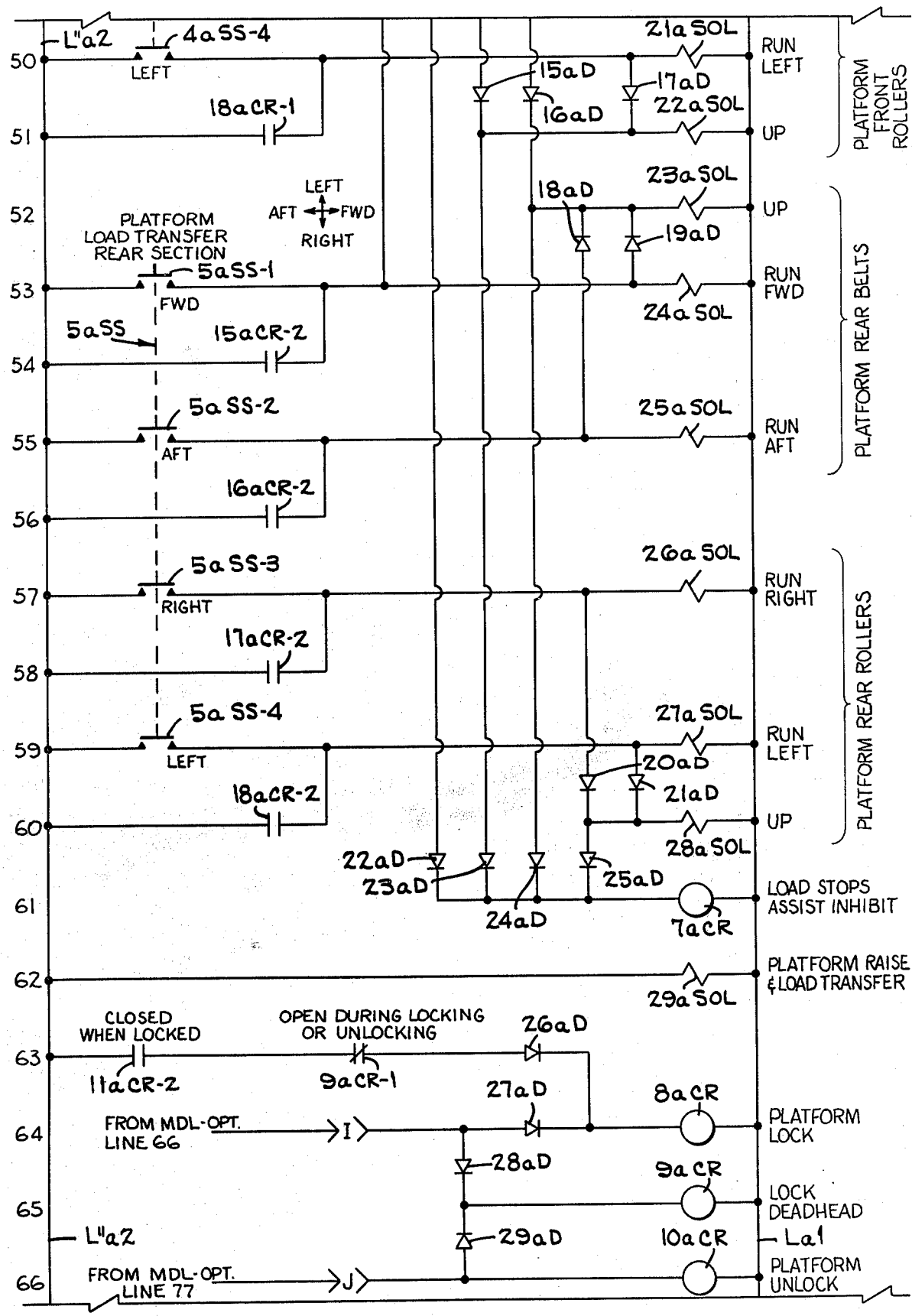

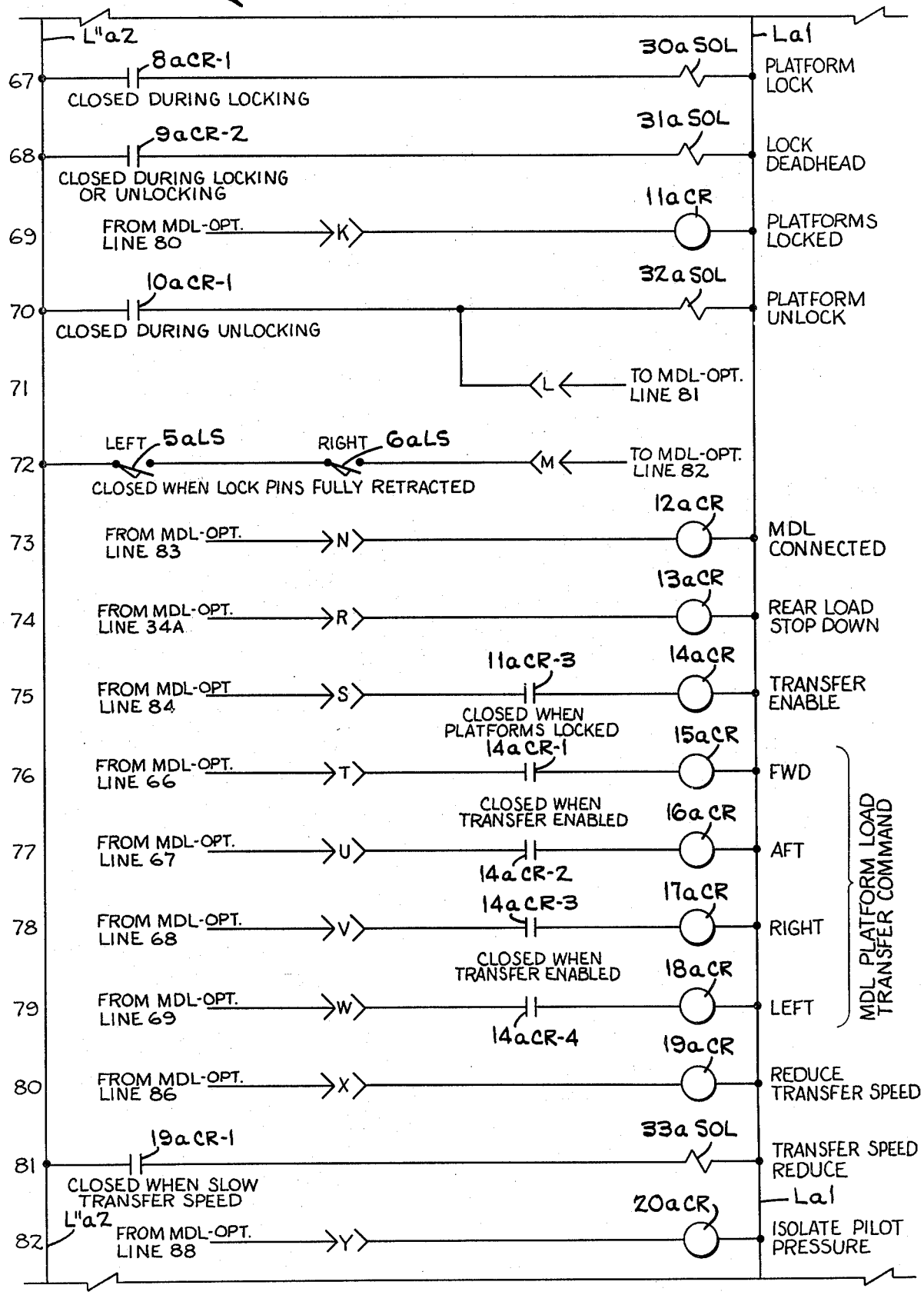
FIG_13E

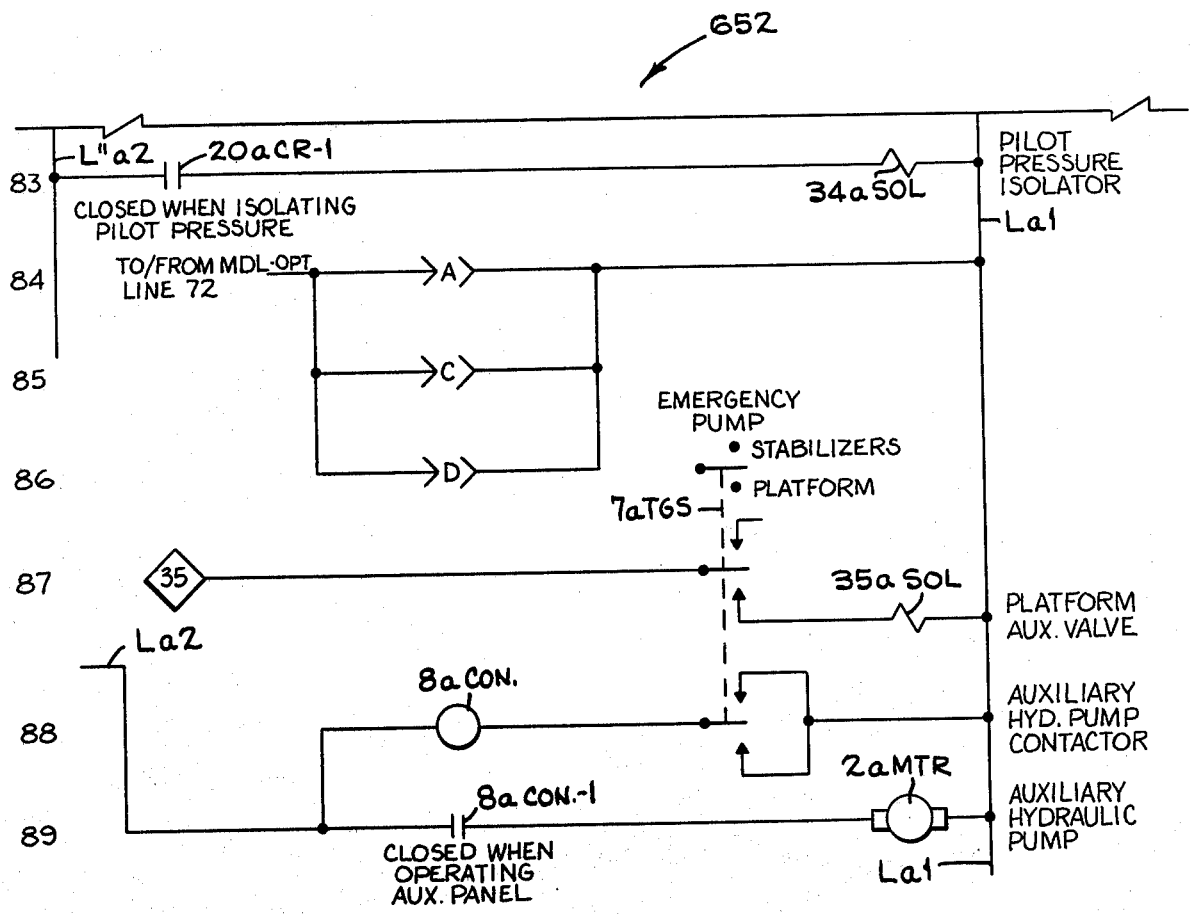
FIG_13F

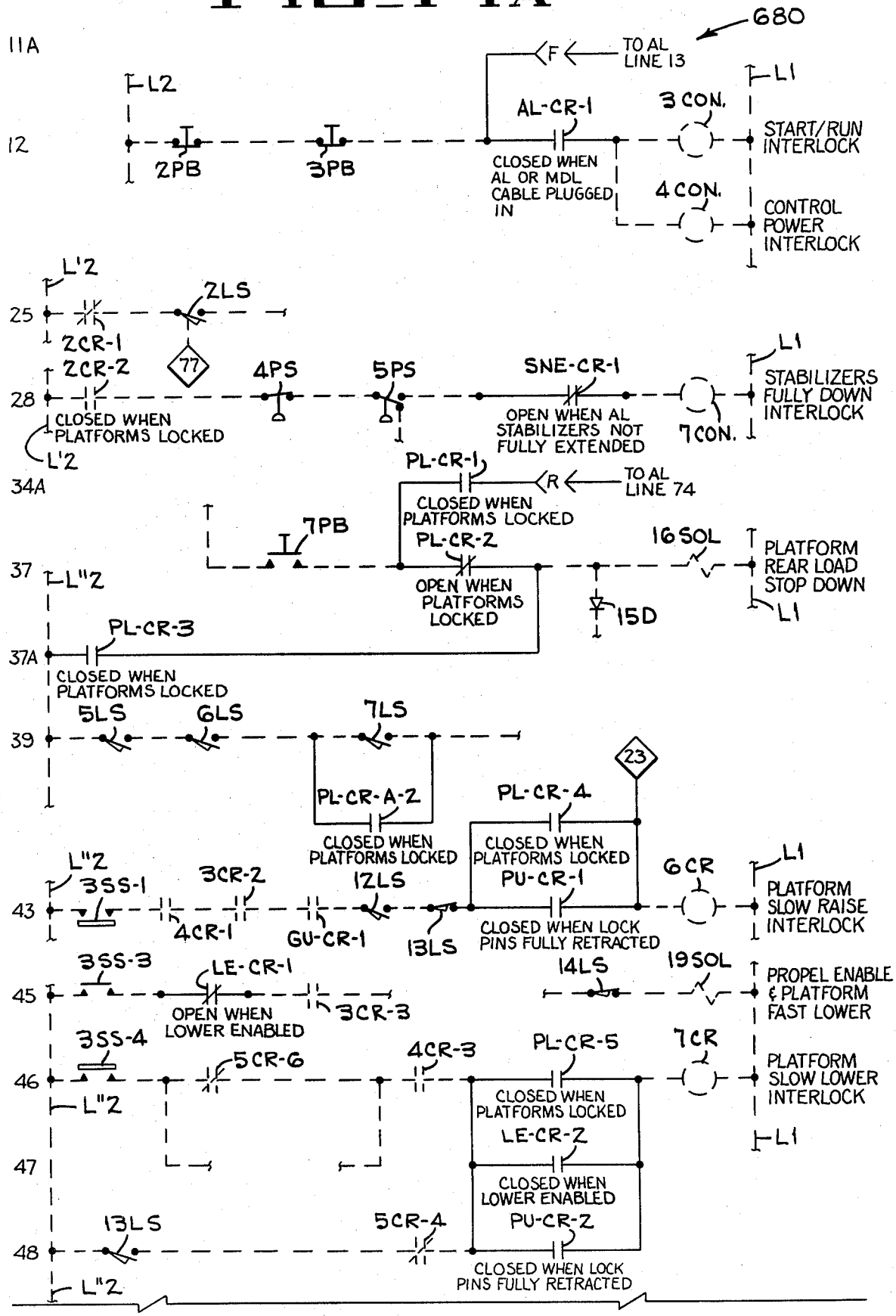
FIG_14A

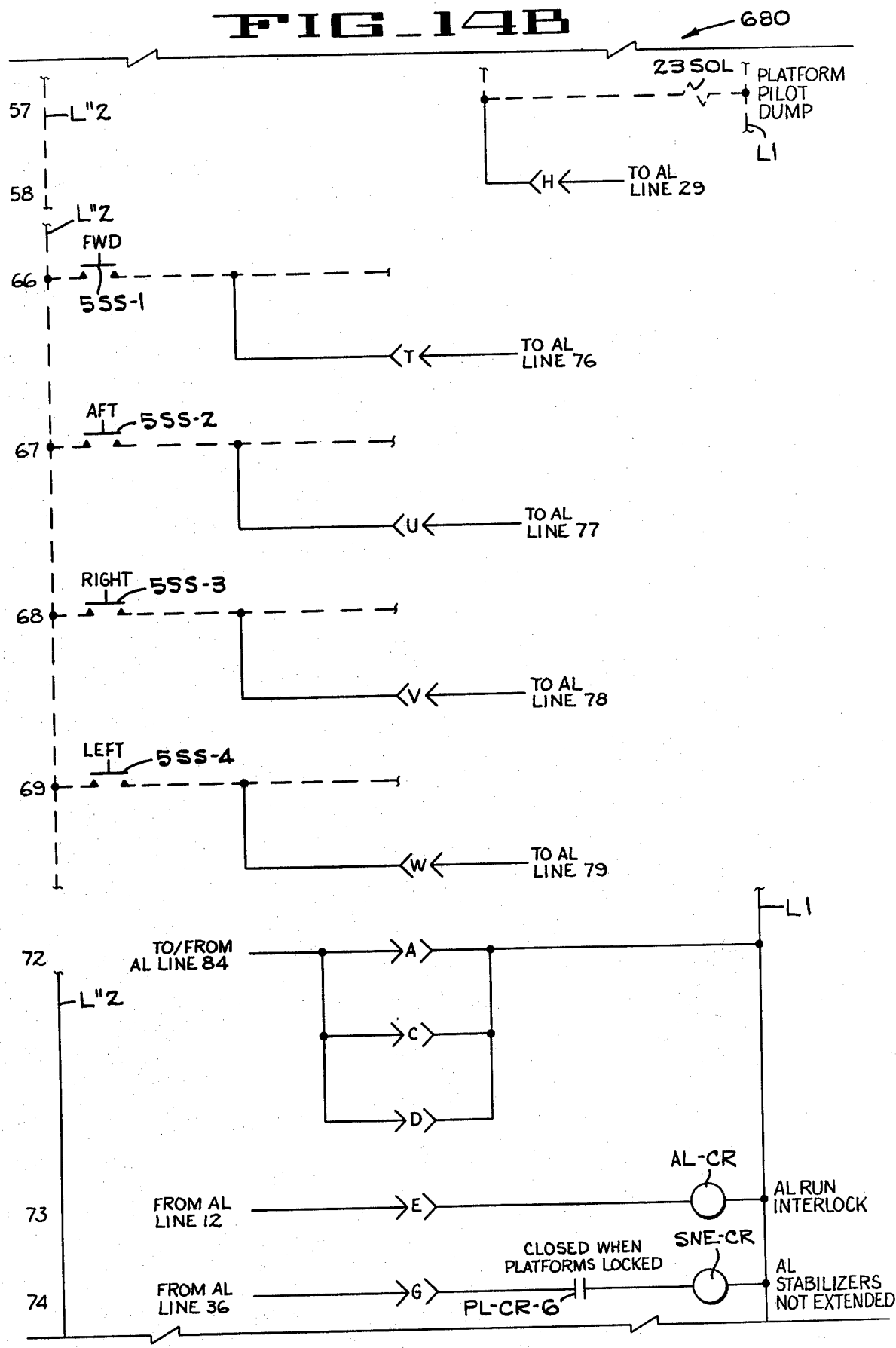
FIG_14B

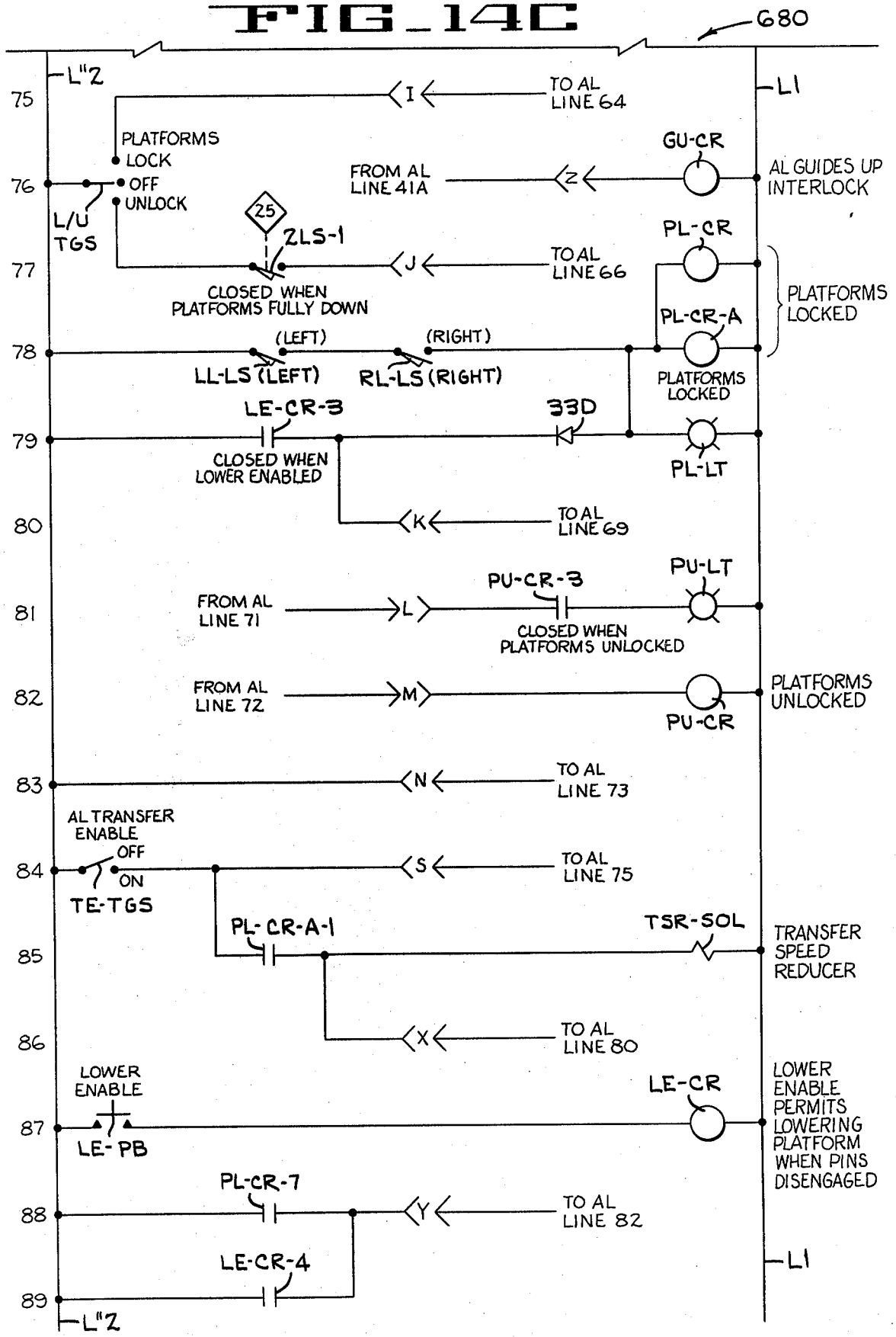
FIG_14C

AIRCRAFT CARGO LOADING METHOD AND APPARATUS

BACKGROUND OF THE INVENTION

1. Field of the Invention

The present invention relates to cargo loading and unloading apparatus and more particularly relates to two mobile aircraft loading and unloading apparatus each adapted to operate alone to load small containers into an aircraft or to operate together to handle large containers.

2. Description of the Prior Art

Apparatus for loading cargo into and unloading cargo from an aircraft are well known in the art and such apparatus is referred to herein as an aircraft cargo loader although it will be understood that the subject aircraft loading method and apparatus performs both the loading and unloading functions.

One such prior art cargo loader is disclosed in U.S. Pat. No. 3,666,127 which issued to Guyaux on May 30, 1972 and is assigned to the assignee of the present invention. The Guyaux loader transfers relatively small containers into and out of the aircraft through a cargo opening in the side of the aircraft. The Guyaux loader is self-propelled, is driven into position adjacent the cargo opening and is then connected to the aircraft by an adapter carried on the forward end of a vertically movable bridge. A main deck or platform is disposed rearwardly of the bridge and is elevated between a low container receiving position and an elevated position wherein the forward end of the platform engages the rear edge of the bridge to move the upper surfaces of both the bridge and platform into substantially planar alignment with the cargo supporting surface of the aircraft. Scissors assemblies are provided in the Guyaux structure for guiding the bridge and platform during their vertical movement.

Very large cargo aircraft such as Boeing 747's are now available with the cargo being loaded into the aircraft by opening a tilt-up nose to expose the very long 140 foot (43 m) cargo area of the aircraft. The air cargo handling industry and its customers not only require loaders capable of transferring small containers weighing up to about 60,000 pounds (27,200 kg) and up to about 20 feet long and 8 feet wide into the aircraft; but also require an aircraft loader capable of handling 120,000 pounds (54,400 kg) in large containers that are about 40 feet long and 8 feet wide. The term "container" as used herein is known in the air cargo industry as a unit loading device (ULD), and includes both closed containers with relatively rigid bases as well as the illustrated pallets having rather flexible bases with loads of cargo secured thereto.

SUMMARY OF THE INVENTION

The aircraft cargo loading method and apparatus of the present invention includes a main deck loader and an auxiliary loader each of which is a mobile self-propelled unit and may be used independently to load and unload small containers from aircraft, or may be placed in end-to-end alignment and have their platforms coupled together to load and unload 40 foot containers.

When the main loader and auxiliary loader are in end-to-end alignment, operators on the bridge section of the main loader and an operator on the auxiliary loader have controls at their stations for controlling the loading of small containers by maintaining the platform of the auxiliary loader at a lower elevation for receiving and discharging containers between its platform and the airport cargo handling facilities, such as mobile trailers having driven rollers thereon for assisting the loaders in moving containers on or off the trailers. When handling small containers the operator actuates certain control for operating power means on the auxiliary loader thereby selectively cuasing rollers or belts on the auxiliary loader platform to move the small containers longitudinally or transversely thereon. In this way the containers are aligned with the longitudinal axis of the aircraft and are transferred onto the platform of the main loader when the two platforms are brought into substantially planar alignment. The operator then selectively actuates controls for operating power means on the main loader for raising the small container and thereafter advancing the container into the aircraft.

In response to not only aligning the two loaders in end-to-end relationship, but also coupling the main and auxiliary platforms together; the single operator may selectively manipulate controls to raise or lower both platforms simultaneously using power from the main loader, at which time the platforms are moved at about one-half the speed of raising or lowering the main platform alone. When the main loader and auxiliary loader platforms are coupled together, the single operator actuates controls for selectively operating power means on the auxiliary loader which drives rollers and belts thereon; and also selectively operates power means on the main loader for driving rollers and belts thereon which cooperate with the auxiliary rollers and belts for moving the containers forwardly, rearwardly, or transversely of the auxiliary and main platforms.

Apparatus for transferring both large and small containers into and out of aircraft is disclosed and comprising: means defining a mobile main loader movable into position adjacent an aircraft for changing the elevation of and for transferring containers between the aircraft and airport cargo handling facilities, and means defining a mobile auxiliary loader movable into abutting engagement with said main loader and cooperating with said main loader for supporting and changing the elevation of containers too large to be supported by either loader alone and for transferring the large containers between the aircraft and the airport cargo handling facilities.

A method of using a main loader and an auxiliary loader for transferring both large and small containers between the floor of airport cargo handling facilities and the floor of the cargo area of an aircraft is disclosed with the main loader and auxiliary loader each being of sufficient length to accommodate only a small container and each having a container supporting surface; the disclosed method comprising the steps of: moving said main loader into container transfer position adjacent the cargo area of an aircraft; moving said auxiliary loader into container transfer position adjacent said main loader; transferring a container onto at least one of said loaders from said aircraft cargo area or from airport cargo handling facilities; when said container is a large container, moving said container horizontally into position to be at least partially supported by each of said loaders, changing the elevation of said container between the container supporting plane of said airport cargo handling facility and the plane of the floor of the cargo area of the aircraft, and transferring the container horizontally off said loaders onto the planar aligned floor.

BRIEF DESCRIPTION OF THE DRAWINGS

FIG. 1 is a diagrammatic perspective from the rear and right side of the main deck loader and auxiliary loader of the present invention when connected in end-to-end alignment and to the cargo opening in the nose of an aircraft to be loaded or unloaded, said view also illustrating a large forty foot long container elevated into position to be transferred into the aircraft.

FIG. 2 is a perspective of the main deck loader taken from the front and left side with the bridge and main platform in their lowermost positions.

FIG. 3 is a perspective of the main deck loader taken from the rear and right side with the main platform and bridge in raised transfer position, and further illustrating the platform squaring scissors and the main loader stabilizers in a lowered operative position.

FIG. 4 is a perspective of the auxiliary loader taken from the right rear illustrating the auxiliary platform in a raised position and squared by a scissors assembly and further illustrating the auxiliary stabilizers in their lowered loader supporting positions.

FIG. 5 is a perspective of the auxiliary loader taken from the left front illustrating the platform in an elevated position.

FIG. 6 is a plan of the main platform of the main deck loader illustrating the locations of the several groups of rollers and belts certain of which are selectively raised into operative position for moving the containers longitudinally or transversely relative to the main platform.

FIG. 7 is a diagrammatic perspective illustrating one of the conventional lift mechanism for the several components of the main platform, the lift mechanism for the left front quide rail being illustrated in the raised position and being taken looking in the direction of arrow 7 in FIG. 6.

FIG. 8 is a fragmentary plan of the right rear corner of the main platform when it is disposed immediately adjacent the right front corner of the auxiliary platform of the auxiliary loader prior to coupling the two platforms together.

FIG. 9 is a vertical section taken generally along lines 9-9 of FIGS. 6 and 8, but with the platforms and chassis being illustrated coupled together and with the platforms being in their lowermost positions.

FIGS. 10A-10F, when combined at the marginal lines, illustrated components of the main hydraulic circuit which components are mounted on and define the main power means for the main loader when operated alone, and also as the composite power means when the main deck loader and auxiliary loader are operated together as a unit.

FIGS. 11A-11D when combined at the marginal lines, illustrate the components of the auxiliary hydraulic circuit, which components are mounted on and define the auxiliary power means for the auxiliary loader when operated alone, and portions of which are coupled to the circuit of the main deck loader when the two loaders are coupled together to define a portion of the composite power means.

FIGS. 12A-12E, when combined at the marginal lines, illustrate the electrical circuit for the main loader and defines the control means for the main loader when operating alone, and also a portion of the composite control means for the main loader and the auxiliary loader when operated together.

FIGS. 13A-13F, when combined at the marginal lines, illustrate the electrical circuit for the auxiliary loader and defines the auxiliary control means for the auxiliary loader when operating alone, and also forms a portion of the composite control means when the main loader and the auxiliary loader are operated together.

FIGS. 14A-14C, illustrates an MDL option circuit which is incorporated in the MDL circuit when the main deck loader is to be used either alone or in combination with the auxiliary loader, said MDL option circuit forming a portion of the composite control means when the loaders are operated together.

DESCRIPTION OF THE PREFERRED EMBODIMENT

Figure 10F:
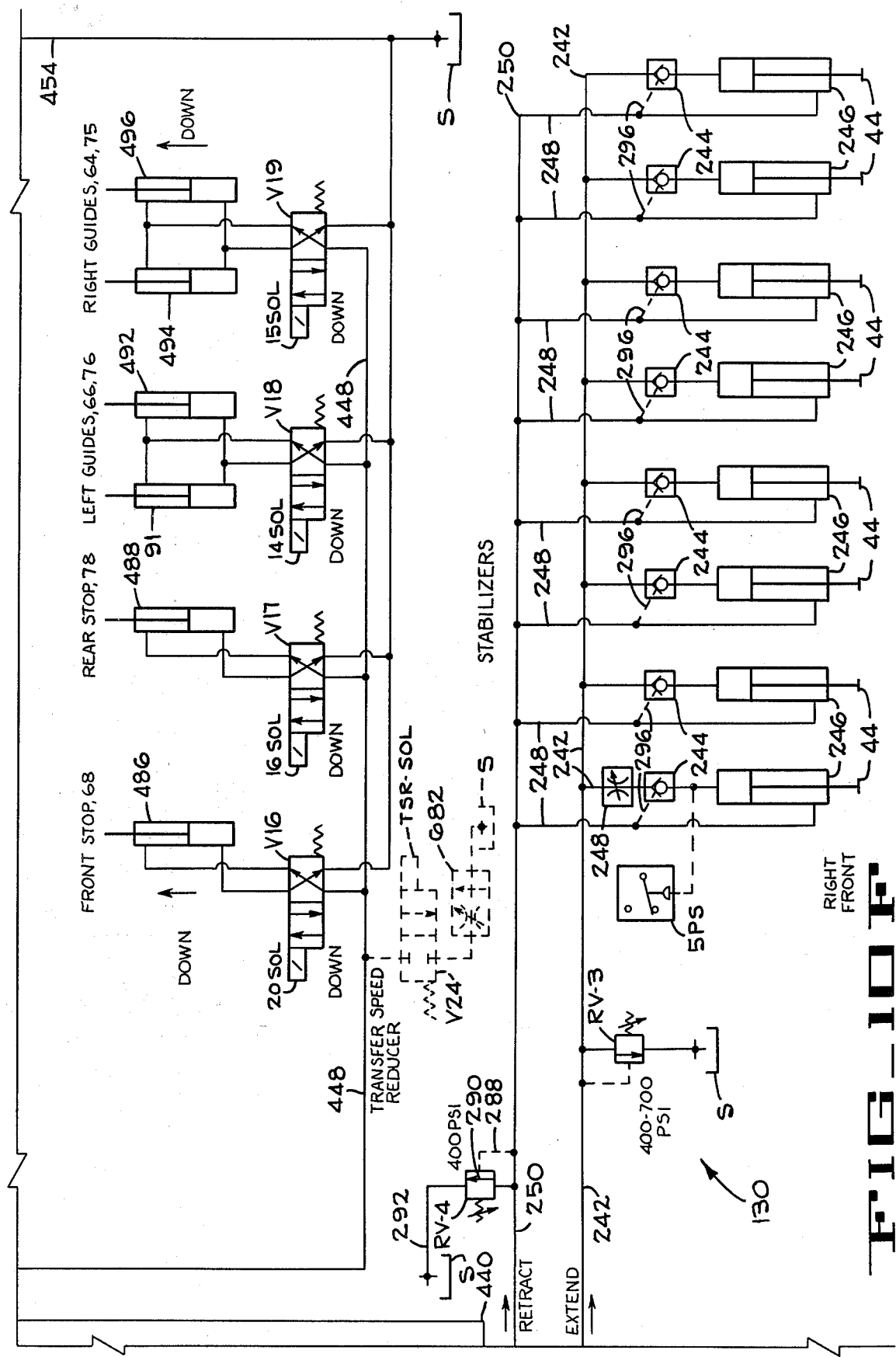

The aircraft cargo loading method and apparatus 12 (FIG. 1) of the present invention is capable of transferring containers C into and out of an aircraft A. The apparatus 12 includes a main deck loader MDL and an auxiliary loader AL each of which is a mobile, self-propelled and steerable unit; and each of which is capable of independently transferring containers that are about 20 feet (6 m) long, 8 feet (2.44 m) wide and weighing up to about 60,000 pounds (27,200 kg) into and out of the aircraft A. These 20 foot or shorter containers are defined herein as "small" containers.

The main deck loader MDL and the auxiliary loader AL may also be coupled together and be operated as a single unit to transfer containers that are about 40 foot (12 m) long, and 8 foot (2.44 m) wide and weighing up to about 120,000 pounds (54,400 kg) into and out of the aircraft A. These 40 foot containers will be referred to hereinafter as "large" containers.

As indicated in FIG. 1, when the main deck loader MDL and the auxiliary loader AL are combined to load large containers C into presently available aircraft A, such as the illustrated Boeing 747 cargo aircraft, the loaders are aligned with the longitudinal axis of the aircraft. The nose 14 of the aircraft is pivoted upwardly to expose the cargo space 16 and the container supporting floor or main deck 18 of the aircraft permitting the forward end portion of the main loader MDL to be connected to the aircraft.

Since the cargo space 16 of the illustrated aircraft A is about 140 feet (73 m) long, different combinations of large and small containers may be loaded into the aircraft. For example, if a very heavy 120,000 pound large container is to be shipped, it is desirable that the heavy container be centered over the wing spar and that lighter large or small containers be loaded rearwardly and forwardly of the heavy container while the two loaders are in end-to-end alignment. If the product in the large container is light, several large containers may be loaded into the aircraft as long as the weight is properly distributed for balance fore and aft of the center of lift of aircraft. Also, if only small containers are to be loaded into the aircraft, these may be loaded independently by either the main deck loader MDL which is connected to the aircraft A; or by the auxiliary loader AL which is moved into position immediately adjacent the cargo opening but is not physically connected to the aircraft. Thus, it is apparent that the power means and control means of the main deck loader MDL and auxiliary loader AL must be designed for easy and rapid adaption to handle the many load combinations indicated above.

MAIN DECK LOADER-MDL

As best illustrated in FIGS. 2 and 3, it will be noted that the mechanical components of the main deck loader MDL are quite similar to those illustrated in assignee's aforementioned Guyaux U.S. Pat. No. 3,666,127 which is incorporated by reference herein and may be referred to for a more complete disclosure of the mechanical components.

The main deck loader MDL comprises a chassis 20 supported by a pair of driven, steerable front wheels 22 and two pair of rear wheels 24. A main platform 26 is moved vertically between its lowermost position as illustrated in FIG. 2, and a raised position as illustrated in FIG. 3 by four hydraulic cylinders 28 and cooperating chains 30 supported by the chassis 20 and connected to the four corners of the main platform 26. A platform squaring or stabilizing scissors 32 is of the type disclosed in the Guyaux patent and assures that the main platform 26 moves vertically during raising and lowering.

At the forward end of the main deck loader, a bridge 34 is provided which supports an adapter 36 on its forward end for connecting the bridge to the aircraft A. The bridge 34 is moved vertically between its lower transport position illustrated in FIG. 2 and its upper container supporting position illustrated in FIG. 3 by a bridge scissors 38, and by a pair of hydraulic cylinders 40 connected between the chassis 20 and the bridge scissors 38. When the main deck loader MDL has been driven into loading position adjacent the open nose 14 (FIG. 1) of the aircraft A, the bridge 34 is elevated so that its bridge platform 42 is near but slightly above the level of the container supporting floor 18 of the aircraft A. At this time the adapter 36 is lowered and pivotally connected to the aircraft A, all in a manner similar to that disclosed in the Guyaux patent. A mechanically operated rear bridge stop 43 (FIG. 2) is lowered in response to the rear end of the bridge being supported by the platform 26 as illustrated in FIG. 3.

When the main deck loader MDL is in position to load and unload containers C from the aircraft, four stabilizers 44 on each side of the chassis 20 are hydraulically lowered against the aircraft supporting surface or airfield ramp and are then hydraulically locked into position to firmly support the main loader during loading and unloading. As in the Guyaux patent, when a container on the main platform 26 is being raised to the level of the floor 18 of the aircraft cargo area, its forward end moves upwardly into supporting engagement with the rear edge of the bridge platform 42 and continues its upward movement until both the bridge platform 42 and the main platform 26 are at substantially the same elevation as the floor of the aircraft A adjacent the nose 14 of the aircraft.

In addition to the above components, the main deck loader includes an engine compartment 46 with an engine ENG. therein which drives three hydraulic pumps and a 12 volt generator. The usual engine controls, the hydraulic controls, and electrical controls for operating the main deck loader MDL are located at a main operator's control station 48. When the main deck loader MDL and auxiliary loader AL are connected together to handle large containers C, both units are controlled by an operator at the main control station 48 on the right side of the main deck loader MDL.

As best shown in FIG. 6, the platform 26 of the main deck loader MDL is operationally divided into a forward transfer portion 50 and a rear transfer portion 52. The forward transfer portion 50 includes a pair of longitudinally extending container drive belts 54 for driving the containers forwardly or rearwardly; right side rollers 56 and left side rollers 57, and a plurality of longitudinally extending, elongated rollers 58 for selectively driving the containers transversely to the right or left of the platform 26; a set of front edge idler rollers 60 for assisting in transferring containers onto or off of the front of the main platform 26; a plurality of inverted casters 62 (only a portion of which are shown) side guide plates 64,66; and a front stop 68. All of the above components of the forward transfer portion 50 except the casters 62, the edge rollers 56,57 and 60 are raised into or lowered out of engagement with the lower portion of the container depending upon how the container is to be moved across the platform 26. The mechanisms for selectively raising or lowering the above components relative to the frame of the main platform; and the drive components for the belts 54, the side rollers 56,57 and the transverse rollers 58 are all of conventional design. However certain ones of these mechanisms are illustrated and will be described hereinafter.

The rear transfer portion 52 of the main platform 26 includes longitudinally extending drive belts 69 and rear drive rollers 73 for driving the container forward or rearward; driven right and left edge rollers 70,71 and elongated rollers 72 for driving the containers transversely of the main platform 26; inverted casters 74 (only a portion being shown); side guide plates 75,76 and a rear stop 77. All of these components of the rear transfer portion 52, except the casters 74 and edge rollers 70,71 and 73, are independently raised and lowered under the control of the operator in a manner similar to the equivalent components of the forward transfer portion.

The belts 54 of the front section 50 are driven by a hydraulic motor 78 through a chain and flexible shaft drive 79. The rear belts 69 are likewise driven by a hydraulic motor 80 plus a chain and flexible shaft drive 81. The right edge rollers 56, left edge roller 57, and transverse center rollers 58 of the front section 50 are driven by hydraulic motor and chain drives 82,83 and 84, respectively. Similarly, the right edge rollers 70, left edge rollers 71, center rollers 72, and rear rollers 73 of the rear section are driven by hydraulic motors and chain drives 85, 86, 87 and 87', respectively.

Only the structure for raising and lowering the left forward side guide 66 (FIG. 7) will be described in detail, and is representative of the lifts for the other components. The guide 66 is pivotally connected to the frame of the main platform 26 by a plurality of parallel arms 88 one of which is secured to a pivot shaft 89 that is journalled in the platform frame. A crank arm 90 secured to the shaft 89 is pivotally connected to the piston of a hydraulic cylinder 91 that is anchored to the frame. When the piston is extended, the side guide pivots from its illustrated raised position to its lower position.

The bridge platform 42 as shown in FIG. 2 comprises a pair of longitudinally extending container drive belts 92 for transferring the containers between the aircraft and the main platform 26; and a plurality of inverted casters 93 for rotatably supporting the container. The bridge platform 42 also includes front end idler rollers 94 for assisting the transfer of the container between the bridge 34 and the cargo supporting floor 18 (FIG. 1) of the aircraft.

AUXILIARY LOADER-AL

The auxiliary loader AL (FIGS. 4 and 5) comprises a chassis 100 supported by a pair of front drive wheels 102, a pair of rear steerable wheels 104, and by six hydraulically operated stabilizers 105 when loading or unloading containers. An auxiliary platform 106 is supported at its corners by four hydraulic cylinders 108 and cooperating chains 110. An auxiliary scissors 112 is connected between the chassis 100 and the auxiliary platform 106 and serves to square and stabilize the platform as it is moved between an elevated position as illustrated in FIGS. 4 and 5 and its lowermost position (not fully shown) but which is at the same elevation as the main platform 26 when positioned as shown in FIGS. 2 and 9.

A driver's cab DC (FIGS. 4 and 5) is located above the right front wheel 102 and includes the usual controls for steering the vehicle and for controlling an engine ENG. a and several hydraulic pumps located within an engine and hydraulic compartment ENG-CO. A vertically movable operator's platform OP is mounted on the right side of the auxiliary platform 106 and is readily accessible from the driver's cab DC by a telescoping ladder 113.

The auxiliary platform 106 and many of its operative components are similar to and operate in the same way as the components on the main platform 26 of the main deck loader MDL except that the platform 106 is turned 180° relative to the main platform 26 to accommodate the sliding connection between the platform 106 and the upper rear legs of the scissors 112.

Thus, all the components of the auxiliary platform will not be described in detail, but when components of the auxiliary platform 106 are specifically referred to in the following description and the description of the hydraulic and electrical circuits, they will be assigned the same numerals given to the main deck component (after the platform has been turned 180°) followed by the letter "a".

It will be apparent that when the auxiliary platform 106 is lowered, transfer of containers transversely onto or off of the platform is prevented except at the rear right side of the platform 106 (FIG. 4) due to the presence of the engine compartment ENG.-CO and operator's platform OP. Accordingly, the left side guide 64a, 75a and the right front guide 76a are rigidly secured to the platform 106. The right rear side guide 66a, however is raised and lowered relative to the frame of the auxiliary platform 106 by a hydraulic cylinder 91a (FIG. 11c) and both the forward and rear edge roller 73a and 60a are driven by separate hydraulic motors and chain driven similar to the hydraulic motor drive 87 of the main deck loader as illustrated in FIG. 6.

As mentioned previously, when the main deck loader MDL and the auxiliary loader AL are to be operated together to handle a 40 foot container as illustrated in FIG. 1, the decks 26 and 106 are connected together, and the chassis 20 and 100 aligned and in abutting contact.

FIGS. 8 and 9 illustrates one of two locking mechanisms 114 for connecting the two chassis and platform together. The chassis 100 of the auxiliary loader AL includes a pair of pins 115 on its front end which are received in recesses 116 in the chassis 20 of the main loader MDL when the two loaders are in proper alignment and locked in abutting contact.

If the main platform 26 is not connected to the auxiliary platform 106 as indicated in FIG. 8, the auxiliary platform 106 may be retained at a lowered position to receive containers from airport facilities as a staging platform, and the main loader platform 26 can be raised and lowered independently of the auxiliary platform for loading small containers into or removing them from the aircraft. When a large container is to be loaded or unloaded, the two platforms are locked together.

Each mechanism 114 (the right mechanism being illustrated) includes a shoulder, interface locking pin 117 slidably received in a cylindrical bore 118 in the auxiliary platform 106. A hydraulic cylinder 119 connected between the platform 106 and the locking pin 117 urges the forward end of the pin 117 into an oval cavity 120 in the main platform 26 to lock the platforms together as illustrated in FIG. 9. Extension of the pin 117 also open right limit switch 6aLS and urge a spring loaded rod 121, that is slidably received in the main platform 26, toward the left to close "platform lock" limit switch LL-LS (FIG. 14C).

Hydraulic circuits 130 (FIGS. 10A to 10F) and 132 (FIGS. 11A to 11D) are provided for the main deck loader MDL and for the auxiliary loader, respectively. Since the loaders may operate independently of each other, as well as in combination with each other, the main hydraulic circuit 130 and auxiliary hydraulic circuit 132 will be described first as they function independently of each other. Thereafter, the two circuits and an MDL option circuit will be described when connected together and operating in conjunction with each other as a "composite" circuit for handling the large containers.

MDL HYDRAULIC CIRCUIT-130

The hydraulic circuit 130 for the main loader MDL includes a plurality of valves generally designated "V" most of which are spring return valves operated by solenoids SOL 3-35; pressure switches 5PS-7PS; relief valves RV-1 to RV-17 which open at the indicated pressures; and other components all of which will be described along with a general description of their function and the operation of the main deck loader MDL. As will be described in the electrical circuit, solenoids SOL 1 when energized retains the engine ENG. at a medium speed of 1200 rpm; while energization of a solenoid SOL 2 retains the engine at a fast speed of 2400 rpm.

The main deck loader engine ENG. is controlled by solenoids SOL 1 and SOL 2 to drive three hydraulic pumps P1, P2, and P3 (FIG. 10B) at engine speeds of either 1200 rpm or 2400 rpm, respectively depending upon the function being performed. These pumps respectively supply 70,60, and 28 gallons per minute of hydraulic fluid when driven at an engine speed of 2400 rpm; and 35,30 and 14 gallons per minute when driven at an engine speed of 1200 rpm. The fluid eventually returns to a sump S which is conveniently illustrated at several different locations in FIGS. 10A to 10F.

The circuit for driving the main deck loader MDL by means of hydraulic propulsion drive motor 150 (FIG. 10A) at a normal speed receives 70 gpm of high pressure fluid from pump P1 when the engine is driven at 2400 rpm and when manually operated propulsion by-pass control valve V1 is at least partially closed.

When a normal forward speed is desired, both solenoid 19 SOL of valve V2 (FIG. 10B) and solenoid 6 SOL of valve V3 are energized. High pressure fluid from pump P1 then flows through: conduit 154, cross passage 156 in valve V2, conduits 158,160,162, parallel passage 164 in valve V3, conduit 165 and into hydraulic drive motor 150 for driving the main deck loader MDL at a normal speed in its formal direction. The low pressure fluid discharged from the hydraulic motor 150 returns to sump S through: conduits 166, 167, parallel passage 168 of valve V3, and conduits 170 and 171.

When driving at normal speed, only pump P1 is used and is capable of pumping 70 gallons per minute when the engine is driven at 2400 rpm, and the manually operated propulsion bypass control valve V1 is provided for controlling the speed of the main deck loader MDL. When valve V1 is positioned as illustrated in FIG. 10A, all fluid flows directly from the conduit 158, through conduit 172, passage 174 in manual valve V1 and conduit 176 to sump S. Thus, at this time the propulsion drive motor 150 receives insufficient high pressure fluid to drive the main deck loader. However, when the operator pushes the manual valve V1 to the right to gradually restrict and then close the passage 174 in manual valve V1, the propulsion motor 150 and the main deck loader progressively increase in speed in the forward direction.

In the event pressure in conduit 165 should exceed 2100 psi, such pressure is directed through bypass conduit 178 and pilot line 180 to overcome the spring force against pressure relief valve RV-1 thereby allowing the fluid to flow through: conduit 184, open passage 186 in valve RV-1, conduits 188, 166 and 167, valve passage 168, conduits 170 and 171 and into sump S.

When it is desired to drive the main deck loader at a faster rate of speed, the fluid from both pumps P1 and P2 are directed into the propulsion drive motor 150. At this time, 130 gpm is available when the engine is running at 2400 rpm, provided the manual propulsion valve V1 is fully closed.

When driving the main deck loader MDL at a fast rate of speed solenoids 19 SOL of valve V2, solenoid 6SOL of valve V3, and solenoid 5SOL of valve V4 are energized to permit high pressure fluid from pumps P1 and P2 to flow through the propulsion drive motor 150. The fluid from pump P2 flows through: conduit 196, cross passage 198 in valve V4, and conduits 200 and 165 into the propulsion motor 150. When valve V1 is closed this fluid returns to the sump through: conduits 166, 202, cross passage 204 in valve V4, conduits 206, 208, 210 and 171 to sump S. It is also noted that the fluid may return to the sump S through valves V3 and V1 if valve V1 is open as indicated in FIG. 8A. It is also apparent that the forward speed of the main deck loader MDL is controlled by manual propulsion bypass control valve V1.

When it is desired to drive the main deck loader MDL in reverse, solenoids 5SOL of valve 4 and 6SOL of valve V3 are de-energized; and solenoids 19SOL of valve V2 and solenoid 7SOL of valve V3 are energized. If manually operated propulsion bypass valve V1 is open as indicated in FIG. 8A, the high pressure fluid from pump P1 flows through: conduit 154, cross passage 156 in valve V2, conduits 158,172, open passage 174 in valve V1, and conduit 176 directly into the sump S. Thus, insufficient power is directed to the propulsion drive motor 150 to move the main deck loader MDL in reverse under these conditions.

When the manual propulsion valve V1 is partially or fully closed sufficient fluid flows through: conduits 160, 162, cross passage 220 in valve V3, conduits 167 and 166 into propulsion drive motor 150 to drive it and the main deck loader MDL in reverse and at a speed determined by the degree of closure of the propulsion bypass valve V1. Fluid is discharged from the motor 150 through: conduits 165, cross passage 222 in valve V3, and conduits 170 and 171 to sump S. In the event pressure in conduits 166 and 167 should exceed 2100 psi due to the propulsion drive motor being overloaded, such pressure will overcome spring loaded pressure relief valve RV-2 thus permitting the high pressure fluid to flow through passage 226 in relief valve RV-2 and return to sump through the above described circuit.

Although the front wheels of the main deck loader MDL are provided with a hydraulically operated power steering mechanism, such mechanism is conventional in the art and is not described herein but its location is indicated in FIG. 10C.

Assuming that the main deck loader MDL has been driven into operative loading and unloading position adjacent the aircraft, the stabilizers 44 (FIGS. 2 and 10F) must be lowered into supporting relationship with the ground before cargo can be loaded or unloaded.

In order to lower the stabilizers, solenoid 9SOL of valve V5 (FIG. 10D) is energized thus positioning cross passages 230,232 in the flow controlling position. With the engine running at 2400 rpm, pump P3 directs 28 gallons per minute through: conduit 234, check valve 236, conduit 238, cross passage 230 in valve V5, conduit 242, and through eight pilot operated check valves 244 into eight hydraulic cylinders 246 which lower the stabilizers 44. An adjustable flow restrictor 248 is included in the circuit to the right front cylinder 246 which is located below the operator's platform 46 (FIG. 2) and causes the right front stabilizer 44 to be at last stabilizer to move into hydraulically locked extended loader supporting position. A pressure switch 5PS is connected to the portion of the conduit 242 between the right front check valve 244 and its cylinder 246, and closes when the pressure reaches between 400-700 psi at which time pressure relief valve RV-3, which communicates with conduit 242, opens to direct further fluid from line 242 to sump S. When pressure switch 5PS closes, a light located at the operator's control station 48 (FIG. 2) is energized thereby indicating that all eight stabilizers are locked down and that the operator may return his stabilizer control to a neutral position.

The hydraulic fluid is the lower portion of the hydraulic cylinders 246 is discharged to a sump S during the above operation through: conduits 248,250, through pilot actuated check valve 252 which is open at this time due to pressure from conduit 242 being applied thereto through pilot line 254, through conduits 256, cross passage 232 of valve V5, conduit 258, passage 260 in a valve V6, conduit 262,264, and into a priority flow control valve 266 which permits 14 gallons per minute to flow there through and discharges the excess fluid to sump S through conduit 268.

The 14 gpm which flows through the priority control valve 266 flows through: conduit 272, a passage 274 in valve V7, conduits 276, 278, a passage 280 in valve V8, conduit 282, a passage 284 in valve V9, and conduit 286. The conduit 286 provides fluid to a power steering unit (not shown) of conventional design and then discharges to sump S.

In addition to the above described flow passages of the fluid in the bottom of stabilizer cylinders 246 to the sump S, a more direct root to the sump is provided when the pressure in conduit 250 is above 400 psi. When the pressure in conduit 250 is above 400 psi, pilot pressure through conduit 288 (FIG. 10F) opens relief valve RV-4 causing fluid to flow through a passage 290 in relief valve RV-4 and conduit 292 to the sump S.

After loading has been completed and it is desired to drive the main deck loader MDL away from the aircraft, the stabilizer 44 must first be retracted. To retract the stabilizers 44, the solenoid 8SOL (FIG. 10D) of valve V5 is energized (and solenoid 9SOL is de-energized) causing high pressure fluid to flow from pump P3, through: conduit 234, check valve 236, conduit 238, parallel passage 294 of valve V5, conduit 256, check valve 252 and conduits 250 and 248 to the lower ends of the stabilizer cylinders 246 thereby moving the stabilizer 44 upwardly into their retracted positions. High pressure fluid from conduits 248 and pilot conduits 296 are effective to open the check valves 244 allowing fluid in the upper portion of the cylinders 246 to be discharged into conduit 242. This fluid then flows through: parallel passage 298 of valve V5, conduit 258, passage 260 in valve V6, conduits 262, 264 and 268 and into the sump S. Some of the fluid will flow through the priority flow control valve 266 for discharge into the sump S after passing through the power steering circuit as previously mentioned.

When the engine is running and the operator has the stabilizer control in neutral, it will be appreciated that the fluid from pump P3 will flow through: conduit 234, check valve 236, conduit 238, a passage 300 in valve V5, conduit 258, passage 260 in valve V6, conduits 262 and 264 for discharge into the sump S adjacent priority flow control valve 266, or into the sump S after passing through the power steering circuit all as previously described.

In the event pressure in conduit 234 should exceed 2000 psi, pressure relief valve RV-5 opens and the fluid flows to sump S through conduit 302.

After the main deck loader MDL (FIG. 1) has been positioned adjacent the nose 14 (FIG. 1) of the aircraft A, and the stabilizers 44 have been hydraulically locked in the extended loader supporting positions, the bridge 34 must be raised to approximately the level of the floor of the main deck 18 of the aircraft A.

The hydraulic circuit for raising the bridge 34 from the FIG. 2 position to the FIGS. 1 and 3 position, receives its power from pump P3 with the engine running at 2400 rpm to supply 28 gpm, at which time the solenoid 3SOL is energized by the operator to place cross passages 320 and 322 in the flow path.

High pressure fluid then flows from pump P3 through: conduits 234, check valve 236, conduit 238, passage 300 in valve V5, conduit 258, cross passage 320 in valve V6, conduit 324, conduits 326 and 328 into pressure relief valves RV-6 and RV-7 and pass one-way check valves 330 and 332 therein, conduits 334 and 336 into the lower ends of the two lift cylinders 40 to raise the bridge 34 to the position indicated in FIGS. 1, 3 and 10C.

The fluid in the upper portions of the cylinders 40 flow through: conduits 338,340, respectively, conduit 342, cross passage 322 in valve V6, conduits 262 and 264 for partial discharge into the sump S adjacent priority flow control valve 266, and partially into sump S adjacent the power steering unit through circuits previously described.

When the bridge 34 is in its elevated position, it will be noted that the relief valves RV-6 and RV-7 including their one-way check valves 330,332 hydraulically lock the bridge cylinders in their raised positions. However, when the forward end of the cargo floor 18 of the aircraft A lowers due to additional containers being loaded into the aircraft; or when the forward end of the floor 18 raises as containers are being unloaded from the aircraft, valve V8, which is an elevation sensing servo valve, is provided for automatically compensating for the change in elevation of the forward end of the aircraft floor 18.

In response to the lowering of the floor 18 of an aircraft being loaded, and with solenoids 4SOL and 3SOL of value V6 de-energized, the servo valve V8 is shifted to a position wherein cross passages 348 and 350 are in the flow path. High pressure fluid from pump P3 at 28 gallons per minute flows through: conduit 234, check valve 236, conduit 238, passage 300 in valve V5, conduit 258, passage 260 in valve V6, conduits 262, 264, and into priority flow control valve 266 which directs all fluid in excess of 14 gpm into sump S. The remaining 14 gpm flows through: conduit 272, passage 274, conduit 276, cross passage 348 of servo valve V8, conduits 342, 340 and 338 into the upper portions of bridge lift cylinders 40. Pressure in the conduits 338 and 340 is communicated to relief valves RV-6 and RV-7 through pilot lines 352 and 354 at a sufficient pressure to open the check valves and permit the bridge 34 to lower until its upper surface is again at the same elevation as the forward end of the floor 18 of the aircraft A. At this time the servo valve V8 returns to the position illustrated in FIG. 10C.

When the forward end of the floor 18 of the aircraft raises during the unloading operation, the servo valve V8 senses the raise in elevation and is shifted so that parallel passages 356 and 358 of servo valve V8 are in the flow path. The 14 gpm of hydraulic fluid that passes through the priority flow control valve 266 then flows through: conduit 272, passage 274 in valve V7, conduit 276, passage 356 of servo valve V8, conduit 360, conduits 324,326 and 328, relief valves RV-6 and RV-7, conduits 334 and 336, and into the lower ends of the cylinders 40 thereby raising the bridge 34 until it is level with the forward end of the floor 18 of the aircraft A. The fluid in the upper ends of the cylinders 40 flows through conduits 338,340,342 and 362, parallel passage 358 in servo valve V8, and conduit 364 to sump S. When the level is re-established, servo valve V8 returns to its neutral position as illustrated in FIG. 10C.

When the loading or unloading operation has been completed and it is desired to lower the bridge 34 to the transport position illustrated in FIG. 2, the operator energizes solenoid 4SOL of valve V6 thereby placing parallel passages 366 and 368 in the flow path. High pressure fluid from pump P3 then flows through conduit 234. check valve 236, conduit 238, passage 300 in valve V5, conduit 258, passage 366 in valve V6, conduits 342, 338 and 340 into the upper ends of bridge cylinders 40. Pressure in conduits 338, 352 and 340, 354 open relief valves RV-6 and RV-7 allowing fluid in the lower portions of cylinders 40 to flow through: conduits 334, 336, relief valves RV-6 and RV-7, conduits 326, 328 and 324, parallel passages 368, conduits 262, 264 and 268 of priority flow control valve 266 and then into sump S. The 14 gpm that flows through the priority flow control valve 266 is discharged to sump S after flowing through the power steering circuit thus permitting the bridge 34 to move downwardly into its lowermost transport position illustrated in FIG. 2.

An 1800 psi pressure relief valve RV-8 (FIG. 10C) is connected to conduit 276 and opens to discharge fluid directly to sump S through conduit 364 in the event the pressure in conduit 276 should exceed 1800 psi.

After the bridge 34 (FIG. 1) has been raised, the stabilizers 34 have been extended, and the adapter 36 has been manually connected to the aircraft A, the main platform 26 may be raised or lowered.

In order to raise the main platform 26, solenoid 18SOL (FIG. 10B) of valve V-2 is energized thereby placing parallel passages 380 and 382 in the fluid flow path. High pressure fluid from pump P1, which is driven by the engine at an engine speed of 2400 rpm, then directs the 70 gpm through: conduit 154, passage 380 in valve V2, conduit 384, check valve 386, conduit 388, adjustable speed control valve 390 having check valves 392 therein, conduits 394, adjustable speed control valve 396 having a check valve 398 therein, conduit 400, and is then blocked by pilot operated check valve 402 from further flow past check valve 402. However, a pair of conduits 404 and 406 connected to the upper portion (FIG. 10A) of conduit 394 conduct the high pressure fluid into conduits 408, 410, 412 and 414 for flow past pilot operated check valves 416, 418, 420 and 422, respectively, into the four platform lift cylinders 28 thereby raising the main platform 26. Lift overload pressure switches 6PS and 7PS are connected by a pilot line 424 to the check valve 418 and are subjected to the high pressure fluid in conduit 410. If the pressure in conduit 410 is excessive, pressure switches 6PS and 7PS close when subjected to pressures in excess of 1400 psi and 1300 psi, respectively. These switches are associated with the electrical control circuit to be described hereinafter. The pressure switch 6PS disables the fast "raise" control circuit in the event the lift pressure is in excess of 1400 psi; and pressure switch 7PS disables the fast "lower" control circuit in the event the pressure exceeds 1300 psi.

When the main platform 26 (FIG. 1) has been raised to within about 1 foot below the level of the forward end of the cargo supporting floor 18 of the aircraft A, the main electrical control circuit to be described hereinafter automatically reduces the rate of lift from a maximum of about 45 feet per minute (when the main deck loader MDL is operated alone) to about 10 feet per minute. When the main platform 26 reaches the 1 foot level, solenoid 18SOL of valve V2 is automatically de-energized, and solenoid 21 of a valve V9 is energized to place parallel passages 430 and 432 in the flow path.

De-energization of solenoid 18SOL and return of valve V2 to its illustrated neutral position, causes the 70 gpm of fluid from pump P1 to flow through: conduit 154, passage 434 in valve V2, and conduit 436 to priority flow control valve V10 which is adjusted to allow 35 gpm to flow therepast into conduit 440, while the remaining portion of the fluid returns to sump S through conduits 442 and 171. The 35 gpm of fluid from pump P1 and conduit 440 flows into a flow divider 444 (FIG. 10E) which directs one-half of the flow into conduit 446 and the other half into conduit 448. The fluid in conduit 446 returns to sump S through passage 448 in a valve V11, conduit 450, passage 452 in a valve V12, and conduit 454 to sump S (FIG. 10F). The 17.5 gpm of fluid which conduit 448 receives from the flow divider 444 flows through: conduits 456 and 458, passage 460 in valve V13, and conduits 462 and 454 to sump S.

Thus, the hydraulic fluid from pump P1 is not used to lift the main platform 26 during the last foot before reaching the container transferring level. Pump P2 provides the fluid during this portion of the platform lift, and flows through: conduit 196, a passage 466 in valve V4, conduits 206, 208, parallel passage 430 in valve V9 which has its solenoid 21SOL energized for "slow raise", a conduit 468, check valve 402, conduit 400, speed control valve 396, and conduits 394, 404 and 406 into the four platform lift cylinders 28.

When the main platform 26 (FIG. 1) reaches the level of the forward end of the cargo supporting floor 18 of the aircraft, certain limit switches of the main control circuit to be described hereinafter are opened to de-energize solenoid 21SOL of valve V9 thereby returning it to its neutral position as illustrated in FIG. 10B.

A pressure relief valve RV-9 is connected between conduits 196 and 171 and will open to return fluid to the sump when the pressure in line 196 exceeds 2000 psi.

In order to lower the main platform 26 slowly during the first foot below the aircraft loading level, and rapidly for the remaining travel, the engine is driven at its slow speed of 1200 rpm and the operator then energizes solenoid 22SOL of valve V9 to place the cross passages 480, 482 in the flow path. The operator also energizes solenoid 23SOL of pilot pressure valve V-14 (FIG. 10C) to close the valve; and energizes solenoid 23aSOL of pilot control valve V-7 to place parallel passages 476, 478 in the flow path.

High pressure fluid from pump P2 at 30 gpm then flows through: conduit 196, passage 466 of valve V4, conduit 206 and 208, cross passage 480 of valve V9, conduit 484, 486 and 488 for discharge to sump S through a variable restrictor 490. An adjustable pressure relief valve RV-10 in conduit 492 prevents release of fluid to the sump S until a preset pressure of between 750–1000 psi is present in conduit 492. Fluid from conduit 486 is then directed into pilot line 492 at sufficient pressure to open check valves 402 and 386.

High pressure fluid at 14 gpm flows through conduits 234, check valve 236, conduit 238, passage 300 in valve V5, conduit 258, passage 260 in valve V6, conduit 262 and 264, priority flow control valve 266, conduit 272, parallel passage 476 of valve V7 and into pilot line 480. Since solenoid 23SOL is energized and valve V14 is closed, the fluid in pilot line 480 builds to in excess of 1000 psi thereby opening lift cylinder check valves 416, 418, 420 and 422 (FIG. 10A) and also opens pressure relief valve RV-11 allowing the fluid in pilot line 480 to flow to sump while retaining the lift cylinder check valves open. Thus, fluid in the lower portions of the lift cylinders 28 is no longer blocked and is discharged past the check valves 416, 418, 420, 422 and slowly flows to sump S through: the conduits leading into conduit 394 from the cylinders, adjustable speed control valve 396 which determines the rate at which the main platform 26 is lowered, conduit 400, open check valve 402, conduit 468, cross passage 482 in valve V9, and to the sump S through conduits 210 and 171.

After the main platform 26 has slowly lowered the distance of one foot below the container transfer level, electrical overrides in the main electrical circuit drop out and permit solenoid 19SOL (FIG. 10B) of valve V2 and solenoid 22SOL of valve V9 to be energized or de-energized under the full control of the operator.

With both solenoids 19SOL and 22SOL energized, hydraulic fluid flows out of the platform lift cylinders 28 through the "slow lower" circuit described above and also through a "fast lower" circuit. The fast lower circuit discharges fluid from the pistons 28 to the sump S through conduit 394, speed control valve 390, conduit 388, open check valve 386, conduit 384, cross passage 482 in valve V2, conduit 436, priority flow control valve V10 which discharges all fluid in excess of 35 gpm to sump S through conduits 442 and 171. The 35 gpm of fluid that flows through valve V10 flows through conduit 440, the flow divider 444 and the previously described circuit in FIG. 8E and enters the sump S through conduit 454.

As illustrated in FIGS. 6 and 10F, the front stop 68, rear stop 78, left guides 66,76 and right guides 64,75 are operated through well known pivot linkages and shafts by horizontally disposed hydraulic cylinders 486, 488,490,492,494 and 491, respectively. These components, as well as the container driving components on the platform 26, are operated by pump P1 when the engine is driven at its slow speed (1200 rpm), and can be operated only when the valve V2 is in its neutral position illustrated in FIG. 10B. Fluid from pump P1 at 35 gpm flows through conduit 154, passage 434, conduit 436, priority flow control valve V10, conduit 440, and flow divider 444 (FIG. 10E) which directs 17.5 gpm into conduit 448. Fluid from conduit 448 normally flows through cross passages in spring loaded valves V16, V17, V18 and V19 to normally retract the pistons 486, 488, 491,492,494 and 496 to hold the associated stops and guides up. A pressure assist to line 448 is placed in operation when the stops and guides are to be raised as will be described hereinafter.

When it is desired to transfer containers past the front stop 68, the operator energizes solenoid 20SOL to shift valve V16 into its parallel passage position thereby lowering the front stop.

When it is desired to transfer containers past the rear stop 88, the operator energizes solenoid 16SOL to shift valve V17 into its parallel passage position thereby lowering the rear stop 78.

When it is desired to transfer containers on or off the left side of the platform 26, the operator energizes solenoid 14SOL to shift the valve V18 to its parallel passage position thereby lowering the left guides 66,76: and, if it is desired to transfer containers onto or off the right side of the platform 26 the operator energizes solenoid 15SOL to shift valve V19 into its parallel passage position thereby lowering the right guides 64,75.

The components on the forward section 50 of the platform 26 are powered by 17.5 gpm of hydraulic fluid passing through the flow divider 444 into conduit 446.

In order to transfer the container longitudinally of the vehicle onto or off of the front of the main platform 26, the front stop 68 must be lowered as above described, the belts 54 (FIG. 6) must be lifted into position to engage the container, and the belts 54 must be driven forwardly or rearwardly. This is accomplished by energizing solenoid 24SOL of valve V16 thereby shifting the parallel passages into the flow path causing belt lift cylinders 500,502 to raise the belts. Fluid discharged from the cylinders 500,502 are discharged to sump S through conduits 504 and 454. With the belts 54 raised, the operator directs fluid into hydraulic belt drive motor 78 (FIGS. 6 and 10E) by energizing solenoid 26SOL of valve V11 if he wishes to move a container rearwardly, and energizes solenoid 25SOL of valve V11 if he wishes to drive a container forwardly.

If the operator wishes to move containers (or portions of the containers) to the right or left on the forward section 50 of the platform, he first energizes solenoid 29SOL of valve V16 to shift the valve into its cross passage position to direct hydraulic fluid into roller lift cylinders 508,510 which raise the rollers 58 into position to engage the container. The operator then energizes solenoid 27SOL of valve V12 which drives hydraulic motors 84, 82 and 83 and rollers 58,56 and 57 respectively, if he wishes to move the containers transversely of the Main platform 26 toward the right. The operator energizes solenoid 28 SOL of valve V12 which shifts the valve to the crosspassage position if he wishes to drive the container toward the left.

The aft section 52 of the main platform 26 is operated in a manner quite similar to the forward section 50 by energizing solenoid 30SOL of valve V13, which raises belt lift cylinders 518,520 at which time roller lift cylinders 522,524 are down. Energization of solenoid 35SOL of valve V13 raises the roller lift cylinders 522 and 524 and lower the lift cylinders 518 and 520.

Energization of solenoid 33 of valve V20 supplies fluid to hydraulic motors 87,85 and 86 which moves the container to the right by driving rollers 72,70 and 71 when raised. Energization of solenoid 34SOL of valve V20 drives the container to the left. Energization of solenoid 31SOL of valve V21 supplies fluid to hydraulic motors 80 and 87' which drive the aft belts 72 and rear rollers 73, respectively, to move the container forward when the belt lift cylinders 518 and 520 are raised. When solenoid 32SOL of valve V21 is energized, and the belt lift cylinders 518,520 are raised, the container is moved rearwardly.

A flow restrictor 536 (FIG. 10E) and valve V22 are provided in order to increase the resistance to the flow of fluid to the sump S when the platform aft section 52 is not being used, in order to provide additional pressure for operating the stops and guides of FIG. 10F as previously mentioned. When the platform rollers or belts are not operating, and when one or more of the stops 68,78 or guides 66,76,64,75 are not up, the electrical control circuit to be described hereinafter will energize 17SOL of valve V22 thereby providing additional power to the circuit for the stops and guides.

In addition to the several roller and belt drives on the main platform 26, the pair of longitudinally extending belts 92 (FIG. 2) on the bridge platform 34 are also mounted for movement between a lowered position spaced from the container and a raised container driving position engaging the container for assisting in driving it into or out of the aircraft A.

As shown in FIG. 8C, the hydraulic circuit for operating the bridge belts 90 receives its power from pump P3 and the conduit 282 when the engine is driven at 1200 rpm. When it is desired to raise the belts 92 solenoid 11SOL of valve V23 is energized by the operator thereby directing hydraulic pressure into the lower ends of lift cylinders 540, 542; and when it is desired to lower the belts, solenoid 13SOL of valve V23 is energized. When the belts 90 are up, and it is desired to drive the container forward into the aircraft, solenoid 10SOL of valve V9 is energized thereby driving hydraulic motor 544 in one direction; when solenoid 12SOL of valve V9 is energized thereby driving the motor 544 in the opposite direction, the container is withdrawn from the aircraft.

AL HYDRAULIC CIRCUIT—132

The hydraulic circuit for the auxiliary loader AL is illustrated in FIGS. 11A to 11D, and in many respects is similar to the hydraulic circuit 130 for the main loader MDL. However, since the auxiliary loader does not include a bridge, does not have a movable left guide rail 64a, 75a (FIG. 4) nor a movable forward section right guide rail 76a, and does not include driven left edge rollers not driven right front edge rollers; it is apparent that hydraulic circuits are not required for these elements. However, both the rear edge roller 60a and front edge rollers 73a are driven and accordingly the drives for these components will be described. Also, hydraulic circuit 132 of the auxiliary loader AL includes several hydraulic components used for coupling, and thereafter operating, the main loader MDL and auxiliary loader AL when their circuits are coupled together to handle a large 40 foot container.

The engine (not shown) of the auxiliary loader AL is driven either at 1200 rpm or 2400 rpm when solenoids SOL1a or SOL2a (FIG. 13A) in the electrical circuit of the auxiliary loader are energized, respectively. The engine ENGa (FIG. 16) drives two hydraulic pumps P4 and P5. The pump P4 (FIG 11A) provides 51 gpm at the high engine speed (2400 rpm) and 26½ gpm at the medium engine speed (1200 rpm). Similarly, the pump P5 when driven at the high speed provides 18 gpm and when driven at the medium engine speed provides 9 gpm.

In order to more readily distinguish the hydraulic and electrical circuits for the auxiliary loader AL from the hydraulic and electrical circuits of the main loader MDL, the solenoids provided in the auxiliary circuit 132 will be identified by numerals followed by the letter "a". The solenoids in the hydraulic circuit 132 are thus labeled 3aSOL to 36aSOL and are associated with a plurality of valves V25 to V52; relief valves RV-20 to RV-46 which open at the indicated pressures; pressure switch 4PS: sump Sa; and other components all of which will be described along with a general description of their functions and the operation of the auxiliary loader AL by itself.

Since many portions of the hydraulic circuit 132 of the auxiliary loader AL are quite similar to the circuit 132 of the main deck loader MDL, the description to follow will be less detailed than the description for the MDL hydraulic circuit.

When it is desired to drive the auxiliary loader AL forward into position to load or unload the aircraft, the engine is driven at 2400 rpm. To drive the pumps P4 and P5, the operator energizes solenoid 7aSOL of valve V35, (FIG. 11B) and solenoid 3aSOL of valve V37. High pressure fluid from pump P4 flows past check valve 550, through cross-passage position of valve V35, through valve V36, and returns to sump SA, through manually operated propulsion bypass control from valve V32. Thus, when valve V32 is open, insufficient pressure is provided to propel the vehicle. When the operator desires to drive forward, he partially or fully closes manual valve V32 causing fluid to pass through parallel passages in valve V37 into hydraulic motors 552 and 554 thereby driving the auxiliary loader AL forwardly. The motors 552 and 554 are coupled to the right and left front wheels 102 (FIG. 5), respectively. Fluid passing through the hydraulic motors return to sump Sa through parallel passage in valve V37.

To drive the auxiliary loader AL in reverse, solenoid 4aSOL of valve V37 is energized causing the fluid to flow through the crosspassages with the speed being manually controlled by actuation of propulsion bypass control valve V32 by the operator.

Right and left brakes 556 and 558 are spring set, hydraulically released brakes. The brakes 556,558 are operated by hydraulic cylinders 560,562, having springs 564 and 566 in their brake engaging sides. The cylinders 560, 562 are actuated by high pressure hydraulic fluid from pump P5. Fluid from pump P5 flows through check valve 567, neutral passages in valves V26, V27, and V33 to priority flow control valve 568 which permits 3 gpm of the available 18 gpm to flow into the brake circuit and bypass 15 gpm to the sump Sa. The 3 gpm flows through cross passage position in park brake valve V39 and enters hydraulic cylinders 560,562 to release brakes 556,558. After providing sufficient pressure to release the brakes, the fluid flows to sump Sa through a flow restricter 570 in service brake valve V38. Also, the fluid on the other side of the piston of brake cylinders 560,562 flows to sump through a parallel passage in service brake valve V38 at this time.

In order to engage the brakes 556,558, the operator manually operates service brake valve V38 to fully or partially place cross passage of valve V38 in position to direct high pressure fluid into the spring set side of the brake cylinder 560,562 and block passage of fluid through valve V38 to sump Sa. This overcomes the force of fluid passing through cross passage of park brake valve V39, and when the pressure in the brake circuit reaches 200 psi, relief valve RV-27 opens permitting the fluid to flow to sump Sa. When the auxiliary loader AL is in proper loading or unloading position relative to the aircraft cargo opening, the park brake valve V39 is manually shifted to the parallel passage position thus releasing high pressure fluid on the retract side of the brake cylinders 560, 562 to sump Sa. The springs 564, 566 then lock the auxiliary loader AL in position, and the service brake may be released to return to the illustrated position.

With the auxiliary loader AL positioned immediately adjacent, but not connected to the aircraft, in position to load or unload containers from the aircraft; the stabilizers 105 are lowered to rigidly support the chassis 100.

At this time the engine is driven at 2400 rpm and solenoid 13aSOL (FIG. 11A) of valve V27 is energized. Pump P5 then directs high pressure fluid at 18 gpm through check valve 567, the neutral passage in valve V26, parallel passages in valve V27, and past pilot operated check valves 572 (FIG. 11C) into the upper ends of stabilizer cylinders 574 to extend the cylinders into chassis supporting engagement with the ground. A speed control valve 576 is incorporated in the flowline to the right front stabilizer cylinder 574 which is located below the driver's cab 114 (FIG. 4) so that it will be the last stabilizer to lower at which time it closes pressure switch 4PS which energizes a light (not shown) on the instrument panel. The light indicates to the operator that all stabilizers are down, at which time he de-energizes solenoid 13aSOL of valve V27. When the pressure of fluid entering the cylinders 574 reaches 750 psi, relief valve RV-25 opens to direct the fluid to sump SA.

Fluid from the lower portion of the cylinders 574 in excess of 3 gpm flows through a parallel passage in valve V27, a neutral passage in valve V33, and priority flow control valve 568 to sump SA. Also, when the pressure acting on relief valve RV-26 exceeds a preset pressure of about 1200 psi (which occurs when the stabilizers are being retracted) relief valve RV-26 opens to direct the fluid to sump.

At certain times due to varying inclinations of the airport ramp which supports the auxiliary loader and main loader, the container supporting plane of the auxiliary platform 106 may not be in the desired loading plane. For example, the platform 106 may not lie in the same plane as the main platform 26 when the two loaders are used in combination to handle 40 foot containers. In order to correct such misalignment problems the solenoid 12aSOL (FIG. 11B) of valve V33 is energized directing fluid through cross passages in valve V33 and into the two rear cylinders 574 through adjustable speed control valves 578,580 adjacent the rear cylinders, and check valves 582. The operator independently controls the speed control valves 578,580 until the desired alignment is achieved and then closes the valves 578,580 causing the fluid to return to sump Sa through relief valve 23 after reaching 1350 psi. Relief valves RV-21 (FIG. 11A) then opens to discharge the high pressure fluid to sump Sa when the pressure exceeds about 200 psi at which time solenoid 12aSOL of valve V33 is de-energized. When planar alignment of the platform 106 is to be corrected as above described, the correction is made first, and the other stabilizers are thereafter lowered as previously described.

In order to retract all six stabilizers 105, solenoid 5aSOL of valve V27 and solenoid 12aSOLA of valve V52 are energized. Valve V27 is placed in its crosspassage position thus directing high pressure fluid through the cross passages and into pilot lines to unseat the pilot operated check valves 572, (FIG. 11C) and into the lower ends of the stabilizer pistons 574 to retract the same. The fluid in the upper portions of the cylinders 574 return to sump Sa through open valve V52.

When the auxiliary loader AL has been locked in operative loading and unloading position by the stabilizers 105, the auxiliary platform 106 may be raised or lowered.

In order to raise the platform 106, the engine is driven at 2400 rpm and solenoid 6aSOL (FIG. 11B) of valve V35 is energized causing fluid at 51 gpm from pump P4 to flow through parallel passages in valve V35, pilot operated check valve 584, a check valve 585 in speed control valve 586, and pilot operated check valves 588 into the lower ends of the four platform cylinders 108 thereby raising the auxiliary platform 106. At this time solenoid 6aSOL-A is also energized to direct fluid through crosspassages in valve V26 and through a check valve for unseating the check valve 588 at the lower edge of the lift cylinders.

When it is desired to lower the platform 106, the engine is driven at 1200 rpm and solenoid 7aSOL is energized shifting valve V35 to its crosspassage position. Solenoid 10aSOL is also energized to block flow of fluid to the propulsion circuit and to direct the fluid into the pilot circuit. Furthermore, solenoid 8aSOL (FIG. 11A) of valve V29 is energized to block flow of pilot fluid to the sump Sa, and solenoid 11aSOL (FIG. 11B) of platform lowering dump valve V34 is open to the sump Sa.

High pressure fluid at 26½ gpm then flows from pump P4 through cross passages in valve V35, is diverted by closed valve V36 and flows through a variable speed control valve 590 and check valve 592. The fluid is then prevented from flowing into sump Sa by closed valve V29 and thus continues through pilot circuits to unseat pilot operated check valves 588. The hydraulic fluid in the lower portion of the solenoid then flows from the cylinders 108 past the check valves 588 through adjustable speed control valves 586, through open pilot operated check valve 584, through cross passage in valve V35 and to sump SA through parallel passage in platform dump valve V34.

Other components are included in the hydraulic circuit 132 of the auxiliary loader AL for raising and lowering the auxiliary platform 106 when the main deck loader MDL and auxiliary loader AL are coupled together for handling the large 40 foot containers as illustrated in FIG. 1. These circuit components will be described hereinafter.

As in the main loader MDL, the auxiliary platform 106 is divided into a forward section 52a (FIGS. 4 & 5) and a rear section 50a and includes a rear stop 68a, a front stop 78a, both of which are selectively raised and lowered. All of the side guides on the auxiliary platform 106 are fixed to the platform except the right rear guide 66a as previously mentioned. The circuits for these container controlling components are illustrated in FIGS. 11C and 11D, and receive fluid from both pumps P4 and P5 when driven at an engine speed of 1200 rpm. At this time, the operator energizes solenoid 29aSOL of valve V33.

High pressure fluid at 9 gpm flows from pump P5 through neutral passages in valves V26 and V27, parallel passage in valve V33, and combines with a fluid flow of 26½ gpm from pump P4. The total flow of fluid then flows through neutral passage in valve V35, an adjustable priority flow control valve 594 which discharges ½ gpm to sump Sa and directs 35 gpm to a flow divider 596 which splits the flow going to the platform aft section 50a (FIG. 4) and the platform forward section 52a when the front and rear stops are not being used.

As shown in FIG. 11D, the rear stop 68a (FIG. 5) is normally held in raised position by fluid flowing through cross passage position of valve V45 and into rear stop cylinder 598. The operator energizes solenoid 15aSOL when he desires to retract (lower) the rear stop so that a container can be moved therepast.

Similarly, the front stop (78a (FIG. 5) is normally held in raised position by fluid flowing through cross passages in valve V46 and into front stop cylinder 600. When it is desired to lower the front stop 78a, the operator energizes solenoid 14aSOL.

As mentioned above, all side guides are rigidly secured to the platform 106 except the right rear guide 66a which is normally held in raised position by valve V51 and is lowered upon energization of solenoid 36a which directs fluid into the closed end of cylinder 91a to lower the right rear guide 66a.

In order to drive the container on the aft or rear section 50a longitudinally of the auxiliary platform 106, the belts (corresponding to belts 54, FIG. 6) must first be raised or lifted into position to engage the container. This is accomplished by energizing solenoid 23aSOL of valve V43 thereby directing fluid into the lower end of the belt lift cylinders 602 and 604.

With the rear belts raised, the operator energizes solenoid 24aSOL of valve V44 if he wishes to drive the container forward. This directs fluid through parallel passages in valve 44 and through belt drive motor 78a as well as aft end roller drive motor 608 for return through parallel passage in valve V44 to sump Sa. If the pressure increases to 1500 psi, relief valve RV-41 opens to bypass the motors 78a and 608.

If the operator desires to drive the container toward the rear with the belts still raised, the solenoid 25aSOL of valve V44 is energized to place the cross passages in the flow circuit to reverse the direction of flow through the motors 78a and 608, and to open relief valve RV-44 in the event resistance to movement of the container is great enough to increase the pressure to more than 1500 psi.

If it is desired to move the container transversely of the aft section 50a of the auxiliary platform 106, the aft center rollers (corresponding to rollers 58, FIG. 6) must be raised. This is accomplished by energizing solenoid 28aSOL of valve V43 thereby placing the cross passages of the valve V43 in the flow passage directing fluid into the lower portion of piston 610 and 612 thus raising the aft center rollers. With the aft center rollers raised, solenois 27aSOL of valve V50 is energized to direct fluid through parallel passages of valve V50, center roller drive motor 84a and drive motor 83a to drive the center rollers and edge rollers 57a to the left. If the pressure exceeds 1500 psi relief valve RV-45 opens to bypass the motors 84a, 83a to sump 5a.

When it is desired to drive the container to the right on the aft section 50a of the auxiliary platform 106, and the center rollers (corresponding to rollers 58, FIG. 6) are still raised, solenoid 26aSOL of valve V50 is energized thereby reversing the flow of fluids through the motors 84a and 83a and opening relief valve RV-46 in the event the pressure exceeds 1500 psi.

The components on the forward section 52a of the auxiliary platform 160 which are driven are: the center rollers (corresponding to rollers 72, FIG. 6) for aligning containers by moving them, or end portions thereof, to the right or left; the forward belts (corresponding to belts 69, FIG. 6); forward roller 73a (FIG. 5) for driving the containers forward or rearward; and left mechanism for raising and lowering the above components.

In order to raise the forward belts of the forward platform section 52a, solenoid 17aSOL is energized shifting valve V41 to its parallel passage position thereby directing fluid into the closed ends of belt lift cylinder 618 and opening the opposite ends of cylinder 618 to sump Sa to raise the belts for moving the containers longitudinally. Conversely, energization of solenoid 22aSOL of valve V41 raises the transverse rollers into operative position.

With the forward belts raised, energization of solenoid 19aSOL of valve V48 directs fluid through parallel passage of valve V48 and through hydraulic motors 80a and 87'a to drive the belts and forward rollers 73a toward the rear. If the driving forces are excessive and reach 1500 psi, relief valve RV-43 opens to cause the fluid to bypass the motors 80a and 624. Conversely, energization of solenoid 18aSOL drives the motors 80a, 87'a and container in a reverse direction and relief valve RV-44 opens if the pressure to the motors exceeds 1500 psi.

With the forward transverse rollers (corresponding to roller 72, FIG. 6) raised, energization of solenoid 20aSOL shifts valve V42 into its parallel passage position directing fluid into motor 87a thereby driving the transverse center rollers and containers toward the right with relief valve RV-47 opening if the pressure exceeds 1500 psi. Conversely, energization of solenoids 21aSOL drives the motor 87a of the center roller and the container to the left, and if pressure exceeds 1500 psi, relief valve RV-48 opens to bypass the fluid to sump Sa.

Since the hydraulic circuits for the transfer components of both the aft and forward section of the platform 106 are opened to sump when these components are not being used, a guide and lock cylinder pressure system (FIG. 11D) is provided in the "platform forward section" circuit to increase the pressure in the stop and right guide circuit. Solenoid 16aSOL of valve V49 is energized at all times when any load stop is down, or when the platform 106 of the auxiliary loader AL is locked to the platform 26 of the main deck loader except during load transfer. Energization of solenoid 16aSOL causes the valve V49 to shift to its parallel passage position thereby directing flow through a flow resistor 628 and a check valve 630 before entering sump S thus providing additional pressure to the guide and stop circuit.

Solenoid 31aSOL of valve V49 is energized during locking of the auxiliary deck 106 to the main deck 26 under control of the electrical circuit to be described hereinafter. When solenoid 31aSOL is energized, high pressure fluid flows through cross passages in valve V47 and is blocked from the sump Sa thus diverting 17.5 gpm through the stop and guide circuit to sump Sa.

As thus far described; the hydraulic circuit 132 of the auxiliary loader AL has been primarily described as though it was being used alone to transfer containers between the loader and an aircraft. The components of the auxiliary circuit 132 to be described below relate to the operation when the main loader MDL and auxiliary loader AL are coupled or being coupled together.

MDL AND AL INTERCONNECTING HYDRAULIC COMPONENTS

With solenoid 31aSOL (FIG. 11D) energized as described immediately above, and the chassis of the MDL and AL in abutting engagement, the platform locking pins 117 (FIGS. 8, 9 and 11D) are extended by energizing solenoid 30aSOL of valve V47 thereby directing fluid into cylinders 119 to extend the pins 117 into the locking recesses 120 (FIGS. 3, 8 and 9) in the main loader deck 26. Energization of solenoid 32aSOL of valve V47 reverses the flow of fluid and retracts the pins 117 from the locking recesses in the main loader deck.

In order to reduce the transfer speed, solenoid 33aSOL (FIG. 11C) of valve V40 is energized thereby directing a predetermined portion of the high pressure fluid to sump Sa through a variable restrictor or speed control valve 632.

When the platform 106 of the auxiliary loader AL is properly coupled to the platform 26 of the main loader MDL by the pins 117, hydraulic fluid from the main loader MDL is used to power the lift cylinders 108 of the auxiliary loader as well as the lift cylinders 28 of the main deck loader MDL. In response to such coupling, solinoid 34aSOL (FIG. 11A) of pilot pressure isolator valve V28 causes the parallel passage to move from the illustrated cross passage position wherein the valve V28 prevents flow of pilot fluid therepast and diverts the fluid to sump Sa through relief valve RV-21 when 200 psi is reached. When solenoid 34aSOL is energized, fluid flows through parallel passages of valve V28 causing pilot operated valves V30 and V31 to shift to their parallel passage positions.

At this time, conduit 394 (FIG. 10A) of the hydraulic circuit 130 of the main loader is connected to the auxiliary loader circuit by couplings C and C' (FIG. 11A). High pressure fluid then flows from the main hydraulic circuit 130 of the main loader MDL into the auxiliary circuit 132 (FIG. 11A) past check valves 634, 636 and into lift cylinders 108. Similarly, the pilot line 480 of main hydraulic circuit 130 (FIG. 10A) is coupled to the valves V30 and V31 at C', and pilot fluid flows through check valves 638 and 640 to unseat check valves 588 when the operator on the main deck loader manually actuates controls to lower both decks 26 and 106 simultaneously.

In the event of failure of the engine (not shown) of the auxiliary loader AL, a small emergency pump 642 (FIG. 11A) driven by an electric motor 644 is provided for returning the platform 106 to its lowered position and to thereafter raise the stabilizers 105 so that the auxiliary loader AL may be towed away from the aircraft. If such a problem occurs, solenoid 35aSOL (FIG. 11A) of platform auxiliary valve V25 is energized to permit high pressure fluid to enter the previously described platform and stabilizer circuits. It will be noted that check valve 550 and 567 prevent reverse flow through pumps P4 and P5, and that pressure relief valve RV-20 will open in the event the pressure exceeds a predetermined level.

A similar electrically driven emergency pump and sub-circuit (not shown) is provided for the main deck loader.

Since the main deck loader MDL and the auxiliary loader AL are both capable of handling 60,000 pounds when operating alone, and when operating together are capable of handling 120,000 pounds; the main deck loader MDL has an electrical circuit 650, and the auxiliary loader AL is provided with an auxiliary control circuit 652 each of which is designed to provide many protective controls which will prevent the operator from inadvertently actuating controls which might cause harm to personnel or to equipment. Also, the two circuits are combined together as a "main control circuit" when the two loaders are connected together for transferring large containers up to 40 feet long and weighing up to 120,000 pounds between airport cargo facilities and the aircraft.

Although the circuits are under the primary control of an operator, because of the substantial weight and size of the containers, certain protective components are provided in each circuit which will override manually operated controls thereby minimizing injury to personnel or equipment.

Because each circuit requires several sheets of drawings, consecutive numerals are provided adjacent the left hand margins to identify the location of components, and legends are located adjacent the right margins and also within the circuits themselves, to indicate the functions performed by the components.

MDL-ELECTRICAL CIRCUIT-650

FIGS. 12A to 12E, when combined, define the electrical circuit 650 for the main deck loader MDL when operated alone. The electrical circuit includes solenoids 1SOL to 35SOL; contactors 1CON to 7CON, and their contacts; circuit relays 1CR to 10CR and their contacts; pressure switches 1PS to 7PS; limit switches 1LS to 13LS; push button switches 1PB to 7PB; toggle switches 1TGS to 6TGS; multiple pole switches 1SS to 5SS; diodes 1D to 32D which permits flow of current only in the direction of the arrows; and other components which will be described along with the detailed description of the electrical control circuit 650 of the main deck loader MDL.

The electrical control circuit 650 is associated with the hydraulic circuit 130 (FIGS. 10A to 10F) of the main deck loader MDL, and automatically controls many of the valves and switches therein.

It will be understood that many lights, including instrument lights, have been omitted from the control circuit since they are not deemed necessary for an understanding of the operation of the machine. Also, the specific location of the operator's control switches has been omitted but it will be understood that these switches are dispersed throughout eight locations on the main deck loader MDL with most of the switches being located at the operator's platform 48 (FIG. 1) either on a forwardly located driver's dash or a rearwardly located operator's panel.

The control circuit 650 (FIGS. 12A-12E) is a 12 volt DC circuit which includes a battery 654 (FIG. 12B) connected between ground line L1 and main line L2. The engine ENG. (FIG. 2) is started by moving the start switch 1SS to "start" and momentarily closing push button switch 1PB (line 6) thereby energizing the generator lights and contactor 1CON through closed relay contact 1CR-1 (line 5). Energization of contactor 1CON closes contact 1CON-1 (line 11); and contactors 3CON and 4CON are energized at this time through closed push button emergency stop switches 2PB and 3PB. Energization of contactor 3CON closes contact 3CON-1 (line 8) which completes the circuit through closed contact 1CON-1 (line 11) to energize starter contactor 2CON. Energization of starter contactor 2CON closes contacts 2CON-1 and 2CON-2 (lines 9 and 10) to provide power to starter motor 656, ignition coil 658, distributor 660 and spark plugs 662. Energization of control power interlock contactor 4CON (line 13) closes contact 4CON-1 (line 14). When the engine is running and generator 664 is driven, start switch 1SS is placed on "ON" thereby de-energizing start interlock contactor 1CON (line 7), starter contactor 2CON and starter motor 656. With the engine running, circuit relay 1CR (line 4) is energized thereby opening normally closed contact 1CR-1 (line 5) assuring that contactor 1CON and starter motor 656 remains de-energized.

Assuming that the operator first wishes to drive the main deck loader MDL (FIG. 1) into operative position adjacent the open nose 14 of the aircraft, he manually places mode selector toggle switch 3TGS (line 15) in drive. Power from main line L2 flows through closed contact 4CON-1 (line 14) into line L'2 to "forward" drive circuit (line 25, FIG. 12B) and through closed relay contact 2CR-1. With the main platform 26 (FIG. 2) fully down and the stabilizers 44 fully up, limit switches 2LS (line 25) and the upper pole of two-pole limit switch 3LS is closed providing power to "drive selector toggle switch" 7TGS. The operator places switch 7TGS in its forward position thereby energizing "forward" drive solenoid 6SOL, and depresses a foot treadle thereby operating propulsion bypass control valve V1 (FIG. 10A) of the MDL hydraulic circuit 130. Actuation of the foot treadle closes limit switch 1LS (line 24) thereby energizing "fast forward" solenoid 5SOL providing a maximum of 130 gpm of hydraulic fluid to drive the vehicle forwardly.

In order to drive the main loader in reverse, drive select toggle switch 7TGS (line 25) is placed in "reverse" thereby energizing "reverse" solenoid 7SOL.

During propulsion of the main deck loader MDL as above described, the engine is driven at 2400 rpm by placing engine speed toggle switch 6TGS (line 22) in its high speed position. High throttle contactor 6CON is then energized through a circuit that includes closed contacts 2CR-1 (line 25), diode 7D and switch 6TGS when manually placed in its high position. Energization of high throttle contactor 6CON closes contact 6CON-1 (line 15) thereby energizing solenoid 2SOL which maintains the engine at its high (2400 rpm) speed.

Medium throttle contactor 5CON (line 23) is similarly energized by placing engine speed toggle switch 6TGS in its medium position thereby closing contact 5CON-1 in line 14 which energizes solenoid 1SOL to maintain engine speed at 1200 rpm.

With the main loader MDL in proper position adjacent the aircraft A, and with the engine driven at 2400 rpm, mode selector toggle switch 3TGS (line 16) is placed in its "operate" position thereby energizing operate interlock circuit relay 2CR which opens relay contact 2CR-1 (line 25) in the propulsion circuit and closes contact 2CR-2 (line 28) in the stabilizer circuit. With the vehicle brakes locked thus closing pressure switch 4PS, and with the stabilizers 44 up, stabilizer solenoid 9SOL is energized thereby extending the stabilizers 44 to their "fully down" position at which time sufficient pressure is built up to open pressure switch 5PS. However, stabilizer solenoid 9SOL remains energized through connections 22, 23; and switch 5PS closes the circuit to contactor 7 CON. With contactor 7CON energized, in response to the stabilizers 44 being fully down, contact 7CON-1 (line 29) closes.

With the stabilizer 44 (FIGS. 1, 3 and 4) locked down, the bridge 34 is raised to the level of the aircraft cargo floor 18 and its forward end is preferably connected to the aircraft A adjacent its nose 14.

The elevation of the bridge may be controlled either by bridge toggle switch 4TGS (line 18) which is located on the driver's dash on the forward portion of the operator's platform 48, or by bridge toggle switch 5TGS (line 20) which is located on the operator's control panel that is positioned on the rear portion of the operator's platform 48. When either bridge switch is shifted to the "raise" position, bridge raise solenoid 3SOL (line 18) is energized to raise the bridge 34 (FIG. 2). Preferably, the bridge is raised to a level slightly above the level of the cargo deck or supporting floor 18 (FIG. 1) of the aircraft so that the adapter 36 (FIG. 2) can be manually moved into position above its complementary latch portion on the aircraft, and then be lowered into latching position on the aircraft in a manner well known in the art.

In order to lower the bridge 34 after it has been unlatched from the aircraft, either toggle switch 4TGS or 5TGS is moved to the lower position thereby energizing bridge "lower" solenoid 4SOL.

The electrical control circuit for raising and lowering the bridge belts 92 (FIG. 2) by means of the hydraulic components illustrated in FIG. 10C, is enabled by the stabilizers 34 being locked in their down positions thereby closing relay contact 7CON-1 (line 29). Upon movement of the bridge belt switch 2SS to the "in" position, solenoid 10SOL is energized to drive the container forwardly into the aircraft, and belt lift solenoid 11SOL is energized at the same time by current passing through diode 10D thus raising the belts into contact with the container being loaded into the aircraft.

Bridge belt switch 2SS is placed in its "out" position to energize "aft" solenoid 12SOL (line 32) and "up" solenoid 11SOL is energized through diode 11D when it is desired to move a container out of the aircraft. Push button switch 4PB is closed to energize the "down" solenoid 13SOL when it is desired to lower the bridge belts 92.

With the bridge 34 (FIG. 1) raised and connected to the aircraft by the adapter 36, the main platform 26 and the container controlling components thereon may be placed in operation. Controls available to the operator permit him to rapidly raise or lower the platform unless the platform is within one foot of the level of the bridge 34, or is overloaded. At this time the electrical control circuit overrides the operator actuated controls to slowly raise or lower the main platform 26. In addition to being more than one foot away from the level of the bridge before the "fast raise" circuit (line 44) can be energized, the platform side guides 64,66,75,76 and forward stop 68 (FIG. 6) must be "up"; the "fast raise" circuit must not be overloaded; and the rear stop 78 must be "up" all as will be described in detail immediately below.

In order to raise or lower the main platform 26, platform raise and lower stitch 3SS which is a five pole switch (lines 43–49) having contacts 3SS-1 to 5, is actuated by the operator.

When switch 3SS is positioned in the illustrated "Off" position, switch contact 3SS-5 (line 49) is closed and energizes solenoid 20SOL through normally closed relay contact SCR-2 to lower the platform forward load stop 68 (FIG. 6) only if the platform is within one foot of the bridge. However, relay 5CR (line 41) is energized to open contact 5CR-2 and de-energize solenoid 20SOL when the guides are fully up permitting the forward stop 68 to move "up" when the main platform 26 is more than one foot away from the level of the bridge 34 in response to closing of limit switch 11LS (line 41). Energization of relay 5CR also opens relay contact 5CR-3 (line 52) and opens relay contact 5CR-4 (line 48) for purposes to be described hereinafter. It will be noted that lines 38 and 44 are connected together. Thus, if any of the guides are not fully up, relay contact 3 CR-4 (line 38) remains closed thus retaining solenoid 20SOL (line 49) energized.

When platform switch 3SS is moved to the "fast raise" position, both switch contacts 3SS-1 and 3SS-2 (lines 43 and 44) close and energize relay 6CR and both solenoids 18SOL and 21SOL (line 55) through closed contact 6CR-2 thus directing 130 gpm of hydraulic fluid into the platform lift circuit (FIGS. 10a and 10b) of the MDL hydraulic circuit 130. Platform pilot pressure solenoid 23SOL (line 57) and platform pilot control solenoid 23aSOL (line 58) are also energized through diode 17D-A at this time. The platform "fast raise" solenoid 18SOL (line 44) is energized only when circuit relay contacts 3CR-1, 5CR-1, 6CR-1 & 8CR-1 are closed. Contact 3CR-1 is closed only when circuit relays 3CR (line 39) is energized in response to closing limit switches 5LS, 6LS, 7LS, 8LS and 9LS in response to the left forward side guide 66 (FIG. 6) left rear side guide 76, rear guide or stop 78, right rear side guide 75, and right forward side guide 64 being in their raised or "up" positions, respectively. Circuit relay contact 5CR-1 (line 44) is closed in response to limit switch 11LS (line 41) closing when the platform 26 is one foot or more below the level of the bridge 34.

Circuit relay contact 6CR-1 is closed only when circuit relay 6CR (line 43) is energized. Energization of relay 6CR closes contact 6CR-2 (line 55) to energize "slow raise" solenoid 21SOL and requires that: the platform be lower than the level of the bridge 34 thus closing both limit switches 12LS (line 43) and 13LS; either circuit relay contact 3CR-2 (line 43) is closed by closing all limit switches 5-9LS (line 39) or the platform 26 is below 60 inches relative to the ground thus closing limit switch 4LS; (line 42) and, either circuit relay 4CR (line 40) is energized in response to closing switch 10LS when the forward load stop 68 is "up" thereby closing relay contact 4CR-1 (line 43) and platform switch contact 3SS-1 is closed (line 43); or, alternately when relay 4CR (line 40) is de-energized as illustrated in response to limit switch 10LS being open as when platform forward load stop 68 is "down" and circuit relay contact 7CR-1 is in its normally closed position which occurs when circuit relay 7CR (line 46) is de-energized as it is when the platform is not being lowered.

Circuit relay contact 8CR-1 (line 44) is closed in response to energization of circuit relay 8CR (line 50). When the pressure in lift cylinders 28 (FIG. 10A) is below 1400 psi, pressure switch 6PS is closed; and normally closed relay contact 6CR-3 is closed prior to placing manually operated platform switch 3SS in the "raise" position thus energizing circuit relay 8CR and closing relay contact 8CR-2 across relay contact 6CR-3 which opens upon placing platform switch 3SS in either "slow or fast raise" position providing the circuit in line 43 or 42 is closed to energize relay 6CR.

Without altering the position of platform switch 3SS, the "slow raise" control circuit automatically overrides the operator's selection of "fast raise" by opening relay contact 5CR-1 (line 44) in response to opening limit switch 11LS (line 41) when it moves within one foot of the bridge 34 thus de-energizing relay 5CR. Opening contact 5CR-1 de-energizes solenoid 18SOL, but the "slow raise" circuit (line 43) continues to control raising of the platform 26 until limit switch 12LS is opened in response to the platform reaching the level of the bridge 34 thus deenergizing relay 6CR.

In the event the pressure within the platform lift cylinder 28 (FIG. 10A) exceeds 1400 psi thus overloading the hydraulic platform lift circuit, pressure switch 6PS (line 50) opens thereby de-energizing relay 8CR and opening contact 8CR-1 (line 44) of the fast raise circuit which provides another protective circuit for de-energizing "fast raise" solenoid 18SOL. The "slow raise" circuit (line 43) must, therefore, be relied upon to lift the heavy loads which exert more than 1400 psi on the platform lift cylinders 28.

When it is desired to lower the platform 26, platform switch 3SS (line 43) is manually moved to the "fast lower" position which causes the platform to slowly lower during the first foot from the level of the bridge, and then rapidly lower until it is within 30 inches of the ground at which time the platform again automatically assumes a "slow lower" condition until switch 3SS is placed in the "off" position by the operator. During "fast lower", solenoids 19SOL (line 45), 23SOL (line 57), and 23aSOL (line 58) must be energized. During "slow lower" solenoid 19SOL (line 45) is de-energized, and solenoids 22SOL, 23SOL and 23aSOL (lines 56-58) must be energized.

Closing "slow lower" switch contact 3SS-4 (line 46) establishes a circuit which includes relay contact 5CR-6 that is closed when the platform is within one foot of the bridge 34, and relay contact 4CR-3 which is closed when the forward load stop is "up" thereby energizing relay 7CR. Energizing relay 7CR closes relay contact 7CR-3 (line 56) thereby energizing "slow lower" solenoid 22SOL; and "platform pilot pressure" solenoid 23SOL (line 57) and "platform pilot control" solenoid 23aSOL (line 58) through a branch circuit which includes diode 17D-a. After the platform has lowered one foot, limit switch 11LS (line 41) closes thereby energizing circuit relay 5CR opening contact 5CR-6 (line 46). Relay 7CR, however, remains energized provided limit switch 15LS (line 47) is closed which occurs when the bridge rear load stop is "up", and contact 4CR-3 is closed which occurs when platform forward load stop is "up". Thus, solenoids 22SOL, 23SOL and 23aSOL remain energized. Also, energization of relay 5CR closes relay contact 5CR-5 (line 45) in the "fast lower" circuit, and opens contact 5CR-2 (line 49) which assures that solenoid 20SOL is de-energized and forward platform stop 68 is "up".

Closing switch contact 3SS-3 of fast lower and propel enabling circuit energizes solenoid 19SOL (line 45) provided the following conditions are also satisfied:

Contact 3CR-3 is closed which occurs when all of the platform side guides and the rear stop are "up" thus closing all of the limit switches 5LS-9LS (line 39) thereby energizing relay 3CR;

Contact 5CR-5 (line 45) is closed which occur when platform 26 is not within one foot of the bridge thus closing limit switch 11LS (line 41) thereby energizing relay 5CR;

Contact 9CR-2 is closed which occurs when the platform "fast lower overload circuit" (lines 52-54) is not overloaded at which time pressure switch 7PS is closed thereby energizing relay 9CR through closed contact 5CR-3 when the platform is within one foot of the level of the bridge 34 and closes relay contact 9CR-1 which provides a holding circuit across contact 5CR-3 which opens when the platform lowers one foot below the bridge. While lowering the platform 26 through the first foot below the level of the bridge 34, contact 7CR-2 is opened by virtue of a circuit relay 7CR (line 46) of the slow lower circuit being energized.

Since the contactor 5CR-5 of the fast lower circuit (line 45) is opened while lowering the first foot, the rate of lowering of the platform 26 during this first foot is slow. After relay contact 5CR-5 closes, the lowering rate of the platform is much faster since "fast lower" solenoid 19SOL is energized. Then the main platform lowers to a point 30 inches above the ground, limit switch 14LS opens thereby again de-energizing "fast lower" solenoid 19SOL relying on the "slow lower" circuit (lines 46-48 and 56-58) to slowly lower the platform 26 so that it can be gently stopped upon reaching the desired elevation in response to placing platform switch 3SS in its "off" position (line 45).

If pressure acting on the lift cylinders 28 (FIG. 10A) exceeds 1300 psi at any time, pressure switch 7PS opens thus de-energizing relay 9CR. Therefore, heavy containers are lowered by the "slow lower" circuit as previously described.

It will be understood that the operator has the option of not using the fast raise and fast lower circuits by merely placing the manually controlled platform switch 3SS in the slow raise and slow lower positions, respectively.

The electrical circuits for controlling the several guides and stops are illustrated in FIG. 12C, while the hydraulic circuits are illustrated in FIG. 10F wherein it is illustrated that these guides and stops are normally held up by spring loaded valves and are lowered upon energization of the appropriate solenoids.

The left guides 66, 76 are lowered by closing push button switch 5PB (line 35) thereby energizing solenoid 14SOL. The right guides 64, 75 are lowered by closing push button switch 6PB (line 36) thereby energizing solenoid 15SOL. The rear load stop 78 is lowered by closing push button switch 7PB (line 37) which energizes solenoid 16SOL. Independent closing of switches 5PB, 6PB and 7PB also energizes guide assist solenoid 17SOL through diodes 12D, 13D, and 15D, respectively.

The front platform stop 68 is lowered by the previously described forward load stop circuit (line 49).

The several circuits for controlling the actuation of the container moving components on the platform 26 are illustrated in FIGS. 12E of the MDL electrical control circuit 650, and in FIGS. 10E and 10F of the MDL hydraulic power circuit 130.

The "front" belts 54 (FIG. 6) of the front or forward section 50 of the platform 26 are raised and driven forward by closing switch 4SS-1 (line 60) which energizes "forward run" solenoid 25SOL and belts "up" solenoid 24SOL through diode 21D. Closing switch 4SS-2 energizes "run aft" solenoid 26SOL and belts "up" solenoid 24SOL through diode 20D to drive the belts 54 aft or rearwardly of the platform 26.

Transverse center rollers 58 (FIG. 6) and edge rollers 56, 57 of the front or forward section 50 of the platform 26 are driven toward the right by closing switch 4SS-3 which energizes "right run" solenoid 27SOL and "up" solenoid 29SOL through diode 22D; while these rollers are driven toward the "left" by closing switch 4SS-4 which energizes "left run" solenoid 28SOL and "up" solenoid 29SOL through diode 23D.

The belts 69 on the rear platform section 52 are raised and driven forward by closing switch 5SS-1 (line 66) which energizes forward run solenoid 31SOL and "up" solenoid 30SOL through diode 25D. These belts are driven "aft" by closing switch 5SS-2 (line 67) which energizes "aft run" solenoid 32SOL and "up" solenoid 30SOL through diode 26D.

The transverse center rollers 72 and side rollers 70,71 of the rear or aft section 52 of the platform are driven toward the right by closing switch 5SS-3 which energizes "right run" solenoid 33SOL and "up" solenoid 35SOL through diode 27D; while closing switch 5SS-4 energizes "left run" solenoid 34SOL and "up" solenoid 35SOL through diode 28D.

Guide assist inhibitor circuit relay 10CR (line 71) is energized in response to closing any of the switches 4SS-1 to 4SS-4 or 5SS-1 to 5SS-4, which circuits include appropriate ones of the diodes 19D to 32D.

The above features of the main deck loader control circuit 650 have been described as they control the operation of the main deck loader MDL alone for transferring small containers between airport cargo handling facilities and the aircraft.

Certain additional features of the control circuit 650 will be described hereinafter when combined with the MDL option circuit 690 (FIGS. 14A-14C) and the control circuit 652 of the auxiliary loader for handling the large 40 foot containers C.

AL ELECTRICAL CIRCUIT-652

Since many of the controls of the auxiliary control circuit 652 are similar or identical to the electrical controls of the MDL circuit 650, equivalent parts will not be described in detail but will be cross referenced to equivalent components in the MDL circuit 650. Several components of the auxiliary electrical circuit 652 such as solenoids, will be assigned numerals prefixed by the letter "a" to identify these components with the components in the auxiliary hydraulic circuit 132. The components of the auxiliary circuit 652 will first be described as they are controlled when the auxiliary loader is operating alone, i.e., when it is not connected to the main loader circuit 650. Thereafter, the two electrical circuits plus the MDL option circuit 680, and two hydraulic circuits will be described when they are connected together to handle large 40 foot containers.

The electrical circuits 652 included solenoids 1aSOL to 35a SOL; contactors 1aCON to 8aCON and their contacts; circuit relays 1aCR to 20aCR and their contacts; push button switches 1aPB to 8aPB; pressure switches 3aPS to 4aPS; limit switches 1aLS to 6aLS; toggle switches 4aTGS to 7aTGS; multiple pole switches 1aSS to 3aSS: diodes 1aD to 30aD which permit the flow of current only in the direction indicated by the arrows; and other components which will be described along with a general description of the operation being performed by the several components.

The engine ENG.a (FIG. 5) start and run sub-circuits of the auxiliary loader AL appearing in lines 1-20 of the auxiliary circuit 652 are equivalent to the circuits appearing in lines 1-18 and lines 22 and 23 of the MDL circuits 650. The only difference in this portion of the two circuits is that the AL circuit includes components in lines 12,13 and 17 which are pertinent to combining the two circuits together as will be described hereinafter.

Since the auxiliary loader does not include a bridge, no bridge circuitry is required in the auxiliary circuit 652.

The forward and reverse drive circuit of the auxiliary loader appearing between lines 20-24 and 28 (FIG. 13b) is the equivalent to the main loader drive circuit appearing in lines 24-27 (FIG. 27b) except that the "fast forward" feature of the main deck loader MDL is not included in the auxiliary loader AL. The drive circuit is enabled by placing mode selector switch 3aTGS (line 16) in "drive", and it will be noted that the switch contact 2aLS-1 (line 21) is closed in response to the stabilizers being retracted thereby directing current to line 28 from line 22, and thereafter directs current through relay contact 3aCR-A-1 (line 28) and diode 6aD to energize propel enabling solenoid 7aSOL and platform pilot dump inhibit solenoid 8aSOL.

The sub-circuit appearing in lines 24-32 (FIG. 13B) for raising and lowering the platform 106 of the auxiliary loader AL is enabled by placing mode switch 3aTGS in "operate" thereby energizing relay 3aCR (line 16) opening contact 3CR-1 (line 22) thus opening the drive circuit. The raise and lower circuit is a much simpler circuit than that disclosed in the main loader circuit 650 (lines 34-58 of FIGS. 12C-12E) because the auxiliary loader is not provided with both "fast" and "slow" raise and operates at lower speeds, nor, is the AL circuit provided with the many protective features previously described, in the MDL circuit 650. However, when the two loaders are coupled together to handle large 40 foot containers, it will be appreciated that the protective features are applied to both the auxiliary and main loaders by coupling the two hydraulic and two electrical circuits together as will be described hereinafter.

The simplified platform "raise" and "lower" circuit of the auxiliary loader is closed to raise the platform 106 (FIG. 4) by placing platform lift switch 3aSS (line 26) (or toggle switch 3aTGS-line 16) in the "raise" position. At this time, circuit relay contact 12aCR-2 (line 25) is closed since the auxiliary loader is operating alone and is not connected to the main loader MDL. Circuit relay contact 6aCR-1 is also closed at this time either in response to closing limit switch 4aLS (line 41) in response to the rear stop 68a (FIG. 4) being up thereby energizing relay 6aCR thus closing relay contact 6aCR-1 (line 25); or in response to limit switch 3aLS (line 26) being closed which occurs when the platform is below 60 inches from the ground thereby energizing solenoids 6aSOL, 6aSOL-A and 8aSOL, and also energizing circuit relay 3aCR-A (line 24). Energization of "raise" interlock relay 3aCR-A opens contact 3aCR-A-1 (line 28) thus (along with open contact 3aCR-1) (line 22) assuring that "propel and platform lower solenoid" 7aSOL is de-energized.

Placing either platform lift switch 3aSS (line 26) or 6aTGS (line 28) (which switches are located at different stations on the loader) in the "lower" position energizes platform lower relay 4aCR (line 27) which closes contact 4aCR-1 (line 30) thereby energizing solenoids 9aSOL, 10aSOL 11aSOL, "platform pilot dump inhibitor" solenoid 8aSOL through diode 8aD and "platform enable and lower" solenoid 7aSOL through diode 7aD, thus lowering the platform lift cylinders 108 (FIG. 4) and auxiliary platform 106 as previously described in the auxiliary hydraulic circuit 132 (FIGS. 11A to 11D).

The left rear and right rear stabilizers 105 of the auxiliary loader are separately controlled in order to place the auxiliary platform 106 in planar alignment with the main platform 26 when the two loaders are used together as a unit. Push button switches 4aPB and 5aPB (lines 32 and 33) are activated to energize rear stabilizer solenoid 12aSOL and 12aSOL-A, and the operator controls the flow of high pressure fluid into the upper rear cylinders 574 (FIG. 11C) by controlling the upper speed control valve 578 or 580.

The other stabilizers 105 are extended upon energization of solenoid 13aSOL (line 34) through a circuit which includes relay contact 3aCR-1 that is closed in response to the mode selector switch 3aTGS being in the operate mode, and pressure switch 4aPS being at a low pressure. When the pressure increases in response to all stabilizers being firmly seated on the ground, pressure switch 4aPS opens to de-energize solenoid 15aSOL and closes to energize contactor 7aCON thereby closing contact 7aCON-1 (line 34) directing power to the platform "load stop circuit", "side guide circuit" and the platform "load transfer circuits".

The front stop 78a (FIG. 4) is lowered in response to energizing solenoid 14aSOL (line 37) by either closing push button switch 6aPS or by closing relay contact 11aCR-1, which contact closes when the auxiliary platform 106 and main platform 26 are locked together by the pins 117 (FIG. 9).

The rear stop is retracted or lowered upon energization of the solenoid 15aSOL (line 38) in response to limit switch 3aLS-2 (line 37) being closed which occurs when the platform is below 60 inches from the ground, and when push button switch 7aPB is closed or relay contact 13aCR-1 is closed.

The circuit to the guide assist solenoid 16aSOL (line 42) is energized when the two platforms are locked together, or when front or rear load stops are down. In this regard, solenoid 14aSOL or 15aSOL are energized through diodes 11aD and 10aD, and relay 5aCR (line 40) is energized when the sub-circuit in line 40 is closed. Energization of relay 5aCR closes relay contact 5aCR-1 (line 42) thereby energizing solenoid 16aSOL. Relay contact 7aCR-1 opens when the rollers or belts are in operation thereby de-energizing relay 5aCR and guide assist solenoid 16aSOL.

All of the side guides of the auxiliary loader are fixed to the platform 106 except for the right guide 66a (FIG. 4) which is lowered by closing push button switch 8aPB (line 37) thereby energizing solenoid 36aSOL.

The load transfer components of the front and rear sections 52a, 50a (FIG. 4) of the auxiliary platform 106 are enabled by energization of solenoid 29aSOL (line 62) in response to closing contact 7aCON-1 (line 34) as a result of extending all stabilizers 105.

The circuits illustrated in lines 43-61 of the auxiliary loader circuit 652 for driving the container forwardly, rearwardly, and to the right or left are substantially the same as those illustrated and described in lines 59-71 of the main loader circuit 650, and accordingly the description of these circuits is believed unnecessary. The only difference between the two load transfer subcircuits in circuits 650 and 652 is that holding circuits are provided across the switch contacts 4aSS-1 to 4aSS-4 by closing relay contacts 15aCR-1 to 18aCR-1: and across switch contacts 5aSS-1 to 5aSS-4 by closing relay contacts 15aCR-2 to 18aCR-2 of relays 15aCR to 18aCR (lines 76-79) in response to connecting the main deck loader circuit 650 to the auxiliary loader circuit 652.

In the event the engine of the auxiliary unit fails when the stabilizers 105 (FIG. 4) are down and/or the platform 106 is raised, an electric pump motor 2aMTR (line 89) is provided which drives the small emergency pump 642 (FIG. 11A) so that the auxiliary loader may be towed away from the aircraft loading position if necessary.

When the auxiliary loader AL is used alone, the circuit to motor 2aMTR is established directly between main lines LA2 and LA1. The operator places toggle switch 7aTGS (line 86) in its "platform" position thereby energizing platform auxiliary valve 35aSOL and energizing contactor 8aCON to close contact 8aCON-1 (line 89) and thus drive motor 2aMTR when it is desired to lower the platform. At this time, mode selector switch 3aTGS (line 16) is placed in "operate" and platform lift switch 3aSS (line 26) or 6TGS (line 28) is placed in "lower" thereby slowly lowering the platform 106 through previously described circuits.

When the stabilizers 105 are to be raised, emergency pump switch 7aTGS (line 87) is placed in its "stabilizer" position and thereby energizing contactor 8aCON and closing contact 8aCON-1 thus energizing emergency motor 2aMTR. At this time, mode selector switch 3aTGS (line 16) is placed in the "drive" position thereby energizing relay 3aCR (line 16) and stabilizer retract solenoid 5aSOL (line 23) through closed contact 3aCR-1 (line 22) and close limit switches 1aLS and 2aLS-2.

MDL OPTION CIRCUIT-680

As mentioned previously, the main deck loader MDL and auxiliary loader AL are connected together as illustrated in FIG. 1 to handle large containers up to 40 feet long and weighing 120,000 pounds.

As thus far described, the MDL and AL electrical circuits have been arranged to operate their loaders alone. When it is contemplated by the purchaser of the main deck loader MDL that he will be using the MDL in combination with the auxiliary loader AL, and MDL option circuit 680 (FIG. 14A-14C) is added to the main deck loader circuit thus permitting the main deck loader to operate either alone or in combination with the auxiliary loader.

The MDL option circuit 680 forms a portion of the MDL circuit 650 and accordingly, the reference lines in FIGS. 14A-14C at the left margin are the same as those used in the MDL circuit 650. The portions of the branch or sub-circuits in option circuit 680 that are illustrated in dotted lines are present in the MDL circuit 650. The portions of the sub-circuits that are illustrated in solid lines in the option circuit are newly added components. Also, it will be noted that only portions of certain of the sub-circuits have been included in the option circuit 680 and thus reference should be made to the MDL circuit 650 for the remainder of the sub-circuits.

The MDL option circuit 680 includes connectors A, C-N, R-Z all of which are also illustrated in the AL circuit 652 (FIGS. 13A–13E), and all of which are simultaneously connected together when complementary plugs (not shown on ends of single, multiple line, cables on the main deck loader MDL and the auxiliary loader AL are connected together. When the three circuits 650, 652, and 690 are connected together the resulting electrical control circuit will be referred to as a "composite circuit" in the claims. The terms "to AL" adjacent the above mentioned connectors, indicates that a signal is sent to the auxiliary circuit 652 from the option circuit 680 to perform a function in the auxiliary circuit; while the term "from AL" means that a signal is received from the auxiliary circuit for performing a function in the option circuit 680.

When the chassis of the main deck loader MDL and auxiliary loader AL are coupled together as indicated in FIG. 1; when all of the above mentioned connectors are closed to define a composite electrical circuit; when the hydraulic circuits 130, 132 are coupled together to define a composite hydraulic circuit and when the platforms 26 and 106 are also coupled together by extension of the platform locking pins 117 (FIGS. 8 and 9), the loaders are prepared to handle the large 40 foot containers. When the components are coupled together as above described a single operator on the MDL controls the functions of both the MDL and the AL to handle large containers. At this time both engines are running and the hydraulic system of the main deck loader MDL is used to raise and lower both the main platform 26 and the auxiliary platform 106 at half the speed of the main platform 26 when it is operating alone. The stops, side guides, rollers and belts on the main loader MDL are powered by its hydraulic system 130; and the equivalent components of the auxiliary loader AL are powered by the auxiliary loader hydraulic system 132, but under the control of the single operator on the MDL.

It will also be understood that when the main deck loader MDL is provided with the option circuit 680 it may be operated alone. However, when operating alone, the connector pins E, F, M and Z are jumpered together inside a dummy plug (not shown) that is mounted on the MDL. It will also be understood that when the components of the main deck loader MDL and auxiliary AL are coupled together as above described except that the platform locking pins 117 are retracted, the platform 106 of the auxiliary loader may be maintained at a predetermined low elevation to operate as a small container receiving platform, while the platform 26 of the main loader may be raised and lowered indepently of the auxiliary platform. At this time the transfer belts and rollers on the two platforms are operated independently of each other by two separate operators.

Having reference to the MDL option circuit 680 (FIGS. 14a–14C), the effect of connecting the MDL cable plug to the AL cable plug simultaneously closes all of the connectors A, C-N, and R-Z. Since the operation of the main loader MDL and the auxiliary loader AL; and the hydraulic and the electrical circuits for operating each loader alone have already been described in considerable detail, it is believed that a description of the function accomplished by coupling the above connectors together will suffice to describe the control function performed by the option circuit 680.

Closing connectors F and E (FIGS. 14A and 14B- lines 11A, 12 and 73); and (FIG. 13A -lines 12 and 13) affect energization of contactors 3CON, 4CON and relay AL-CR (FIGS. 14A and 14C) of the MDL option circuit 680. Closing these connectors also energizes contactor 4aCON and relay 2aCR (FIG. 13A) of the auxiliary loader thereby starting and operating the engines ENG and ENGa of both the main deck loader MDL and the auxiliary loader AL at the proper speeds through circuits already described.

All stabilizers of both the MDL and AL must be fully down before loading can take place. This is accomplished on the MDL by closing the stabilizer interlock sub-circuit (FIG. 14A -line 28) which energizes relay 7CON; of the MDL circuit and also energizing contactor 7aCON (FIG. 13C -line 34) of the auxiliary loader circuit. It is noted that the relay contact SNE-CR-1 (FIG. 14A -line 28) opens in the event the auxiliary loader stabilizers are not fully extended. Opening of contact SNE-CR-1 takes place if relay SNE-CR (line 74) is energized which occurs only if the platforms 26 and 106 (FIG. 1) are locked together; and if previously described AL stabilizer circuits (FIG. 13C, lines 34–36) are closed.

Since long, 40 foot containers must be supported by both of the platforms 26 and 106, the rear stop 78 (FIG. 6) of the main platform 26 must be "down" when handling the large containers. Closing connector R (FIG. 14A -line 34A) and energization of "platforms locked" relay PL-CR and PL-CR-A (lines 77 and 78) must be energized at this time to energize solenoid 16SOL. To energize these "platforms locked" relays and light PL-LT, both the left and right lock pins 117 must lock the platforms together as indicated in FIG. 9, thereby closing limit switches LL-LS and RL-LS (line 78).

In the event the platform lock pins 117 should become disengaged (thus opening switches LL-LS and RL-LS) when the platforms are raised which might occur if two platforms are angled upwardly toward each other, lower enable push button switch LE-PB (line 87) is closed by the operator thereby energizing relay LE-CR thus closing contact LE-CR-3 (line 79). Diode 33D prevents energizing "platform lock" light PL-LT, relay PL-CR-A, and relay PL-CR but energizes relay 11aCR (FIG. 13E -line 69). Thus, by closing lower enable switch LE-PD, the platforms may not be raised, but may be slowly lowered through the previously described slow lower sub-circuits of the MDL and AL permitting an appropriate correction in platform alignment to be made.

Energization of relay PL-CR also closes relay contacts PL-CR-3 (line 37A) thus energizing solenoid 16SOL and lowering the rear stop on the MDL. At this time, relay contact PL-CR-2 (line 37) opens and contact PL-CR-1 is closed. Closing of contact PL-CR-1 (line 34a) and connector R energizes circuit relay 13aCR (FIG. 13E -line 74) of the auxiliary circuit 652 thus lowering the rear load stop 68a (FIG. 4) of the auxiliary loader AL through previously described circuits (FIG. 13C -lines 38,39).

Closing "platforms lock connector" I (FIG. 14C -line 75) enables platform lock/unlock toggle switch L/U-

TGS; and energizes platform lock relay 8aCR (FIG. 13D-line 64) and lock deadhead relay 9aCR of the auxiliary loader circuit 652. Energization of relay 8aCR and 9aCR close relay contacts 8aCR-1 and in response to placing toggle switch L/U-TGS (FIG. 14C -line 76) in "lock", energizes platform lock solenoid 30aSOL (FIG. 13E-line 67) to move the pin 117 (FIG. 9) into platform locking position, and energizes solenoid 31aSOL (line 68) to activate the lock deadhead. Relay contact 9aCR-1 (line 63) is opened in response to closing connectors I and J.

Closing of platform unlock connector J energizes platform unlock relay 10aCR (FIG. 13D-line 66) of the auxiliary loader circuit thereby closing contact 10aCR-1 (line 70) which energizes platform unlock solenoid 32aSOL when limited switch 2LS (FIG. 14C -line 77) is closed in response to the platforms 26 and 106 (FIG. 1) being fully down and further in response to toggle switch L/U-TGS being in its "unlock" position.

Closing of "AL guides up interlock" connector Z (FIGS. 14C -line 76) energizes guides up circuit relay GU-CR thereby closing relay contact GU-CR-1 (line 43) in the slow raise sub-circuit. At this time the rear load stop 68a (FIG. 4) of the auxiliary loader AL must be fully up thereby closing limit switch 4aLS (FIG. 13C-line 41), which limit switch is connected to main line L'A2 (FIG. 13B-line 33).

Since the rear stop 78 (FIG. 6) of the main platform 26 must remain down when handling the large containers, a platform lower relay contact PL-CR-A-2 (FIG. 14A-line 39) is placed in parallel across rear stop limit switch 7LS to define a holding circuit. Contact PL-CR-4 is closed when platform lock relay PL-CR (line 77) is closed as previously described.

In order to slowly raise the two interconnected platforms 26 and 106, relay 6CR (FIG. 14A -line 43) is energized through previously described MDL circuit to which relay contact CU-CR-1, and parallel relay contacts PU-CR-1 and PL-CR-4 have been added. Contact CU-CR-1 is closed when all guides are "up" at which time relay GU-CR (line 76) is engaged. Contact PL-CR-4 is closed in response to the platforms 26 and 106 being locked together upon energization of platform lock relay PL-CR (line 77) as previously described. Relay contact PU-CR-1 is closed when lock pins 117 (FIG. 8) are fully retracted in response to energization of platform unlock relay PU-CR (line 82). Platform unlock relay PU-CR is energized in response to closing connector M and closing limit switches 5aLS and 6aLS (FIG. 13E -line 72) which occurs when the left and right platform lock pins 117 (FIG. 8) are fully retracted.

When connector L (FIG. 14C-line 81) is closed, platforms unlock light PU-LT is energized through closed relay contact PU-CR-3, and closed relay contact 10aCR-1 (FIG. 13E-line 70) thereby energizing platform unlock solenoid 32aSOL.

The sub-circuit to "propel enable and platform lower" solenoid 19SOL (FIG. 14A -line 45) is the same as that previously described in the MDL circuit 650 except that normally closed relay contact LE-CR-1 is added to the sub-circuit. When lower enable relay LE-CR (line 87) is energized by closing lower enable push button switch LE-PB thereby opening contact LE-CR-1 (FIG. 45), the MDL platform 26 may be lowered even though the platform lock pins 117 (FIG. 8) are disengaged from platform 106 of the auxiliary loader AL. At this time the platform 26 must be lowered through the "slow lower" sub-circuit (FIG. 14A -lines 46-48).

The platform "slow lower" sub-circuit is the same as that previously described in the MDL circuit 650 except that parallel relay contacts PL-CR-5, LE-CR-2 and PU-CR-2 have been added to the sub-circuit. Contact PL-CR-5 is closed when the platforms are locked together thus energizing relay 7CR and lowering both platforms through previously described circuits. Relay contact LE-CR-2 is closed in response to closing the lower enable switch LE-PB (line 87) thus slowly lowering the main platform 26. Contact PU-CR-2 is closed when platform unlock relay PU-CR (line 82) is energized in response to the platform lock pins 117 (FIG. 8) being fully retracted.

Closing connector H (FIG. 14B- line 58) energizes platform pilot dump solenoid 23SOL through previously described MDL circuits, and also energizes platform pilot dump inhibit 8aSOL (FIG. 13B- line 29) of the auxiliary circuit 652.

Closing connector Y (FIG. 14C -line 88) and closing platform lock contact PL-CR-7 in response to the platforms 26 and 106 being locked together, or closing lower enable relay LE-CR-4 in response to the platforms being disengaged and lower enable switch LE-PB being closed, energizes relay 20aCR (FIG. 13E-line 82) of the auxiliary loader circuit. Energization of relay 20aCR closes relay contact 20aCR-1 (line 83) thereby energizing pilot pressure isolator solenoid 34aSOL of the auxiliary loader circuit 65 to thereby shift the hydraulic circuit valve V28 (FIG. 11A) to the parallel passage position.

Closing connectors A, C and D (FIG. 14B-line 72 and FIG. 13F -lines 84-86) merely assures that the MDL circuit 650 and the AL circuit 652 are properly grounded.

Closing connectors T, U, V and W (FIG. 14B- lines 66-69) enable the container transfer circuits of the rear portion 52 (FIG. 6) of the main deck loader MDL and both front and rear portions of the auxiliary loader AL. It will be understood that the container transfer circuits of the forward portion 50 of the main deck 26 and the bridge 34 may be placed in operation by separate controls available to the single operator on the MDL, which controls have been described and are included in the MDL circuit 650. Selectively closing switches 5SS-1, 5SS-2 5SS-3 and 5SS-4 raises and drives the belts and rollers of the rear section 52 of the platform 26 of the main deck loader MDL in forward, aft, right, and left directions, respectively, through previously described MDL sub-circuits.

Closing of connectors T, U, V and W, and selectively closing switches 5SS-1, 5SS-2, 5SS-3 and 5SS-4 also directs power into the auxiliary circuit 652 (FIG. 13E - lines 76-79) to energize relays 15aCR, 16aCR, 17aCR and 18aCR, respectively, providing the platforms 26 and 106 are locked together thus energizing relay 14aCR (line 75). Energization of solenoid 14aCR closes contacts 14aCR-1, 14aCR-2, 14aCR-3 and 14aCR-4 (lines 75-79). Selective energization of relays 15aCR, 16aCR, 17aCR and 18aCR, respectively, close contacts 15aCR-1, 16aCR-1, 17aCR-1 and 18aCR-1 (FIG. 13C - lines 45, 47, 49 and 51, respectively; and also selectively close relay contacts 15aCR-2, 16aCR-2 17aCR-2 and 18aCR-2 (FIG. 13B-lines 54, 56, 58 and 60). Thus selective closing of switches 5SS-1 to 5SS-4 by the operator of the main deck loader MDL permits him to selectively operate the rollers and belts on the rear section 52 of the main deck loader platform 26, and the corresponding rollers and belts on both the front and rear sections of the auxiliary loader platform 106.

Closing of connectors S and X (FIG. 14C -lines 84-86) close a transfer speed reducer sub-circuit when transfer enable toggle switch TE-TGS and platform lock relay contact PL-CR-A-1 are closed, thereby energizing solenoid TSR-SOL. As indicated in dotted lines in FIG. 10F of the hydraulic circuit 130 of the main deck loader MDL, when the MDL option circuit 680 is added to the main deck loader a spring return transfer speed reducer valve V24 and adjustable speed control valve 682 are added to the hydraulic circuit 130 to bypass fluid to the sump S when transverse speed reducing solenoid TSR-SOL (FIG. 14C -line 85) is energized as above described.

Closing connectors S and X and toggle switch TE-TGS (line 84), and also closes relay 11aCR-1 (FIG. 13E -line 75) in response to the platforms being locked together by pin 117 (FIG. 9), energizing transfer enable relay 14aCR. At the same time, reduced transfer speed relay 19aCR (line 80) is energized which closes relay contact 19aCR-1 (line 81) thus energizing transfer speed reduce solenoid 33aSOL. Energization of solenoid 33aSOL shifts transfer speed reducing valve V40 (FIG. 11) of the auxiliary loader hydraulic circuit 132 thus allowing the single operator to reduce the speed of the selected transfer belts and/or rollers to about half speed by closing toggle switch TE-TGS (FIG. 14c -line 84) and closing a selected one of the switches 5SS-1 to 5SS-4 (lines 66-69).

From the foregoing description it is apparent that two self propelled loaders MDL and AL are provided and that each may be used independently of the other to load small containers that are up to about 20 feet long and weigh up to about 60,000 psi into or remove them from an aircraft or the like. If large containers that are about 40 feet long and weigh up to about 120,000 pounds are to be loaded or unloaded from an aircraft, the chassis of the two loaders are moved into abutting engagement with the main deck loader being positioned relative to the aircraft so that the containers may be transferred between the aircraft and the loaders. At this time, optional electrical and hydraulic components are provided and are coupled to the independent electrical and hydraulic components of the main deck loader and auxiliary loader and are under the control of a single operator of the main deck loader. When the platforms of the two abutting loaders are not coupled together, the platform of the main loader may be selectively raised and lowered by the operator independently of the platform of the auxiliary loader to transfer small containers between the aircraft and the platform of the auxiliary loader. When the platforms of the two loaders are locked together to handle large containers, the single operator may selectively raise and lower the main and auxiliary platforms as a unit and control transfer of the large containers into and out of the aircraft by selectively controlling container propelling components on both platforms.

Although the best mode contemplated for carrying out the present invention has been herein shown and described, it will be apparent that modification and variation may be made without departing from what is regarded to be the subject matter of the invention.

What we claim is:

1. Apparatus for transferring both large and small containers into and out of aircraft comprising; means defining a mobile main loader movable into position adjacent an aircraft, said main loader means including means defining a vertically movable main container supporting platform for changing the elevation of and for transferring containers between the aircraft and airport cargo handling facilities by moving the containers relative to said main platform, means defining a mobile auxiliary loader movable adjacent said main loader, said auxiliary loader means including means defining a vertically movable container supporting auxiliary platform which cooperates with said main loader platform for supporting and changing the elevation of a container too large to be supported by either loader alone and for transferring the large container between the aircraft and the airport cargo handling facilities by moving said large container relative to said main and auxiliary platforms, and selectively operable locking means for mechanically locking said two platforms together and in horizontal alignment when changing the elevation of a large container supported on both platforms.

2. An apparatus according to claim 1 wherein said mechanical locking means comprises at least one elongated pin movably supported on one of said platforms, means defining at least one pin receiving recess on the other platform, and power means on said one platform for selectively moving said pin into engagement with said recess for locking said platforms together when handling large containers.

3. An apparatus according to claim 1 wherein said main loader includes a chassis; said auxiliary loader means including a chassis and is a steerable, self-propelled loader capable of transferring small containers between an aircraft and airport cargo facilities when operating alone; and loader alignment and abutment means for aligning the two chassis of said two loaders in response to the two chassis being moved into abutting contact; said loader alignment and abutment means including at least one elongated member secured to one of said chassis and extending outwardly therefrom, and means defining at least one recess on the other chassis for receiving said elongated member for maintaining said chassis mechanically locked together.

4. An apparatus according to claim 2 wherein two transversely spaced pins and cooperating recesses are provided.

5. An apparatus according to claim 1 and additionally comprising: composite power means including a main engine and a main hydraulic system on said main loader, an auxiliary engine and an auxiliary hydraulic system on said auxiliary loader, means for connecting the two hydraulic systems together; a selectively controlled composite control means defined by electrical circuits on each loader, means for connecting the electrical circuits together, and operator responsive means associated with said control means and positioned on one of said loaders for allowing a single operator to control changes in elevation of both platforms when mechanically locked together and for controlling transfer of containers across both platforms when said hydraulic systems and electrical systems are interconnected.

6. An apparatus according to claim 5 wherein said composite control means is selectively operable to direct hydraulic fluid from said main hydraulic system into container propelling components of said main loader; and simultaneously directs hydraulic fluid from said auxiliary system into container propelling components of said auxiliary loader to drive said main and auxiliary propelling components in the same direction and at the same speed, said main and auxiliary components being under the control of a single operator on the main loader.

7. An apparatus according to claim 5 wherein said main container supporting platform means includes first container alignment means for moving the forward end of the large container transversely toward the right or left of said main platform, and wherein said auxiliary container platform means includes second container alignment means for moving the aft end of a large container transversely toward the right or left of said auxiliary platform, said first container alignment means being driven by said main engine and main hydraulic system and being selectively controlled by said control means, said second container alignment means being driven by said auxiliary engine and auxiliary hydraulic system and being selectively controlled by said control means.

8. Apparatus for transferring both large and small containers onto and off of the container supporting surface of the cargo area of an aircraft comprising: a steerable self-propelled main loader; a vertically movable main platform on said main loader of insufficient length to accommodate a large container, main elevating means for moving said main platform between a container receiving elevation and the same elevation as the container supporting surface of the aircraft when said loader is positioned to transfer containers into and out of the aircraft, and main container moving means on said platform for selectively moving a container toward and away from said cargo area; an auxiliary loader, a vertically movable auxiliary platform on said auxiliary loader and being of sufficient length when added to the length of said main platform to accommodate said large container, auxiliary elevating means for moving said auxiliary platform between said container receiving elevation and the elevation of the container supporting surface of the aircraft when said auxiliary loader is in position to transfer a container into or out of said aircraft; power means for propelling said main loader, for raising or lowering at least one of said platforms, and for powering said main container moving means; and selectively operable control means associated with said power means for selectively controlling the raising and lowering of at least said main platform; said auxiliary loader being self-propelled and steerable and being driven into abutting engagement against said main loader, said auxiliary loader additionally comprising auxiliary power means and auxiliary control means for selectively powering and controlling the operation of said auxiliary loader independently of or in cooperation with said power means and control means; interconnecting means for releasably connecting said main platform to said auxiliary platform, for connecting said power means to said auxiliary platform means, and for connecting said control means to said auxiliary control means when a large container is to be transferred between the aircraft cargo space and said platforms; means responsive to said connection of said interconnecting means for causing power originating from said power means to be transmitted to a portion of said auxiliary power means for simultaneously providing power to said main elevating means and said auxiliary elevating means and for simultaneously raising and lowering said platforms, and means responsive to connection of said interconnecting means enabling said control means to selectively control the raising and lowering of said main and auxiliary platforms.

9. An apparatus according to claim 8 wherein said power means, and control means are effective to reduce the raising and lowering rates of said main and auxiliary platforms when connected together to about one-half of the raising and lowering rates when said interconnecting means is released.

10. An apparatus according to claim 9 wherein said main container moving means is powered by said power means, said auxiliary container moving means is powered by said auxiliary power means, and said main and auxiliary container moving means are both controlled from said control means in response to said interconnecting means being connected.

11. An apparatus according to claim 10 and additionally comprising a vertically movable bridge defining a container supporting bridge platform on said main loader, bridge elevating means for moving said bridge platform to the level of said container supporting surface means for connecting the forward end of said bridge platform to the aircraft, and means associated with said power means and said control means for maintaining said bridge platforms at the same elevation as the container supporting surface of said aircraft during selective transfer of a container into and out of said aircraft.

12. An apparatus according to claim 11 and additionally comprising a plurality of main stabilizers on said main loader, and a plurality of auxiliary stabilizers on said auxiliary loader; said main stabilizers being lowered into supporting engagement with the loader supporting surface in response to power received from said power means under the control of said main control means; said auxiliary stabilizers being lowered into supporting engagement with the loader supporting surface in response to power received from said auxiliary power means under the control of said auxiliary control means; said auxiliary control means additionally including means for independently altering the elevation of the rear corners of said auxiliary loader relative to the loader supporting surface for moving the container supporting surfaces of said main and auxiliary platforms into planar alignment.

13. An apparatus according to claim 8 wherein: when small containers are being handled and when said releasable interconnecting means is disconnected, said auxiliary platform is maintained at a lowered position for receiving containers to be loaded into or moved away from the aircraft, said auxiliary container moving means being driven by said auxiliary power means to selectively move containers toward or away from said main platform when said main platform in said lowered position in response to selective control of said auxiliary control means.

14. A method of using a main loader and an auxiliary loader for transferring both large and small containers between the floor of airport cargo facilities and the floor of the cargo area of an aircraft, said main loader and auxiliary loader each including a platform of sufficient length to accommodate only a small container and each platform including transfer means defining a container supporting surface; comprising the steps of: moving said main loader into container transfer position adjacent the cargo area of an aircraft; moving said auxiliary loader into container transfer position adjacent said main loader; transferring a container onto at least one of said platforms from said aircraft cargo area or from airport cargo handling facilities; when handling containers having a length longer than can be accommodated on one of said platforms alone, mechanically locking the platforms of said loaders together to provide a horizontal container supporting surface of sufficient length to accommodate a large container; simultaneously changing the elevation of both platforms when locked together and said large container supported thereon between the container supporting plane of the floor of said airport cargo handling facility and the plane of the floor of the cargo area of the aircraft; aligning the mechanically locked platforms with one of the floors; and transferring the large container horizontally off said platforms onto the planar aligned floor.

15. A method according to claim 14, when said container is a small container being loaded into the aircraft; comprising the steps of: releasing the mechanically locked platforms for independent movement; moving and maintaining the plane of the container supporting surface of said auxiliary loader platform to the same level as the plane of the floor of the airport cargo facility, transferring the container from the airport cargo handling facility onto the container supporting surface of the auxiliary loader platform independently of the elevation of the container supporting surface of the main loader platform, moving the container supporting surface of the main loader platform into planar alignment with the container supporting surface of the auxiliary loader platform, transferring the container from said auxiliary loader platform onto the main loader platform when said surfaces are in planar alignment, raising the main loader container supporting surface to the level of said floor of the cargo space of the aircraft, and transferring the container into the aircraft.

16. A method according to claim 14, when said container is a small container being unloaded from the aircraft; comprising the steps of: releasing the mechanically locked platforms for independent movement; moving and maintaining the plane of the container supporting surface of said auxiliary platform to the same level as the plane of the floor of the airport facility, moving the container supporting surface of the main loader platform to the level of the floor of the aircraft cargo area, transferring the container from the aircraft onto the container supporting surface of the main loader platform, lowering the container supporting surface of the main loader platform into planar alignment with the container supporting surface of the auxiliary loader platform, transferring the container from the main loader platform onto the auxiliary loader platform, and transferring the container from the auxiliary loader platform onto the floor of the airport cargo facility independent of the elevation of the container supporting surfaces of the main loader platform.

17. A method of using a main loader and an auxiliary loader for transferring both large and small containers between the floor of airport cargo facilities and the floor of the cargo area of an aircraft, said main loader and auxiliary loader each being of sufficient length to accommodate only a small container and each having a container supporting surface; comprising the steps of: moving said main loader into container transfer position adjacent the cargo area of an aircraft; moving said auxiliary loader into container transfer position adjacent the main loader; transferring a container onto at least one of said loaders from said aircraft cargo area or from airport cargo handling facilities; changing the elevation of said container between the container supporting plane of the floor of said airport cargo handling facility and the plane of the floor of the cargo area of the aircraft; and transferring the container horizontally off said loaders onto the planar aligned floor; when said container is a large container being loaded into the aircraft additionally comprising the steps of locking the container supporting surface of the main loader and the auxiliary loader together and in planar alignment; positioning said container supporting surfaces at the level of the floor of the airport facility, transferring the large container from the airport facility onto the container supporting surfaces of both loaders, raising the container and container supporting surfaces of both loaders to the level of the floor of the cargo space of the aircraft, and transferring the large container from both loaders into the aircraft.

18. A method of using a main loader and an auxiliary loader for transferring both large and small containers between the floor of airport cargo facilities and the floor of the cargo area of an aircraft, said main loader and auxiliary loader each being of sufficient length to accommodate only a small container and each having a container supporting surface; comprising the steps of: moving said main loader into container transferring position adjacent the cargo area of an aircraft; moving said auxiliary loader into container transfer position adjacent said main loader; transferring a container onto at least one of said loaders from said aircraft cargo area or from airport cargo handling facilities; changing the elevation of said container between the container supporting plane of the floor of said airport cargo handling facility and the plane of the floor of the cargo area of the aircraft; and transferring the container horizontally off said loaders onto the planar aligned floor; wherein said container is a large container being unloaded from the aircraft; and additionally comprising the steps of: locking the container supporting surfaces of the main loader and the auxiliary loader together and in planar alignment; positioning said container supporting surfaces at the level of the floor of the aircraft, transferring the container from the aircraft onto the container supporting surfaces of both loaders, lowering the container and container supporting surface of both loaders to the level of the floor of the airport facility, and transferring the large container from both loaders onto the floor of the airport cargo handling facility.

19. A method according to claim 17 and additionally comprising the steps of unloading the large container from the aircraft, said additional steps comprising: locking the container supporting surfaces of the main loader and the auxiliary loader together and in planar alignment, positioning said container supporting surfaces at the level of the floor of the aircraft, transferring the container from the aircraft onto the container supporting surfaces of both loaders, lowering the container and container supporting surfaces of both loaders to the level of the floor of the airport facility, and transferring the large container from both loaders onto the floor of the airport cargo handling facility.

* * * * *